United States Patent
Hirose et al.

(10) Patent No.: US 10,293,264 B2
(45) Date of Patent: May 21, 2019

(54) GAME APPARATUS AND STORAGE MEDIUM STORING A GAME PROGRAM FOR CONDUCTING DATA COMMUNICATIONS WITH A NETWORK

(75) Inventors: Kazuki Hirose, Kyoto (JP); Shinichiro Tamaki, Kyoto (JP); Tetsuya Sasaki, Kyoto (JP); Tsutomu Araki, Kyoto (JP); Hiroaki Adachi, Kyoto (JP)

(73) Assignee: Nintendo Co. Ltd., Redmond, WA (US)

( * ) Notice: Subject to any disclaimer, the term of this patent is extended or adjusted under 35 U.S.C. 154(b) by 578 days.

(21) Appl. No.: 13/251,366

(22) Filed: Oct. 3, 2011

(65) Prior Publication Data

US 2012/0028717 A1    Feb. 2, 2012

Related U.S. Application Data

(62) Division of application No. 11/822,791, filed on Jul. 10, 2007, now Pat. No. 8,192,287.

(30) Foreign Application Priority Data

Nov. 17, 2006  (JP) .................................. 2006-311671
Nov. 17, 2006  (JP) .................................. 2006-311830
(Continued)

(51) Int. Cl.
*G06F 17/00*    (2019.01)
*A63F 13/87*    (2014.01)
(Continued)

(52) U.S. Cl.
CPC .............. *A63F 13/87* (2014.09); *A63F 13/12* (2013.01); *A63F 13/35* (2014.09); *A63F 13/352* (2014.09);
(Continued)

(58) Field of Classification Search
CPC ........... A63F 13/12; A63F 13/35; A63F 13/87
(Continued)

(56) References Cited

U.S. PATENT DOCUMENTS 5,687,331 A *  11/1997  Volk ................... G06F 3/04847
                                                            348/E7.071
5,790,804 A    8/1998   Osborne
(Continued)

FOREIGN PATENT DOCUMENTS

JP    02143356 A    6/1990
JP    08180001 A    7/1996
(Continued)

OTHER PUBLICATIONS

Office Action (3 pgs.) dated Jul. 26, 2011 issued in corresponding Japanese Application No. 2006-312230.
(Continued)

*Primary Examiner* — James S. McClellan
*Assistant Examiner* — Kevin M Carter
(74) *Attorney, Agent, or Firm* — Lee & Hayes, P.C.

(57) ABSTRACT

A game apparatus includes an input-output processor, and by following an instruction from the input-output processor, messages are transmitted and received with other game apparatus 12 connected via a network. The messages are transmitted and received in an electronic mail format, and has identification information of an application being a creation source of the message as well as general information, such as a transmission source, a destination and a subject as header information.

15 Claims, 27 Drawing Sheets

(30) Foreign Application Priority Data

Nov. 17, 2006 (JP) ................................ 2006-312113
Nov. 17, 2006 (JP) ................................ 2006-312230

(51) Int. Cl.
| | |
|---|---|
| *A63F 13/352* | (2014.01) |
| *A63F 13/795* | (2014.01) |
| *A63F 13/30* | (2014.01) |
| *G06Q 10/10* | (2012.01) |
| *G06Q 30/02* | (2012.01) |
| *A63F 13/35* | (2014.01) |
| *H04L 12/58* | (2006.01) |

(52) U.S. Cl.
CPC ......... *A63F 13/795* (2014.09); *G06Q 10/107* (2013.01); *G06Q 30/0209* (2013.01); *H04L 51/00* (2013.01); *A63F 2300/513* (2013.01); *A63F 2300/537* (2013.01); *A63F 2300/556* (2013.01); *A63F 2300/638* (2013.01); *H04L 51/12* (2013.01)

(58) Field of Classification Search
USPC ..................... 463/15, 20, 40, 42; 705/14, 51
See application file for complete search history.

(56) References Cited

U.S. PATENT DOCUMENTS

| | | | |
|---|---|---|---|
| 5,870,267 A | 2/1999 | Kitano | |
| 5,905,866 A | 5/1999 | Nakabayashi et al. | |
| 6,138,241 A * | 10/2000 | Eckel | H02J 13/0062 315/320 |
| 6,167,567 A * | 12/2000 | Chiles | G06F 9/4448 709/221 |
| 6,178,442 B1 | 1/2001 | Yamazaki | |
| 6,453,372 B1 | 9/2002 | Mizunuma et al. | |
| 7,054,831 B2 * | 5/2006 | Koenig | 705/14.5 |
| 7,240,228 B2 | 7/2007 | Bear et al. | |
| 7,290,072 B2 * | 10/2007 | Quraishi et al. | 710/105 |
| 7,704,147 B2 * | 4/2010 | Quraishi et al. | 463/42 |
| 7,819,750 B2 * | 10/2010 | Lam et al. | 463/43 |
| 2001/0003714 A1 * | 6/2001 | Takata et al. | 463/40 |
| 2001/0008021 A1 | 7/2001 | Ote et al. | |
| 2002/0061780 A1 | 5/2002 | Matsuno et al. | |
| 2002/0078209 A1 * | 6/2002 | Peng | H04L 29/06 709/227 |
| 2002/0152473 A1 | 10/2002 | Unger | |
| 2003/0126218 A1 | 7/2003 | Sakonsaku | |
| 2004/0039951 A1 * | 2/2004 | Naitou | H04W 52/028 713/300 |
| 2004/0225901 A1 | 11/2004 | Bear et al. | |
| 2004/0235562 A1 | 11/2004 | Kiely et al. | |
| 2005/0066006 A1 * | 3/2005 | Fleck | G06F 1/3203 709/206 |
| 2005/0094036 A1 | 5/2005 | Tichelaar | |
| 2005/0182612 A1 | 8/2005 | Anderson et al. | |
| 2005/0192099 A1 * | 9/2005 | Nguyen | G06F 21/10 463/42 |
| 2005/0216943 A1 | 9/2005 | Rodolico | |
| 2006/0116206 A1 | 6/2006 | Nelson et al. | |
| 2006/0150020 A1 * | 7/2006 | Lee | G06F 1/3203 714/36 |
| 2006/0168147 A1 * | 7/2006 | Inoue | A63F 13/12 709/219 |
| 2006/0252548 A1 | 11/2006 | Sasaki et al. | |
| 2006/0271460 A1 | 11/2006 | Hanif | |
| 2006/0271971 A1 | 11/2006 | Drazin | |
| 2007/0050426 A1 * | 3/2007 | Dubal | G06F 8/65 |
| 2007/0268200 A1 | 11/2007 | Fuller et al. | |
| 2008/0119281 A1 | 5/2008 | Hirose et al. | |
| 2015/0182859 A1 | 7/2015 | Hirose et al. | |

FOREIGN PATENT DOCUMENTS

| | | |
|---|---|---|
| JP | 10-232815 | 9/1998 |
| JP | 10232815 | 9/1998 |
| JP | 10-289146 A | 10/1998 |
| JP | 10289146 | 10/1998 |
| JP | 10-293732 | 11/1998 |
| JP | 10293732 | 11/1998 |
| JP | 11177714 A | 7/1999 |
| JP | 11-207031 A | 8/1999 |
| JP | 11207031 | 8/1999 |
| JP | 11-272711 A | 10/1999 |
| JP | 11272711 | 10/1999 |
| JP | 113317772 A | 11/1999 |
| JP | 2000-181822 | 6/2000 |
| JP | 2001-175556 | 6/2001 |
| JP | 2001-286681 A | 10/2001 |
| JP | 2001-326730 | 11/2001 |
| JP | 2002153677 A | 5/2002 |
| JP | 2002-253866 | 9/2002 |
| JP | 2002-369970 | 12/2002 |
| JP | 2003-023661 | 1/2003 |
| JP | 2003-050771 | 2/2003 |
| JP | 2003-196217 | 7/2003 |
| JP | 2003-337780 | 11/2003 |
| JP | 2004015650 A | 1/2004 |
| JP | 2004-057515 | 2/2004 |
| JP | 2004139507 A | 5/2004 |
| JP | 2004-283210 | 10/2004 |
| JP | 2004-329948 | 11/2004 |
| JP | 2004-334877 | 11/2004 |
| JP | 2005-028103 | 2/2005 |
| JP | 2005087418 | 4/2005 |
| JP | 2005-250550 | 9/2005 |
| JP | 2006-101474 | 4/2006 |
| JP | 2006334386 A | 12/2006 |
| JP | 2007058695 A | 3/2007 |
| JP | 2008-125621 | 6/2008 |

OTHER PUBLICATIONS

Office Action (17 pgs.) dated Sep. 14, 2011 issued in co-pending U.S. Appl. No. 11/822,791.
Nov. 13, 2012 Office Action for JP 2006-311671, 3 pages.
Nov. 13, 2012 Office Action for JP 2006-312113, 3 pages.
Nov. 20, 2012 Office Action for JP 2006-311830, 3 pages.
Office action for U.S. Appl. No. 14/645,137, dated Apr. 21, 2017, Hirose et al., "Game Apparatus and Storage Medium Storing a Game Program for Conducting Data Communications with a Network", 13 pages.
Office action for U.S. Appl. No. 14/645,137, dated Nov. 30, 2017, Hirose et al., "Game Apparatus and Storage Medium Storing a Game Program for Conducting Data Communications with a Network", 15 pages.
Office action for U.S. Appl. No. 14/645,137, dated Oct. 7, 2016, Hirose et al., Game Apparatus and Storage Medium Storing a Game Program for Conducting Data Communications with a Network, 13 pages.

* cited by examiner

FIG. 10

HEADER INFORMATION OF MESSAGE

- TRANSMISSION SOURCE

- DESTINATION

- SUBJECT

- DATE AND TIME

- IDENTIFICATION INFORMATION OF APPLICATION OF TRANSMISSION SIDE

- RECEPTION NOTIFICATION ATTRIBUTE

- MESSAGE BOARD DISPLAY ON/OFF ATTRIBUTE

- MESSAGE BOARD DATE AND TIME DESIGNATION

- OVERWRITE TAG

- OTHER APPLICATION RESTRICTION

- DISAPPEARANCE ATTRIBUTE

- ALTERNATE NICKNAME

- REPLY ATTRIBUTE

GAME APPARATUS AND STORAGE MEDIUM STORING A GAME PROGRAM FOR CONDUCTING DATA COMMUNICATIONS WITH A NETWORK

CROSS-REFERENCES TO RELATED APPLICATIONS

This is a divisional application of Ser. No. 11/822,791, filed Jul. 10, 2007, which claims the benefit of priority from Japanese Patent Application No. 2006-311671, Japanese Patent Application No. 2006-311830, Japanese Patent Application No. 2006-312113, and Japanese Patent Application No. 2006-312230, all filed on Nov. 17, 2006, the content of each of which is incorporated herein by reference.

FIELD OF PRESENT EXEMPLARY ILLUSTRATIVE EMBODIMENTS

The present exemplary illustrative embodiments relate to a game apparatus and a storage medium storing game program. More specifically, the present exemplary illustrative embodiments relate to a game apparatus and a storage medium storing a game program being capable of executing an application utilizing data via a network.

BACKGROUND AND SUMMARY OF PRESENT EXEMPLARY ILLUSTRATIVE EMBODIMENTS

An example of a game apparatus and storage medium capable of executing an application via a network is disclosed in a Japanese Patent Laid-Open Publication No, 2002-253866 (published Sep. 10, 2002). In this game system, a user who wants to play a communication game makes a prior registration to a game service. The content of the registration is registered in a game server offering the game service. At a time of playing a communication game, a game apparatus logs in to the game server to perform a communication game with other game apparatus which logs in to the game server. The game apparatus can transmit a message to other game apparatus or other device via the game server.

However, in the technique described above, the following problems arise. A user needs to make a prior registration to the game service at a time of playing a game by means of a communication. Furthermore, a developer needs to develop a game server, resulting in higher cost. In addition, in order to transmit a message from one game apparatus to other game apparatus, the one game apparatus needs to log into the game server, and the other game apparatus needs to make a prior registration to the game service. Also, a network program for making a connection with the game service has to be prepared for each game program, resulting in high cost in software.

Additionally, the following problems arise with the technique described above. A game terminal receives mails from all devices, and thus receives a mail from a transmission source undesired by a user. Especially, reception of spam may occur, and therefore, the user cannot safely use the game terminal.

Furthermore, another example of such a game apparatus and storage medium capable of executing an application via a network is disclosed in Japanese Patent Laid-Open Publication No. 2003-23661 (published on Jan. 24, 2003), and in Japanese Patent Laid-Open Publication No. 2005-28103 (published on Feb. 3, 2005). In the first game system, the game data of a plurality of users is registered on a server, and game data is exchanged when an exchange condition is established. In the second game system, game machines make communication by short distance radio to exchange game data with each other.

However, in the first game system described above, a dedicated-server is required, and game data is required to be registered in the server. In the second game system described, the game machines are required to be close to one another, and this has to be done in a state that the same game program is activated.

A further example of a game apparatus and storage medium capable of executing an application via a network is disclosed in Japanese Patent Laid-Open Publication No. 2004-57515 (published on Feb. 28, 2004). In this game system, the following communication game apparatus is recited. The game apparatus has a main system including a main CPU which executes and controls a game by a game program and a communications subsystem including a sub CPU which executes a plurality of different communication function tasks. The communications subsystem has a shared memory accessible by the main CPU and the sub CPU, and also has a resource management task function which manages resources of the shared memory with respect to the plurality of different communication function tasks.

This communications subsystem could also be improved. When a command is received from the main system, downloading is made in response to the command. Thus, the download is not executed independent of the main system. Also, the communications subsystem merely executes downloading for a specific game program operated on the main system.

Therefore, certain present exemplary illustrative embodiments provide a game apparatus and a storage medium storing a game program being capable of offering a communication method in high general versatility with less cost and user's work.

Certain present exemplary illustrative embodiments provide a game apparatus and a storage medium storing a game program which allow a user to eliminate a need of making a prior registration with respect to a game by means of a communication, and allow a wide spectrum of users to participate in the game by means of a communication.

Certain present exemplary illustrative embodiments provide a game apparatus and a storage medium storing a game program allowing a user to play a game by means of a communication without the need of developing a dedicated game server.

Certain present exemplary illustrative embodiments provide a game apparatus and a storage medium storing a game program capable of transmitting and receiving messages of a game by means of a communication with other game apparatuses and other information processors which have not made a prior registration to the game server with respect to the game by means of a communication.

Certain present exemplary illustrative embodiments provide a game apparatus and a storage medium storing a game program capable of offering data between a plurality of game apparatuses without providing a server dedicated for an online game.

Certain present exemplary illustrative embodiments provide a game apparatus and a storage medium storing a game program capable of easily providing data between a plurality of game apparatuses, and increasing opportunities of the provision.

Certain present exemplary illustrative embodiments provide a game apparatus and a storage medium storing a game program capable of executing download for a game application independent of execution of the game application.

Certain present exemplary illustrative embodiments provide a game apparatus and a storage medium storing a game program capable of executing download for a plurality of game applications.

Certain present exemplary illustrative embodiments to provide a game apparatus and a storage medium storing a game program capable of safely transmitting and receiving communication data with other devices.

Certain present exemplary illustrative embodiments provide a game apparatus and a storage medium storing a game program capable of transmitting and receiving communication data with only a desired user.

Certain present exemplary illustrative embodiments adopt the following constructions in order to solve the above-described problems.

A first exemplary illustrative embodiment is a game apparatus capable of executing an application by means of data via a network, comprising a communication means for transmitting and receiving data with other apparatus via the network, a storing means having a transmission data memory area storing transmission data to be transmitted and a reception data memory area storing received reception data, an application processing means for being capable of executing a desired application, and being accessible to the transmission data memory area and the reception data memory area, and a transmission-reception managing means for performing processing of controlling the communication means to communicate with the network, transmitting the transmission data stored in the transmission data memory area to the network, and storing in the reception data memory area reception data capable of identifying a targeted application received from the network, and the application processing means, by executing the application, performs a transmission data storing process for generating transmission data to be transmitted to other apparatus, and making the data identifiable as data for the application and storing it in the transmission data memory area, and a reception data acquiring process for acquiring, in a case that the reception data for the application exists in the reception data memory area, the reception data for the application to execute processing utilizing the reception data, so that utilization of data via the network is performed.

In the first exemplary illustrative embodiment, the game apparatus can execute an application by means of data via a network. A communication means of the game apparatus transmits and receives data with other apparatuses, such as a game apparatus, a PC, a cellular phone, etc. via a network. A storing means has a transmission data memory area storing transmission data to be transmitted and a reception data memory area storing received reception data. An application processing means is capable of executing a desired application, and is accessible to the transmission data memory area and the reception data memory area. A transmission-reception managing means performing processing of controlling the communication means to communicate with the network, transmitting the transmission data stored in the transmission data memory area to the network, and storing in the reception data memory area reception data capable of identifying a targeted application received from the network. An application processing means performs a transmission data storing process and a reception data acquiring process by executing the application to thereby perform utilization of data via a network. Here, the transmission data storing process generates transmission data to be transmitted to other apparatus, and makes the data identifiable as data for the application, and stores it in the transmission data memory area. Furthermore, the reception data acquiring process, in a case that the reception data for the application exists in the reception data memory area, acquires the reception data for the application to execute processing utilizing the reception data, so that utilization of data via the network is performed.

In accordance with the first exemplary illustrative embodiment, the transmission-reception managing means transmits the transmission data stored in the storing means, and receives the reception data capable of identifying applications to store it in the storing means, and therefore, a transmitting and receiving function needs not to be provided for each application. Furthermore, in a case that the transmission data is generated, there is no need to be connected to the network, thereby reducing a useless communication cost.

A second exemplary illustrative embodiment is a game apparatus according to the first exemplary illustrative embodiment comprises a switching means for switching between a normal state in an electric power state allowing execution of the application and a stand-by state in an electric power state not allowing execution of the application by restricting electric power consumption, and the transmission-reception managing means causes the communication means to make a communication in at least the stand-by state.

In the second exemplary illustrative embodiment, in a game apparatus, a switching means switches between a normal state (normal mode) in an electric power state allowing execution of the application and a stand-by state (standby mode) not allowing execution of the application by restricting electric power consumption. The transmission-reception managing means causes the communication means to make a communication in at least the stand-by state.

In accordance with the second exemplary illustrative embodiment, a communication is made in the stand-by state, and therefore, the game apparatus does not have to be activated simultaneously with an opponent's apparatus. That is, it is possible to provide a communication method to a customer with an added convenience.

A third exemplary illustrative embodiment is a game apparatus according to the second exemplary illustrative embodiment comprises a first processing unit being as the application executing means, a second processing unit being as the transmission-reception managing means independent of the first processing unit, and an energization controlling means for energizing the first processing unit and the second processing unit in the normal state, and deenergizing the first processing unit but energizing the second processing unit in the stand-by state on the basis of switching by the switching means.

In the third exemplary illustrative embodiment, the game apparatus has a first processing unit being as the application executing means and the second processing unit being as the transmission-reception managing means independent of the first processing unit. In the normal state, an energization controlling means energizes the first processing unit and the second processing unit on the basis of switching by the switching means. On the other hand, the energization controlling means deenergizes the first processing unit but energizes the second processing unit in the stand-by state on the basis of switching by the switching means.

In accordance with the third exemplary illustrative embodiment, in the stand-by state, only the second processing unit is energized to make electric power consumption less than that in the normal state. Furthermore, even in the stand-by state, the second processing unit is energized, and therefore, it is possible to transmit and receive data even if an application is not executed.

A fourth exemplary illustrative embodiment is a game apparatus according to the first exemplary illustrative embodiment, and the storing means is a nonvolatile memory.

In the fourth exemplary illustrative embodiment, a storing means is a nonvolatile memory like a flash memory.

In accordance with the fourth exemplary illustrative embodiment, utilizing a nonvolatile memory eliminates a need of providing a power supply for backup, thereby realizing less electric power consumption.

A fifth exemplary illustrative embodiment is a game apparatus according to the first exemplary illustrative embodiment, and the transmission-reception managing means deletes the transmission data after transmitting it, and the application processing means performs a deleting process on only the acquired reception data after the reception data acquiring process.

In the fifth exemplary illustrative embodiment, the transmission-reception managing means deletes the transmission data to the network after transmitting it. Furthermore, the application processing means performs a deleting process on only the acquired reception data after the reception data acquiring process. That is, unnecessary data is deleted.

In accordance with the fifth exemplary illustrative embodiment, unnecessary data is deleted, and therefore, it is possible to prevent a storage capacity from being restricted.

A sixth exemplary illustrative embodiment is a game apparatus according to the fifth exemplary illustrative embodiment, and the application processing means further executes an other application data acquiring process for receiving reception data for other application, and does not perform the deleting process in a case that the acquired reception data is the reception data for other application.

In the sixth exemplary illustrative embodiment, the application processing means further executes other application data acquiring process for receiving reception data for other application. However, the application processing means does not perform the deleting process in a case that the acquired reception data is reception data for other application.

According to the sixth exemplary illustrative embodiment, it is possible to save the inconvenience of the reception data for other applications being deleted.

A seventh exemplary illustrative embodiment is a game apparatus according to the first exemplary illustrative embodiment, and the reception data includes application identification information for identifying an application, transmission source information for indicating a transmission source, and overwrite information for indicating whether or not overwriting of data is allowable, the transmission-reception managing means compares application identification information, transmission source information and overwrite information included in the received reception data, and application identification information, transmission source information and overwrite information included in the reception data stored in the reception data memory area, and, in a case that reception data the same in the application identification information, the transmission source information, and the overwrite information as the received reception data is stored in the reception data memory area, overwrites the stored reception data to store the received reception data in the reception data memory area.

In the seventh exemplary illustrative embodiment, the reception data includes application identification information for identifying an application, transmission source information for indicating a transmission source, and overwrite information for indicating whether or not overwriting of data is allowable. The transmission-reception managing means compares application identification information, transmission source information and overwrite information included in the received reception data, and application identification information, transmission source information and overwrite information included in the reception data stored in the reception data memory area. Then, the transmission-reception managing means, in a case that the reception data is the same with respect to the application identification information, the transmission source information, and the overwrite information as the received reception data that is stored in the reception data memory area, overwrites the stored reception data to store the received reception data in the reception data memory area.

In accordance with the seventh exemplary illustrative embodiment, the reception data is overwritten as needed, and therefore, it is possible to prevent useless reception data from being stored in the storing means. That is, it is possible to prevent a storage capacity of the storing means from being restricted.

An eighth exemplary illustrative embodiment is a game apparatus according to the seventh exemplary illustrative embodiment, and the reception data further includes overwrite priority information indicating priority of overwriting, and the transmission-reception managing means overwrites in a case that the priority information of the received reception data shows overwrite priority higher than the priority information of the reception data already stored.

In the eighth exemplary illustrative embodiment, the reception data further includes overwrite priority information indicating priority of overwriting. For example, the priority represents newness and importance of the reception data. The transmission-reception managing means overwrites with the received reception data in a case that the priority information of the received reception data shows overwrite priority higher than the priority information of the reception data already stored. Thus, new reception data and reception data of much importance overwrites the older and less important one.

In accordance with the eighth exemplary illustrative embodiment, with the reception data with a higher priority, overwriting is performed, and therefore, it is possible to save inconvenience like being overwritten with undesired reception data.

A ninth exemplary illustrative embodiment is a game apparatus according to the first exemplary illustrative embodiment, and the transmission data and the reception data are data in an electronic mail format, and transmitted and received with other game apparatus via a mail server.

In the ninth exemplary illustrative embodiment, the transmission data and the reception data are data in an electronic mail format, and transmitted and received with other game apparatus via the mail server.

In accordance with the ninth exemplary illustrative embodiment, electronic mails are transmitted and received with other game apparatus over the mail server, and therefore, the game apparatus communicated with each other does not have to be simultaneously activated. Furthermore, the game apparatus can communicate with a PC and a cellular phone. Thus, it is possible to provide a communication method to a customer with an added convenience.

A tenth exemplary illustrative embodiment is a game apparatus according to the ninth exemplary illustrative embodiment, and the storing means further includes an address book memory area for storing data of an address book to register an e-mail address of a predetermined opponent, and the transmission-reception managing means includes a filtering means for, when the reception data is not transmitted from an opponent registered in said address book, deleting the reception data after reception.

In the tenth exemplary illustrative embodiment, the storing means further includes an address book memory area for storing data of an address book to register an e-mail address of a predetermined opponent. A filtering means, when reception data is not transmitted from an opponent registered in the address book, that is, when a transmission source is not a predetermined opponent (unidentified), deletes the reception data after reception.

In accordance with the tenth exemplary illustrative embodiment, if the transmission source is unidentified, the reception data is deleted, thereby eliminating the need of receiving undesired data. For example, it is possible to automatically delete undesired electronic mail like a spam.

An eleventh exemplary illustrative embodiment is a game apparatus according to the tenth exemplary illustrative embodiment, and further comprises a notifying means for, when an e-mail address is added to the address book, generating transmission data with a predetermined content directed to the e-mail address, and storing it in the transmission data memory area, and a registering means for, in a case that the reception data transmitted from the added e-mail address is acquired from the reception data storing means, registering the e-mail address as an opponent with whom data is allowed to be transmitted and received.

In the eleventh exemplary illustrative embodiment, a notifying means, when an e-mail address is added to the address book, generates transmission data with a predetermined content directed to the e-mail address, and stores it in the transmission data memory area. The registering means, in a case that the reception data transmitted from the added e-mail address is acquired from the reception data storing means, registers the e-mail address as an opponent with whom data is allowed to be transmitted and received.

In accordance with the eleventh exemplary illustrative embodiment, by receiving a notification from the opponent which has been input in the address book, the opponent is registered as an opponent with whom data is allowed to be transmitted and received, thereby realizing an easy registration.

A twelfth exemplary illustrative embodiment is a game apparatus according to the ninth exemplary illustrative embodiment, and the application includes a message application for creating and viewing a message in the electronic mail format, and the message application stores a created message in the storing means in the electronic mail format, and displays the acquired message from the storing means on a display.

In the twelfth exemplary illustrative embodiment, the application includes a message application for creating and viewing a message in the e-mail format. The message application stores a created message in the storing means in the electronic mail format, and displays the acquired message from the storing means on a display.

In accordance with the twelfth exemplary illustrative embodiment, during execution of the application, it is possible to create and view a message.

A thirteenth exemplary illustrative embodiment is a game apparatus according to the twelfth exemplary illustrative embodiment, and the message application, when a destination of the created message is an e-mail address of the game apparatus of its own, stores the message in the reception data area in the electronic mail format.

In the thirteenth exemplary illustrative embodiment, the message application, when a destination of the created message is an e-mail address of the game apparatus of its own, stores the message in the reception data memory area in the electronic mail format.

In accordance with the thirteenth exemplary illustrative embodiment, the message directed to the game apparatus of its own is directly stored in the reception data memory area, eliminating a need of a useless communication like transmitting and receiving via the mail server. Furthermore, even if the game apparatus is not connected to the network, the game apparatus can transmit a message to the game apparatus itself, it can be used as an individual notepad, and a message board for home use.

A fourteenth exemplary illustrative embodiment is a game apparatus according to the first exemplary illustrative embodiment, and the application processing means performs a pausing process to request the transmission-reception managing means to temporarily prohibit transmission and reception before and after any one of the transmission data storing process and the reception data acquiring process.

In the fourteenth exemplary illustrative embodiment, the application processing means temporarily stops transmission and reception by the transmission-reception managing means before and after any one of the transmission data storing process and the reception data acquiring process. For example, when the application reads the data from the storing means, after the transmission-reception managing means transmits transmission data, transmitting and receiving data is temporarily stopped. After the application completes reading the data, when transmitting and receiving the data is restarted, the transmission-reception managing means receives the reception data.

In accordance with the fourteenth exemplary illustrative embodiment, transmitting and receiving data by the transmission-reception managing means can be stopped or restarted, and therefore, it is possible to prevent a processing speed of an application from being drastically reduced, a communication response from being lowered, an unnecessary time to access the storing means from being taken, and so forth.

A fifteenth exemplary illustrative embodiment is a game apparatus according to the first exemplary illustrative embodiment, and the application processing means further executes a normal communication process for communicating with the network without passing through the transmission data storing process and the reception data acquiring process, and a pausing process for requesting the transmission-reception managing means to temporarily prohibit the transmission and the reception during performing the normal communication process.

In the fifteenth exemplary illustrative embodiment, a normal communication process communicates with the network without passing through the transmission data storing process and the reception data acquiring process. For example, in the game application, a game apparatus can execute a communication game by communicating with other game apparatus connected over a network. A pausing process requests the transmission-reception managing means to temporarily prohibit the transmission and the reception during performing the normal communication process.

In accordance with the fifteenth exemplary illustrative embodiment, similarly to the thirteenth exemplary illustrative embodiment, transmitting and receiving data by the transmission-reception managing means can be stopped or restarted, and therefore, it is possible to prevent a processing speed of an application from being drastically reduced, a communication response from being lowered, an unnecessary time to access the storing means from being taken, and so forth.

A sixteenth exemplary illustrative embodiment is a game apparatus according to any one of the first to fourteenth exemplary illustrative embodiments, and the application processing means stores in the transmission data memory area transmission data including transmission stand-by information indicative of holding transmission in the transmission data storing process, and the transmission-reception managing means sets the transmission data in a transmittable state by deleting the transmission stand-by information included in the transmission data in a case that the reception data includes reply request information.

In the sixteenth exemplary illustrative embodiment, the application processing means stores transmission data including transmission stand-by information indicative of holding transmission in the transmission data memory area in the transmission data storing process. The transmission-reception managing means sets the transmission data in a transmittable state by deleting the transmission stand-by information included in the transmission data in a case that the reception data includes reply request information. Thereafter, the transmission data is transmitted.

In accordance with the sixteenth exemplary illustrative embodiment, when data including reply request information is transmitted, data including transmission stand-by information is automatically transmitted by being released from the holding state in response thereto. That is, it is possible to automatically transmit data in response to a request from the opponent.

A seventeenth exemplary illustrative embodiment is a game apparatus according to the first exemplary illustrative embodiment, and the application processing means stores transmission data including transmission stand-by information indicative of holding transmission in the transmission data memory area in the transmission data storing process, and the transmission-reception managing means for creating transmittable transmission data by storing a copy of the transmission data from which the transmission stand-by information is deleted in the transmission data memory area in a case that the reception data includes reply request information.

The seventeenth exemplary illustrative embodiment is the same as the fifteenth exemplary illustrative embodiment except for that in a case that the reception data including reply request information is received, a copy of the transmission data including the transmission stand-by information is stored in the transmission data memory area to thereby make the transmission data transmittable.

In accordance with the seventeenth exemplary illustrative embodiment, a copy of the transmission data can be automatically transmitted, and therefore, the same transmission data can be transmitted to a plurality of opponents.

An eighteenth exemplary illustrative embodiment is a game apparatus according to the first exemplary illustrative embodiment, and the storing means further includes a download data memory area for storing download data to be downloaded from a download server, further comprises a download managing means for executing processing of causing the communication means to make a communication with the network in a preset schedule, and storing download data identifiable with a targeted application downloaded from the network for each targeted application in the download data memory area, and the application processing means performs processing including a download data acquiring process for reading the download data for the application in a case that the download data for the application exists in the download data memory area.

In the eighteenth exemplary illustrative embodiment, the storing means further includes a download data memory area for storing download data (content) to be downloaded from a download server. A download managing means executes processing of causing the communication means to make a communication with the network in a preset schedule, and storing download data identifiable with a targeted application downloaded from the network for each targeted application in the download data memory area. The application processing means performs processing including a download data acquiring process for reading the download data for the application in a case that the download data for the application exists in the download data memory area. This makes it possible to utilize data via the network in an application.

In accordance with the eighteenth exemplary illustrative embodiment, the data utilized in the application can be acquired via the network. For example, in the game application, data of a game map, and a game item can be added in correspondence with the progress of the game. Furthermore, the download data can be identified for each application, and download data of various applications can be managed by one memory, and thus realizes cost-cutting.

A nineteenth exemplary illustrative embodiment is a game apparatus according to the eighteenth exemplary illustrative embodiment, and further comprises a notification data storing means for storing notification data for indicating a notification to a user out of the download data in the reception data memory area.

In the nineteenth exemplary illustrative embodiment, a notification data storing means, if download data is notification data for notification to a user, stores the download data in the reception data memory area.

In accordance with the nineteenth exemplary illustrative embodiment, in a case that the download data is notification data, the data is stored in the reception data memory area, and therefore, it is possible to transmit a message from the administrator as well as data to be utilized in the application from the download server.

A twentieth exemplary illustrative embodiment is a game apparatus transmitting and receiving data with other apparatus via a network, and executing a game program for utilizing the transmitted and received data, and comprises a communication portion, a transmission-reception managing means, a reply data storing means, a reception data storing means, a game processing means, a reception data determining means, and an automatically replying means. The communication portion transmits and receives data. The transmission-reception managing means causes the communication portion to transmit and receive data. The reply data storing means stores predetermined reply data for an auto-reply. The reception data storing means stores received reception data. The game processing means executes a game program designated by a user, and utilizes the reception data. The reception data determining means, in a case that the transmission-reception managing means transmits and receives data and receives the data, stores the received reception data in the reception data storing means, and determines whether or not reply request information for indicating a request of a reply is included in the reception data. The automatically replying means automatically reads the reply data from the reply data storing means, and transmits it via the communication portion in a case that the reception data stored in the reception data storing means includes the reply request information.

In the twentieth exemplary illustrative embodiment, the game apparatus transmits and receives data with other apparatus via a network, and executes a game program for utilizing the transmitted and received data. A communication portion transmits and receives data, and the transmission-reception managing means causes the communication portion to transmit and receive data. A reply data storing means stores predetermined reply data for an auto-reply. A reception data storing means stores received reception data. A game processing means executes a game program designated by a user, and utilizes the reception data stored by the reception data storing means at this time. A reception data determining means, in a case that the transmission-reception managing means transmits and receives data and receives the data, stores the received reception data in the reception data storing means, and then determines whether or not reply request information for indicating a request of a reply is included in the reception data. The automatically replying means automatically reads the reply data from the reply data storing means, and transmits it via the communication portion in a case that the reception data stored in the reception data storing means includes the reply request information. However, the reply data is transmitted to the apparatus from which a reply request is made.

In accordance with the twentieth exemplary illustrative embodiment, a reply to the received data can be automatically performed, and therefore, even when an online game is not played, it is possible to transmit and receive data with other game machine.

A twenty-first exemplary illustrative embodiment is a game apparatus according to the twentieth exemplary illustrative embodiment, and the automatically replying means deletes the reply data from the reply data storing means after completion of transmitting the reply data.

In the twenty-first exemplary illustrative embodiment, the automatically replying means deletes the reply data from the reply data storing means after completion of transmitting the reply data.

In accordance with the twenty-first exemplary illustrative embodiment, an auto-reply can be performed only once.

A twenty-second exemplary illustrative embodiment is a game apparatus according to the twentieth exemplary illustrative embodiment, and the automatically replying means reads and sends back the reply data every time that data is received.

In the twenty-second exemplary illustrative embodiment, unlikely to the second exemplary illustrative embodiment, the automatically replying means reads and transmits reply data every time that the data is received. For example, a copy of the reply data is transmitted.

According to the twenty-second exemplary illustrative embodiment, it is possible to perform an auto-reply without limit on the number of times.

A twenty-third exemplary illustrative embodiment is a game apparatus according to a twenty-first exemplary illustrative embodiment, and the game processing means is for executing a game program for dealing with an item in a game via the network, the reply data includes data relating to the item and the reception data including the reply request information further includes indication information of intent to agree with dealing with the item. In the automatically replying means, transmission data including data relating to the item is transmitted in response to the reception data including the reply request information to thereby get a deal in the game.

In the twenty-third exemplary illustrative embodiment, the game processing means executes a game program for dealing with an item in a game via the network. The reply data includes data relating to the item. If the reply data includes reply request information, indication information of intent to agree with dealing with the item is further included. In response to the received reception data included in the reply request information by the automatically replying means, the transmission data relating to the item is transmitted to the other apparatus which has transmitted a reply request. Thus, it is possible to get a deal in the game.

In accordance with the twenty-third exemplary illustrative embodiment, it is possible to deal with an item with other game machine by communication even when the user does not play a game.

A twenty-fourth exemplary illustrative embodiment is a game apparatus according to the twenty-third exemplary illustrative embodiment, and the game processing means includes a notifying process for causing the communication portion to transmit notification data for notifying a deal.

In the twenty-fourth exemplary illustrative embodiment, the game processing means causes the communication portion to transmit notification data for notifying a deal.

In accordance with the twenty-fourth exemplary illustrative embodiment, it is possible to provide notification to the user in advance to thereby prompt the user to deal with an item.

A twenty-fifth exemplary illustrative embodiment is a game apparatus furnished with a communication portion for transmitting and receiving data with a network and a storing portion having a download data memory area for storing received download data, and being capable of executing an application by utilizing the data downloaded via the network comprises an application processing means for executing an arbitrary application designated by a user, a task storing means for storing communication schedule data including at least download destination information for each application, and a download managing means for executing processing of reading communication schedule data from the task storing means, causing the communication portion to communicate with the network on the basis of the communication schedule to download predetermined data, storing in the download data memory area download data identifiable with the targeted application downloaded from the network for each targeted application, and the application processing means, in a case that the download data for the application exists in the download data memory area, executes processing including a download data acquiring process for reading the download data for the application to thereby perform utilization of data via the network.

In the twenty-fifth exemplary illustrative embodiment, the game apparatus is furnished with a communication portion for transmitting and receiving data with a network and a storing portion having a download data memory area, and being capable of executing an application by utilizing the data downloaded via the network. A download area stores received download data. An application processing means executes an arbitrary application designated by a user. A task storing means includes communication schedule data including at least download destination information (address, etc. of download server) for each application. A download managing means causes the communication portion to communicate with the network on the basis of the communication schedule to download predetermined data. Furthermore, the download managing means performs processing of storing in the download data memory area download load data identifiable with the targeted application downloaded from the network for each targeted application. That is, the download data is stored in correspondence with the targeted application. The application processing means, in a case that the download data for the application exists in the download data memory area, executes processing including a download data acquiring process for reading the download data for the application to thereby perform utilization of data via the network.

In accordance with the twenty-fifth exemplary illustrative embodiment, it is possible to download data independent of the application, that is, except when the application is executed, and therefore, the user does not have to continuously instruct download during execution of the application. Thus, it is possible to download data of a plurality of applications.

A twenty-sixth exemplary illustrative embodiment is a game apparatus according to the twenty-fifth exemplary illustrative embodiment, and the application processing means further performs a task registering process for storing the communication schedule data in the task storing means.

In the twenty-sixth exemplary illustrative embodiment, the application processing means further performs a task registering process for storing the communication schedule data in the task storing means. That is, during execution of an application, a download task for the application is registered.

In accordance with the twenty-sixth exemplary illustrative embodiment, the application can make the game machine execute download for the application as necessary.

A twenty-seventh exemplary illustrative embodiment is a game apparatus according to the twenty-fifth exemplary illustrative embodiment, and the communication schedule data includes the remaining number of times of downloading, and the download managing means decrements the remaining number of times every time of downloading so as to update it.

In the twenty-seventh exemplary illustrative embodiment, the communication schedule data includes the remaining number of times of downloading. The download managing means decrements the remaining number of times every time of downloading so as to update it.

In accordance with the twenty-seventh exemplary illustrative embodiment, by restricting the number of times of downloading, it is possible to prevent continuous wasteful downloading from being performed even after the data is not needed, eliminating the need of deleting an unnecessary schedule by the user on his own.

A twenty-eighth exemplary illustrative embodiment is a game apparatus according to the twenty-seventh exemplary illustrative embodiment, and the download managing means deletes the communication schedule data having the remaining number of times of zero from the task storing means.

In the twenty-eighth exemplary illustrative embodiment, the download managing means automatically deletes the communication schedule data from the task storing means when the remaining number of times of downloading is zero.

In accordance with the twenty-eighth exemplary illustrative embodiment, similarly to the twenty-seventh exemplary illustrative embodiment, by restricting the number of times of downloading, it is possible to prevent continuous wasteful downloading from being performed even after the data is not needed, eliminating the need of deleting an unnecessary schedule by the user on his own.

A twenty-ninth exemplary illustrative embodiment is a game apparatus according to the twenty-seventh exemplary illustrative embodiment, and the download managing means further performs error detecting processing for detecting a communication error and not performing update of the remaining number of times if an error is detected.

In the twenty-ninth exemplary illustrative embodiment, the download managing means further performs error detecting processing for detecting a communication error due to stop of the download server, etc. In this case, the remaining number of times of downloading is not updated.

In accordance with the twenty-ninth exemplary illustrative embodiment, it is possible to prevent the download from being ended without executing the download due to an error of the network, the server, etc.

A thirtieth exemplary illustrative embodiment is a game apparatus according to the twenty-fifth exemplary illustrative embodiment, and further comprises a time outputting means for outputting data indicative of a time, and the communication schedule data includes an interval of downloading, and the download managing means determines a estimated time for next download on the basis of the downloading hour and the interval.

In the thirtieth exemplary illustrative embodiment, a time outputting means outputs data indicative of a time. The communication schedule data includes an interval of downloading. The download managing means determines an estimated time for next download on the basis of the downloading hour and the interval for downloading. That is, a download task is scheduled.

In accordance with the thirtieth exemplary illustrative embodiment, it is possible to set repetition of the downloading at suitable timings.

A thirty-first exemplary illustrative embodiment is a game apparatus according to the thirtieth exemplary illustrative embodiment, and the communication schedule data further includes a past time indicative of how long a downloading hour can be past from the estimated time for next download, the download managing means deletes the communication schedule data in a case that the past time expires without the downloading being made from the estimated time.

In the thirty-first exemplary illustrative embodiment, the communication schedule data includes a past time (allowable time) indicative of how long a downloading hour can be past from the estimated time for next download. The download managing means deletes the communication schedule data in a case that the past time expires without the downloading being made from the estimated time.

In accordance with the thirty-first exemplary illustrative embodiment, if there is a time during which no downloading is performed due to some reasons, it is possible to prevent the data which becomes useless after expiration of the period from being downloaded.

A thirty-second exemplary illustrative embodiment is a game apparatus according to the twenty-fifth exemplary illustrative embodiment, and the game apparatus is a game apparatus switchable between a normal state of being a normal energized state and allowing execution of the application, and a stand-by state restricting electric power consumption and not allowing execution of the application, and the download managing means causes the communication portion to make a communication in at least the stand-by state.

In the thirty-second exemplary illustrative embodiment, the game apparatus is switchable between a normal state and a stand-by state. The normal state is a normal energized state, and means that execution of an application is possible. Furthermore, the stand-by state means a state in which electric power consumption is restricted and execution of the application is impossible. The download managing means causes the communication portion to make a communication in at least the stand-by state. That is, even when an application is not activated, downloading is executed.

In accordance with the thirty-second exemplary illustrative embodiment, it is possible to download even during the stand-by state in which execution of the application is impossible, and therefore, when the user activates a game apparatus application to execute it, desired data can already been downloaded, making it possible for the user to effectively use the time.

A thirty-third exemplary illustrative embodiment is a game apparatus transmitting and receiving data via a network with other apparatus, and executing an application by means of data transmitted and received with an apparatus registered in advance as a destination with which a communication is allowable, comprises a communication portion for transmitting and receiving data, a destination storing means for storing destination data indicative of a destination, a destination input means for adding destination data indicative of a predetermined destination to the destination storing means, a first notifying means for, in a case that destination data is added by the destination input means, automatically generating predetermined data to an apparatus indicated by the added destination and causing the communication portion to transmit it via the network, and a registering means for, in a case that predetermined data is received from the apparatus indicative of the added destination after completion of transmitting and receiving the data by the first notifying means, registering the destination data as a communication allowable destination.

In the thirty-third exemplary illustrative embodiment, a game apparatus transmits and receives data via a network with other apparatus, and executes an application by means of data transmitted and received with an apparatus registered in advance as a destination with which a communication is allowable. A communication portion transmits and receives data. A destination storing means stores destination data indicative of a destination. A destination input means adds destination data indicative of a predetermined destination to the destination storing means. For example, a destination of a device like a game apparatus used by a desired user, etc. is added. A first notifying means, in a case that destination data is added by the destination input means, automatically generates predetermined data to an apparatus indicated by the added destination, and causes the communication portion to transmit it via the network. For example, data indicating that the destination is registered is transmitted to the apparatus with the destination. The registering means, in a case that predetermined data is received from the apparatus indicative of the added destination after completion of transmitting and receiving the data by the first notifying means, registers the destination data as a communication allowable destination.

In accordance with the thirty-third exemplary illustrative embodiment, it is possible to register a destination for transmitting and receiving communication data only with a desired user.

A thirty-fourth exemplary illustrative embodiment is a game apparatus according to the thirty-third exemplary illustrative embodiment, and executes an application by means of data transmitted and received between game apparatuses each of which registers each other's destination data. The destination is a destination for designating a game apparatus, and the game apparatus further comprises a second notifying means for, after registering the destination data in the registering means, automatically generating predetermined data to the destination, and causing the communication portion to transmit it via the network. The registering means, after transmitting the data by the first notifying means, in a case that predetermined data generated in the first notifying means or the second notifying means of the game apparatus to be designated by the destination is received, registers the destination data.

In the thirty-fourth exemplary illustrative embodiment, the game apparatus executes an application by means of data transmitted and received between game apparatuses each of which registers each other's destination data. In this case, the destination is a destination for designating a game apparatus. A second notifying means, after registering the destination data in the registering means, automatically generates predetermined data to the destination, and causes the communication portion to transmit it via the network. The registering means, after transmitting the data by the first notifying means, in a case that predetermined data generated in the first notifying means or the second notifying means of the game apparatus to be designated by the destination is received, registers the destination data.

In accordance with the thirty-fourth exemplary illustrative embodiment, in a case that communication data is transmitted and received between the same kinds of the game apparatuses of only the desired users, the both perform the same processing to thereby confirm that the both of the game apparatuses register each other's destinations.

A thirty-fifth exemplary illustrative embodiment is a game apparatus according to the thirty-third exemplary illustrative embodiment, and the destination is an e-mail address, and the first notifying means generates data in an electronic mail format to the destination, and the registering means registers the destination data in a case that a reply mail to the data in an electronic mail format is received.

In the thirty-fifth exemplary illustrative embodiment, the destination is an email address. Accordingly, the first notifying means generates data in an electronic mail format to the destination. The registering means registers the destination data in a case that a reply mail to the data in an electronic mail format is received.

In accordance with the thirty-fifth exemplary illustrative embodiment, the data is transmitted and received in an electronic mail format, and therefore, it is possible to make a communication between a game apparatus and other versatile terminals.

A thirty-sixth exemplary illustrative embodiment is a game apparatus according to the thirty-third, and further comprises a filtering means for, in a case that data except for the registered destination is received, deleting the data.

In the thirty-sixth exemplary illustrative embodiment, a filtering means, in a case that data except for the registered destination is received, deletes the data. For example, an undesirable mail like a spam is deleted.

In accordance with the thirty-sixth exemplary illustrative embodiment, it is possible to set so as not to receive data from an unregistered destination.

A thirty-seventh exemplary illustrative embodiment is a storage medium storing a game program of a game apparatus having a communication means for transmitting and receiving data via a network with other apparatus, and a storing means having a transmission data memory area for storing transmission data to be transmitted and a reception data memory area for storing received reception data, and allowing execution of an application by means of data via the network, the game program makes a computer of the game apparatus function as an application processing means for being capable of executing a desired application, and being accessible to the transmission data memory area and the reception data memory area, and a transmission-reception managing means for performing processing of controlling the communication means to communicate with a network, and transmitting the transmission data stored in the transmission data memory area to the network, and storing in the reception data memory area reception data capable of identifying a targeted application received from the network. The application processing means, by executing the application, performs a transmission data storing process for generating transmission data to be transmitted to other apparatus, and making the data identifiable as data for the application and storing it in the transmission data memory area, a reception data acquiring process for, in a case that the reception data for the application exists in the reception data memory area, acquiring the reception data for the application to execute processing utilizing the reception data, so that utilization of data via the network is performed.

In the thirty-seventh exemplary illustrative embodiment also, similarly to the first exemplary illustrative embodiment, it is possible to provide a communication method in high general versatility with less cost and user's work.

A thirty-eighth exemplary illustrative embodiment is a game program of a game apparatus transmitting and receiving data with other apparatus via a network and utilizing the transmitted and received data, and the game program causes a computer of the game apparatus to function as a communication portion, a transmission-reception managing means, a reply data storing means, a reception data storing means, a game processing means, a reception data determining means, and an automatically replying means. The communication portion transmits and receives data. The transmission-reception managing means causes the communication portion to transmit and receive data. The reply data storing means stores predetermined reply data for an auto-reply. The reception data storing means stores received reception data. The game processing means executes a game program designated by a user to perform game processing by means of the reception data. The reception data determining means, in a case that the transmission-reception managing means transmits and receives data and receives the data, stores the received reception data in the reception data storing means, and determines whether or not reply request information for indicating a request of a reply is included in the reception data. The automatically replying means automatically reads the reply data from the reply data storing means, and transmits it via the communication portion in a case that the reception data stored in the reception data storing means includes the reply request information.

In the thirty-eighth exemplary illustrative embodiment also, similarly to the twentieth exemplary illustrative embodiment, a reply to the received data can be automatically performed, and therefore, even when an online game is not played, it is possible to transmit and receive data with other game machine.

A thirty-ninth exemplary illustrative embodiment is a game program of a game apparatus provided with a communication portion for transmitting and receiving data with a network and a storing portion having a download data memory area for storing received download data and being capable of executing an application by means of the data downloaded via the network. The game program makes a computer of the game apparatus to function as an application processing means for executing an arbitrary application designated by a user, a task storing means for storing communication schedule data including at least download destination information for each application, and a download managing means for executing processing of reading communication schedule data from the task storing means, causing the communication portion to communicate with the network on the basis of the communication schedule to download predetermined data, and storing in the download data memory area download data identifiable with the targeted application downloaded from the network for each targeted application. The application processing means, in a case that the download data for the application exists in the download data memory area, executes processing including a download data acquiring process for reading the download data for the application to thereby perform utilization of data via the network.

In the thirty-ninth exemplary illustrative embodiment also, similarly to the twenty-fifth exemplary illustrative embodiment, it is possible to download data except during execution of the application, and therefore, the user does not have to continuously instruct download during execution of the application.

A fortieth exemplary illustrative embodiment is a game program of a game apparatus transmitting and receiving data via a network with other apparatus, and executing an application by means of data transmitted and received with an apparatus registered in advance as a destination with which a communication is allowable. The game program makes a computer of the game apparatus function as a communication portion for transmitting and receiving data, a destination storing means for storing destination data indicative of a destination, a destination input means for adding destination data indicative of a predetermined destination to the destination storing means, a first notifying means for, in a case that destination data is added by the destination input means, automatically generating predetermined data to an apparatus indicated by the added destination and causing the communication portion to transmit it via the network, and a registering means for, in a case that predetermined data is received from the apparatus indicative of the added destination after completion of transmitting and receiving the data by the first notifying means, registering the destination data as a communication allowable destination.

In the fortieth exemplary illustrative embodiment also, similarly to the thirty-third exemplary illustrative embodiment, it is possible to register a destination for transmitting and receiving communication data only with a desired user.

BRIEF DESCRIPTION OF THE DRAWINGS

FIG. 10 is an illustrative view showing header information of a message transmitted and received between game apparatuses;

DETAILED DESCRIPTION OF THE INVENTION

Figure 1:
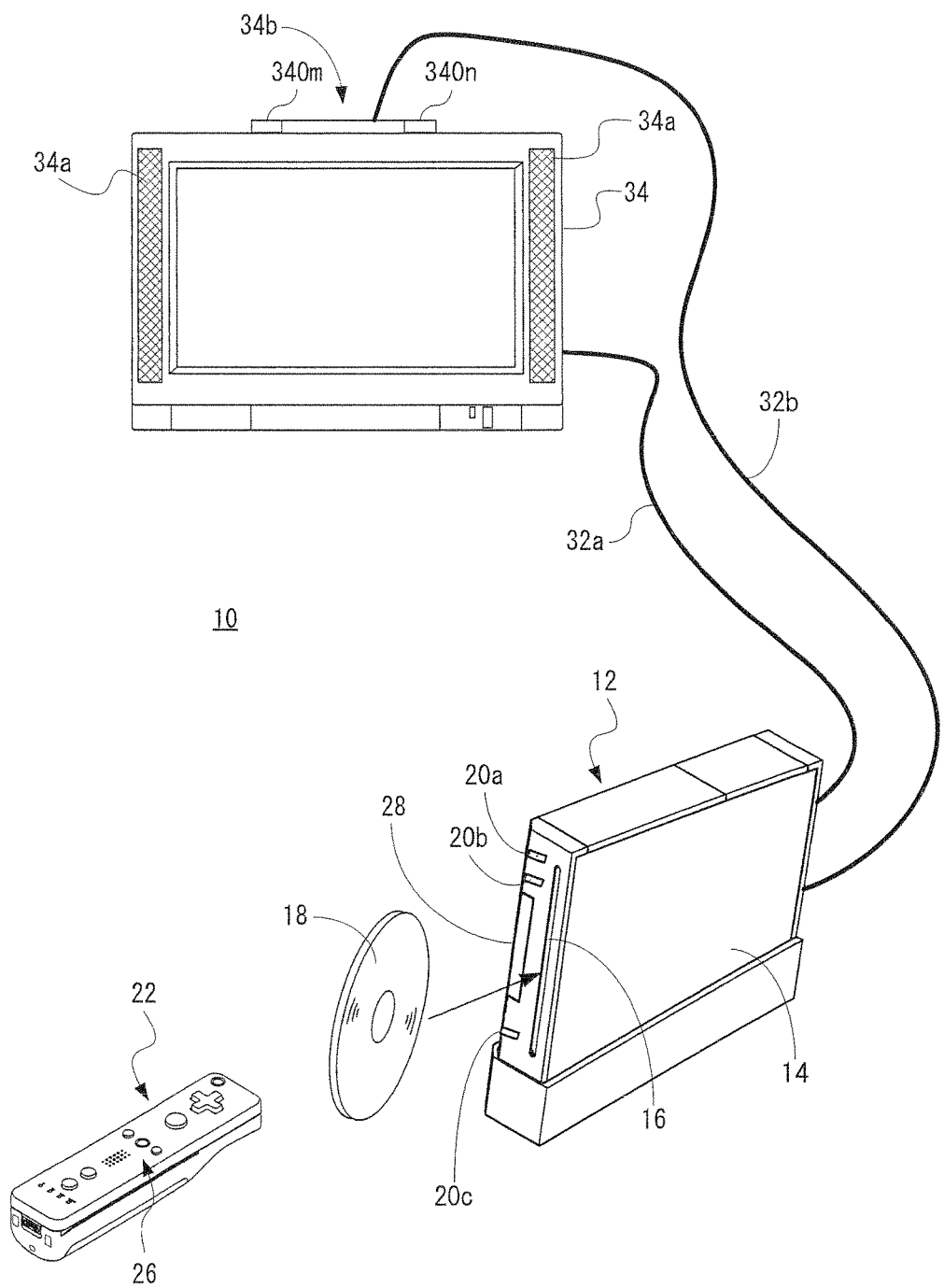
FIG. 1 is an illustrative view of a game system in accordance with one embodiment of the present exemplary illustrative embodiment.

Referring to FIG. 1, a game system 10 being one embodiment of the present exemplary illustrative embodiment includes a game apparatus (hereinafter referred to as "game apparatus") 12 and a controller 22. Additionally, in this embodiment, the game apparatus 12 is designed so as to be communicably connectable with a maximum of four controllers 22. Also, the game apparatus 12 and each of the controllers 22 are connected by radio. For example, wireless communication is executed according to Bluetooth (registered trademark) standard, and may be executed by other standards, such as infrared rays and wireless LAN.

The game apparatus 12 includes a roughly rectangular parallelepiped housing 14, and the housing 14 is provided with a disk slot 16 on a front surface. An optical disk 18 as one example of an information storage medium storing game program, etc. is inserted into the disk slot 16 to be loaded in a disk drive 54 (see FIG. 2) within the housing 14. Around the disk slot 16, an LED and a light guide plate are arranged so as to be turned on in response to various processing.

Furthermore, on a front surface of the housing 14 of the game apparatus 12, a power button 20a and a reset button 20b are provided at the upper part thereof, and an eject button 20c is provided below them. In addition, a connector cover for external memory card 28 is provided between the reset button 20b and the eject button 20c, and in the vicinity of the disk slot 16. Inside the connector cover for external memory card 28, an external connector for memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card. Also, the memory card may be utilized as a backup memory of the internal memory.

It should be noted that as a memory card, a general-purpose SD card can be employed, but other general-purpose memory cards, such as memory sticks, multimedia cards (registered trademark) can be employed.

The game apparatus 12 has an AV cable connector 58 (FIG. 2) on the rear surface of the housing 14, and by utilizing the AV cable connector 58, a monitor 34 and a speaker 34a are connected to the game apparatus 12 through an AV cable 32a. The monitor 34 and the speaker 34a typically are a color television receiver, and through the AV cable 32a, a video signal from the game apparatus 12 is input to a video input terminal of the color television, and a sound signal is input to a sound input terminal. Accordingly, a game image of a three-dimensional (3D) video game, for example, is displayed on the screen of the color television (monitor) 34, and stereo game sound, such as a game music, a sound effect, etc. is output from right and left speakers 34a. Around the monitor 34 (on the top side of the monitor 34, in this embodiment), a marker unit 34b including two infrared ray LEDs (markers) 34m and 34n is provided. The marker unit 34b is connected to the game apparatus 12 through a power source cable 32b. Accordingly, the marker unit 34b is supplied with power from the game apparatus 12. Thus, the markers 34m and 34n emit lights in front of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 storing a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the input means 26, a game or other application is started. Besides the operation with respect to the input means 26, by moving the controller 22 itself, it is possible to move a moving image object (player object) in different directions or change the perspective of the user (camera position) in a 3-dimensional game world.

Figure 2:
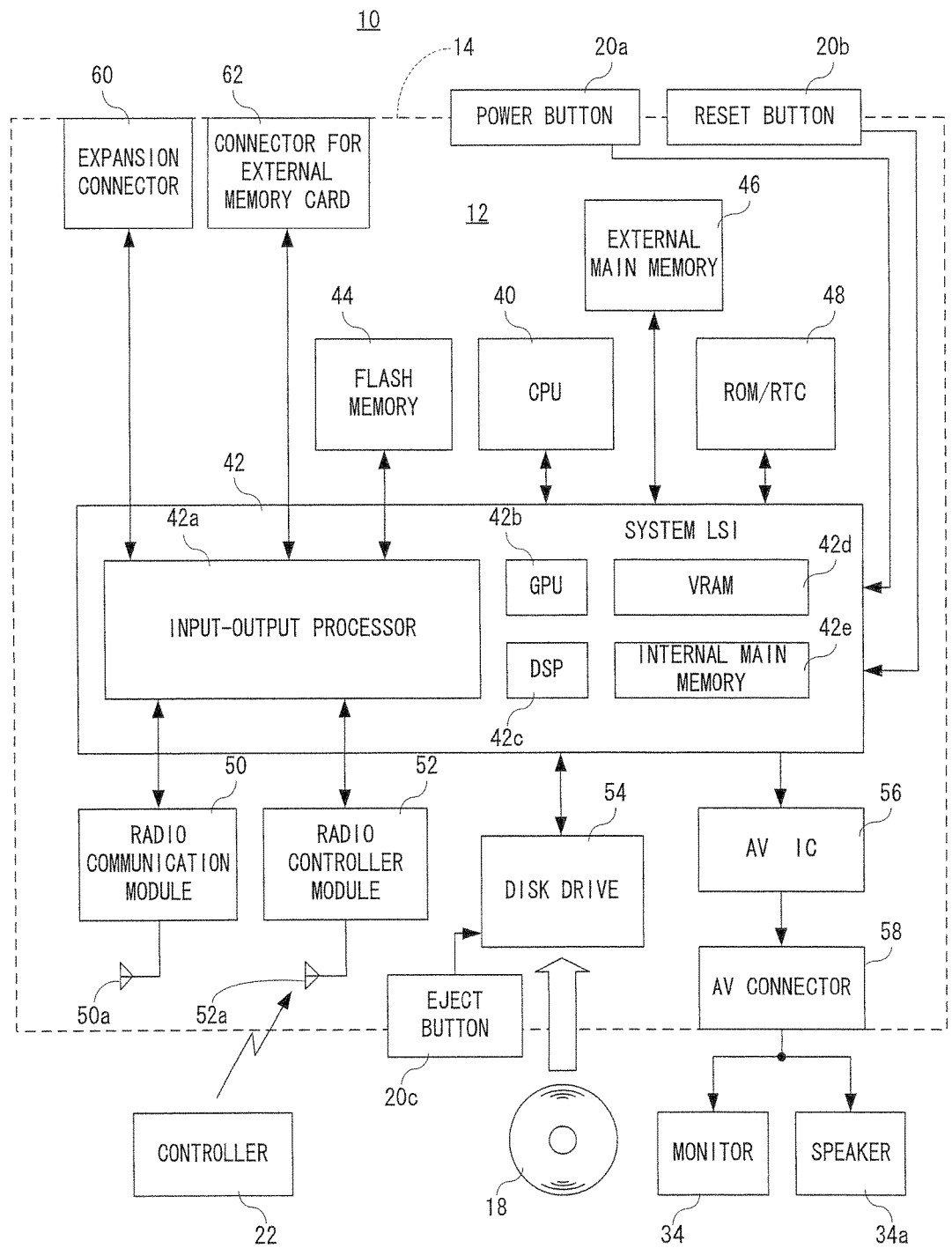
FIG. 2 is a block diagram showing an electric configuration of the game system in FIG. 1.

FIG. 2 is a block diagram of an electric configuration of the video game system 10 in FIG. 1 embodiment. Although illustration is omitted, the respective components within the housing 14 are contained on a printed board. As shown in FIG. 2, the game apparatus 12 has a CPU 40. The CPU 40 functions as a game processor. The CPU 40 is connected to a system LSI 42, The system LSI 42 is connected with an external main memory 46, a ROM/RTC 48, a disk drive 54, and an AV IC 56.

The external main memory 46 stores programs like a game program, etc., stores various data, and is utilized as a work area and a buffer area of the CPU 40. The ROM/RTC 48, the so-called boot ROM, is incorporated with a program for activating the game apparatus 12, and provided with a time circuit for counting a time. The disk drive 54 reads program data, texture data, etc. from the optical disk 18, and writes it in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e, and these are connected with each other by internal buses although illustration is omitted.

The input-output processor (I/O processor) 42a executes transmission and reception of data, downloads of data, and so forth. A detailed description is made later as to transmission and reception and download of the data.

The GPU 42b is made up of a part of a rendering means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire the data (image data: data such as polygon data, texture data, etc.) required to execute the construction command. Additionally, the CPU 40 writes the image data required for drawing to the VRAM 42d via the GPU 42b. The GPU 42b accesses the VRAM 42d to create game image data for drawing.

In this embodiment, a description is made on a case that the GPU 42b generates game image data, but in a case of executing an arbitrary application except for the game application, the GPU 42b generates image data as to the arbitrary application.

Furthermore, the DSP 42c functions as an audio processor, and generates audio data corresponding to a sound, a voice, music, or the like by means of the sound data and the sound wave (tone) data stored in the internal main memory 42e and the external main memory 46.

The game image data and audio data generated as described above are read by the AV IC 56, and output to the monitor 34 and the speaker 34a via the AV connector 58. Accordingly, a game screen is displayed on the monitor 34, and a sound (music) necessary for the game is output from the speaker 34a.

Furthermore, the input-output processor 42a is connected with an expansion connector 60 and a connector for memory card 62 as well as a flash memory 44, radio communication module 50 and a radio controller module 52. The radio communication module 50 is connected with an antenna 50a, and the radio controller module 52 is connected with an antenna 52a.

The input-output processor 42a can communicate with other game apparatuses and various servers to be connected to a network via a radio communication module 50. It should be noted that it is possible to directly communicate with other game apparatus without going through the network. The input-output processor 42a periodically accesses the flash memory 44 to detect the presence or absence of data (referred to as transmission data) being required to be transmitted to a network, and, in a case that the transmission data is present, transmits it to the network via the radio communication module 50 and the antenna 50a. Furthermore, the input-output processor 42a receives data (referred to as reception data) transmitted from other game apparatuses via the network, the antenna 50a and the radio communication module 50, and stores the reception data in the flash memory 44. If the reception data does not satisfy a predetermined condition, the reception data is abandoned as it is. In addition, the input-output processor 42a receives data (download data) downloaded from the download server via the network, the antenna 50a and the radio communication module 50, and store the download data in the flash memory 44.

Furthermore, the input-output processor 42a receives input data transmitted from the controller 22 via the antenna 52a and the radio controller module 52, and temporarily stores it in the buffer area of the internal main memory 42e or the external main memory 46. The input data is erased from the buffer area after being utilized in the game processing by the CPU 40.

In this embodiment, as described above, the radio controller module 52 performs communication with the controller 22 in accordance with Bluetooth standards.

In addition, the input-output processor 42a is connected with the expansion connector 60 and the connector for memory card 62. The expansion connector 60 is a connector for interfaces, such as USB, SCSI, etc., and can be connected with medium such as an external storage, and peripheral devices such as another controller. Furthermore, the expansion connector 60 is connected with a cable LAN adaptor, and can utilize the cable LAN in place of the radio communication module 50. The connector for memory card 62 can be connected with an external storage like a memory card. Thus, for example, the input-output processor 42a accesses the external storage via the expansion connector 60 and the connector for memory card 62 to store and read the data.

Although a detailed description is omitted, as shown in FIG. 1, the game apparatus 12 (housing 14) is furnished with the power button 20a, the reset button 20b, and the eject button 20c. The power button 20a is connected to the system LSI 42. When the power button 20a is turned on, the system LSI 42 set in a mode of a normal energized state in which the respective components of the game apparatus 12 are supplied with power through an AC adapter not shown (referred to as "normal mode"). On the other hand, when the power button 20a is turned off, the system LSI 42 is set to a mode in which a part of the components of the game apparatus 12 is supplied with power, and the power consumption is reduced to minimum (hereinafter referred to as "standby mode"). In this embodiment, in a case that the standby mode is set, the system LSI 42 issues an instruction to stop supplying the power to the components except for the input-output processor 42*a*, the flash memory 44, the external main memory 46, the ROM/RTC 48 and the radio communication module 50, and the radio controller module 52. Accordingly, the standby mode is a mode in which execution of the application is not performed by the CPU 40.

Although the system LSI 42 is supplied with power even in the standby mode, generation of clocks to the GPU 42*b*, the DSP 42*c* and the VRAM 42*d* are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that utilizing the standby mode is not desired, by making the standby mode unusable, when the power button 20*a* is turned off, the power supply to all the circuit components are completely stopped.

Furthermore, switching between the normal mode and the standby mode can be performed by turning on and off the power switch 26 of the controller 22 by remote control. If the remote control is not performed, setting is made such that the power supply to the radio controller module 52*a* is not performed in the standby mode.

The reset button 20*b* is also connected with the system LSI 42. When the reset button 20*b* is pushed, the system LSI 42 restarts the activation program of the game apparatus 12. The eject button 20*c* is connected to the disk drive 54. When the eject button 20*c* is pushed, the optical disk 18 is removed from the disk drive 54.

Figure 3:
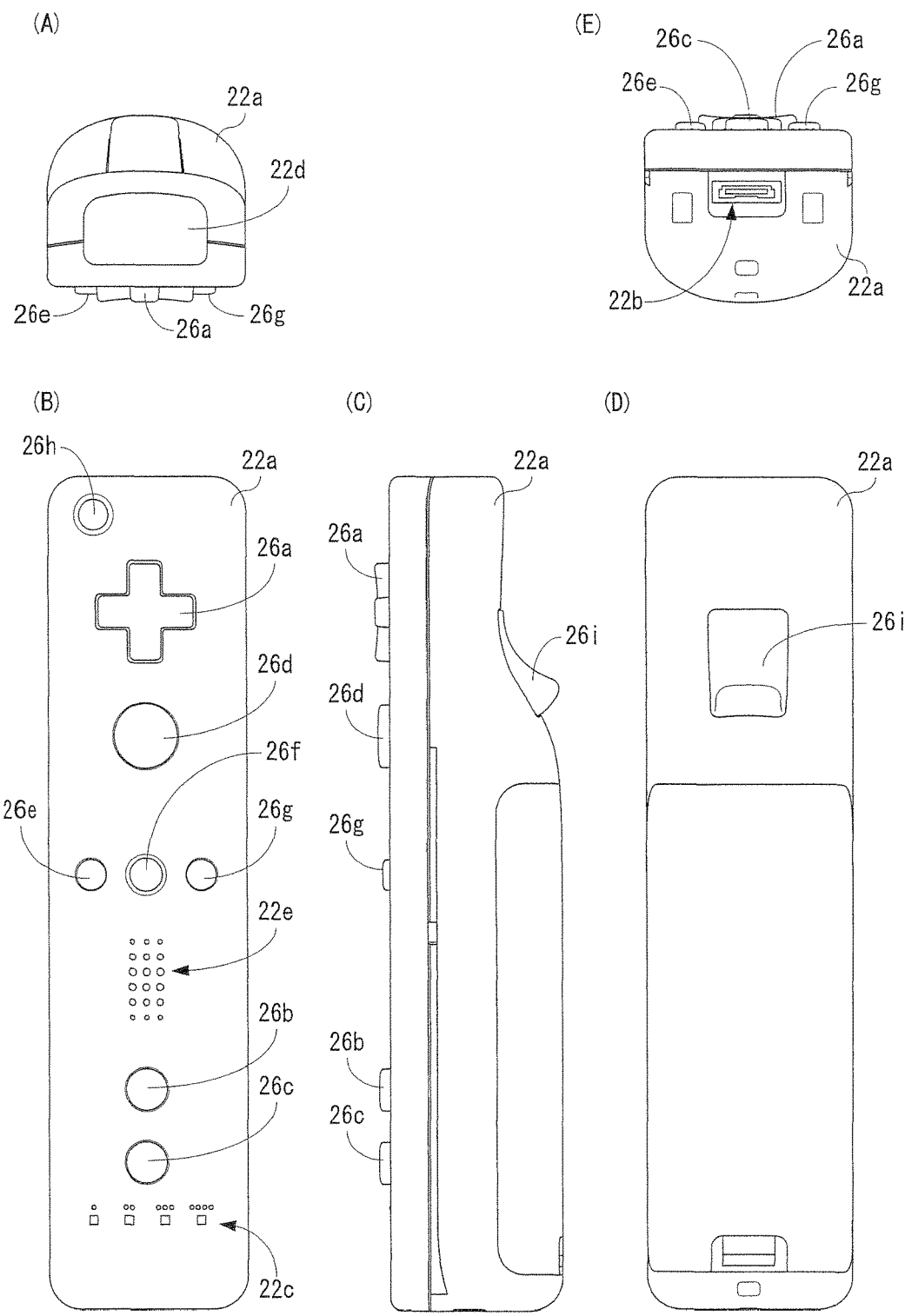
FIG. 3 is an illustrative view showing an appearance of a controller shown in FIG. 1.

Each of FIG. 3 (A) to FIG. 3 (E) shows one example of an external appearance of the controller 22. FIG. 3 (A) shows a front end surface of the controller 22, FIG. 3 (B) shows a top surface of the controller 22, FIG. 3 (C) shows a right side surface of the controller 22, FIG. 3 (D) shows a lower surface of the controller 22, and FIG. 3 (E) shows a back end surface of the controller 22.

Referring to FIG. 3 (A) and FIG. 3 (E), the controller 22 has a housing 22*a* formed by plastic molding, for example. The housing 22*a* is formed into an approximately rectangular parallelepiped shape and has a size small enough to be held by one hand of a user. The housing 22*a* (controller 22) is provided with the input means (a plurality of buttons or switches) 26. Specifically, as shown in FIG. 3 (B), on an upper face of the housing 22*a*, there are provided a cross key 26*a*, a + button 26*b*, a 2 button 26*c*, an A button 26*d*, a − button 26*e*, a HOME button 26*f*, a + button 26*g* and a power switch 26*h*. Moreover, as shown in FIG. 3 (C) and FIG. 3 (D), an inclined surface is formed on a lower surface of the housing 22*a*, and a B-trigger switch 26*i* is formed on the inclined surface.

The cross key 26*a* is a four directional push switch, including four directions of front (or upper), back (or lower), right and left operation parts. By operating any one of the operation parts, it is possible to instruct a moving direction of a character or object (player character or player object) that is be operable by a player or instruct the moving direction of a cursor.

The 1 button 26*b* and the 2 button 26*c* are respectively push button switches, and are used for adjusting a viewpoint position and a viewpoint direction on displaying the 3D game image, i.e. a position and an image angle of a virtual camera. Alternatively, the 1 button 26*b* and the 2 button 26*c* can be used for the same operation as that of the A-button 26*d* and the B-trigger switch 26*i* or an auxiliary operation.

The A-button switch 26*d* is the push button switch, and is used for causing the player character or the player object to take an action other than that instructed by a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth.

The button 26*e*, the HOME button 26*f*, the + button 26*g*, and the power supply switch 26*h* are also push button switches. The − button 26*e* is used for selecting a game mode. The HOME button 26*f* is used for displaying a game menu (menu screen). The + button 26*g* is used for starting (re-starting) or pausing the game. The power supply switch 26*h* is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26*i* is also the push button switch, and is mainly used for inputting a trigger such as shooting and designating a position selected by the controller 22. In a case that the B-trigger switch 26*i* is continued to be pushed, it is possible to make movements and parameters of the player object constant. In a fixed case, the B-trigger switch 26*i* functions in the same way as a normal B-button, and is used for canceling the action determined by the A-button 26*d*.

As shown in FIG. 3 (E), an external expansion connector 22*b* is provided on a back end surface of the housing 22*a*, and as shown in FIG. 3 (B), and an indicator 22*c* is provided on the top surface and the side of the back end surface of the housing 22*a*. The external expansion connector 22*b* is utilized for connecting another expansion controller not shown. The indicator 22*c* is made up of four LEDs, for example, and shows identification information (controller number) of the lighting controller 22 by lighting any one of the four LEDs, and shows the remaining amount of power of the controller 22 depending on the number of LEDs to be emitted.

In addition, the controller 22 has an imaged information arithmetic section 80 (see FIG. 4), and as shown in FIG. 3 (A), on the front end surface of the housing 22*a*, light incident opening 22*d* of the imaged information arithmetic section 80 is provided. Furthermore, the controller 22 has a speaker 86 (see FIG. 4), and the speaker 86 is provided inside the housing 22*a* at the position corresponding to a sound release hole 22*e* between the 1 button 26*b* and the HOME button 26*f* on the tope surface of the housing 22*a* as shown in FIG. 3 (B).

Note that as shown in FIG. 3 (A) to FIG. 3 (E), the shape of the controller 22 and the shape, number and setting position of each input means 26 are simply examples, and needless to say, even if they are suitably modified, the present exemplary illustrative embodiment can be realized.

Figure 4:
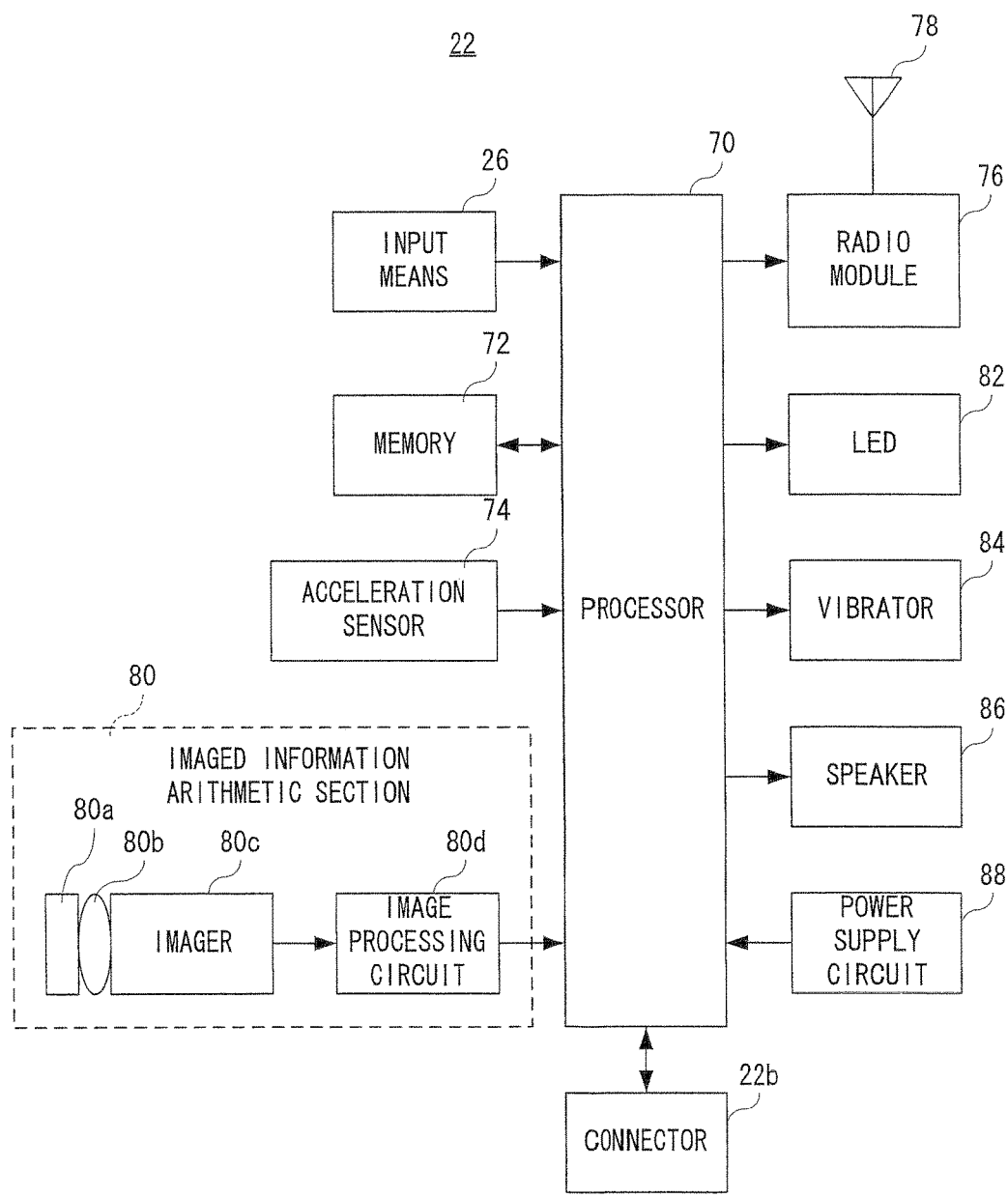
FIG. 4 is a block diagram showing an electric configuration of the controller shown in FIG. 3.

FIG. 4 is a block diagram showing an electric configuration of the controller 22. Referring to FIG. 4, the controller 22 includes a processor 70, and the processor 70 is connected with the external expansion connector 22*b*, the input means 26, a memory 72, an acceleration sensor 74, a radio module 76, the imaged information arithmetic section 80, an LED 82 (the indicator 22*c*), an vibrator 84, a speaker 86, and a power supply circuit 88 by an internal bus (not shown). Moreover, an antenna 78 is connected to the radio module 76.

The processor 70 is in charge of an overall control of the controller 22, and transmits (inputs) information (input information) inputted by the input means 26, the acceleration sensor 74, and the imaged information arithmetic section 80 as input data, to the game apparatus 12 via the radio module 76 and the antenna 78. At this time, the processor 70 uses the memory 72 as a working area or a buffer area.

An operation signal (operation data) from the aforementioned input means 26 (26a to 26i) is inputted to the processor 70, and the processor 70 stores the operation data once in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, az) in each direction of x-axis, y-axis, z-axis for each first predetermined time, and inputs the data of the acceleration (acceleration data) thus detected in the processor 70. For example, the acceleration sensor 74 detects the acceleration in each direction of the axes in a range from −2.0 g to 2.0 g (g indicates a gravitational acceleration. The same thing can be said hereafter.) The processor 70 detects the acceleration data given from the acceleration sensor 74 for each second predetermined time, and stores it in the memory 72 once. The processor 70 creates input data including at least one of the operation data, acceleration data and marker coordinate data as described later, and transmits the input data thus created to the game apparatus 12 for each third predetermined time (5 msec, for example).

In this embodiment, although omitted in FIG. 3 (A) to FIG. 3 (E), the acceleration sensor 74 is provided inside the housing 22a and in the vicinity on the circuit board where the cross key 26a is arranged.

The radio module 76 modulates a carrier of a predetermined frequency by the input data, by using a technique of Bluetooth, for example, and emits its weak radio wave signal from the antenna 78. Namely, the input data is modulated to the weak radio wave signal by the radio module 76 and transmitted from the antenna 78 (controller 22). The weak radio wave signal thus transmitted is received by the radio controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs game processing, following the input data and the program (game program).

In addition, as described above, the controller 22 is provided with the imaged information arithmetic section 80. The imaged information arithmetic section 80 is made up of an infrared rays filter 80a, a lens 80b, an imager 80c, and an image processing circuit 80d. The infrared rays filter 80a passes only infrared rays from the light incident from the front of the controller 22. As described above, the markers 340m and 340n placed near (around) the display screen of the monitor 34 are infrared LEDs for outputting infrared lights forward the monitor 34. Accordingly, by providing the infrared rays filter 80a, it is possible to image the image of the markers 340m and 340n more accurately. The lens 80b condenses the infrared rays passing thorough the infrared rays filter 82 to emit them to the imager 80c. The imager 80c is a solid imager, such as a CMOS sensor and a CCD, for example, and images the infrared rays condensed by the lens 80b. Accordingly, the imager 80c images only the infrared rays passing through the infrared rays filter 80a to generate image data. Hereafter, the image imaged by the imager 80c is called an "imaged image". The image data generated by the imager 80c is processed by the image processing circuit 80d. The image processing circuit 80d calculates a position of an object to be imaged (markers 340m and 340n) within the imaged image, and outputs each coordinate value indicative of the position to the processor 70 as imaged data for each fourth predetermined time. It should be noted that a description of the process in the image processing circuit 80d is made later.

Figure 5:
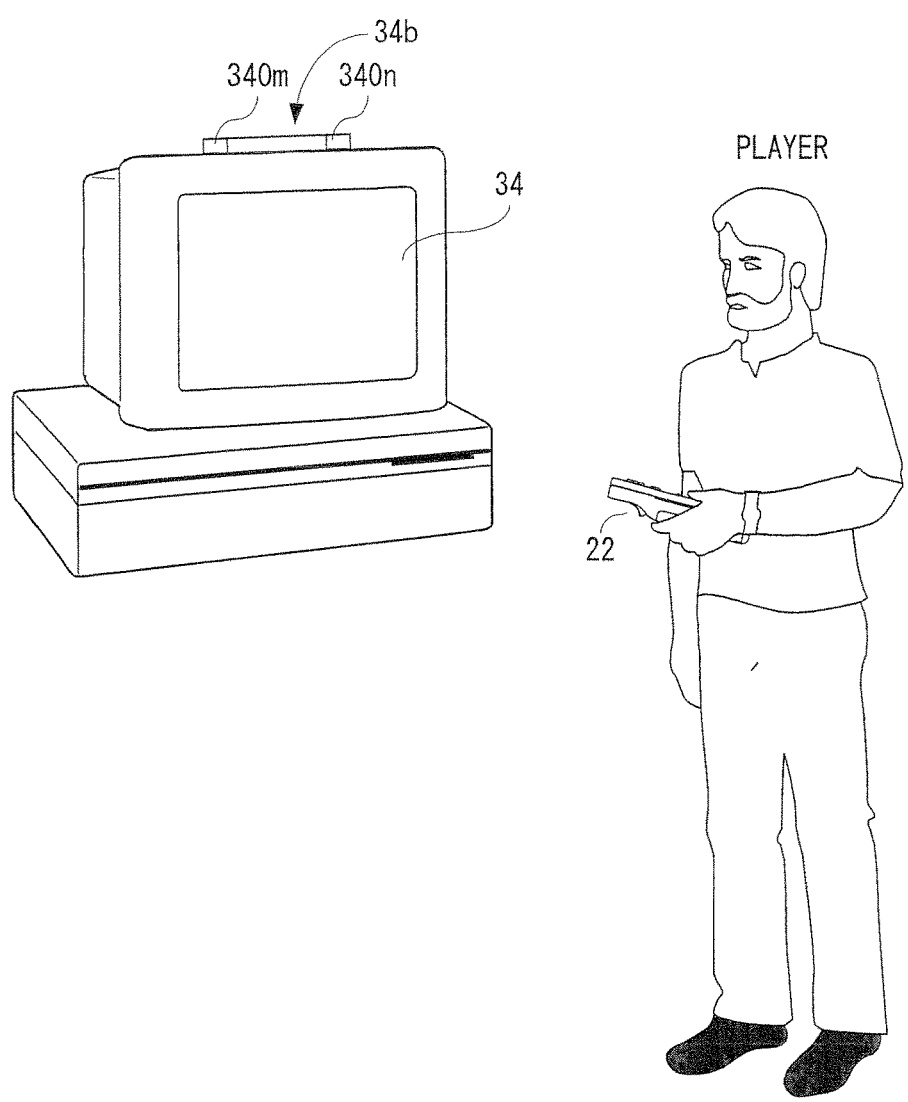
FIG. 5 is an illustrative view showing an outline of a state when a game is played by means of the controller shown in FIG. 1.

FIG. 5 is an illustrative view summarizing a state when a player plays a game by utilizing a controller 22. As shown in FIG. 5, when playing the game by means of the controller 22 in the video game system 10, the player holds the controller 22 with one hand. Strictly speaking, the player holds the controller 22 in a state that the front end surface (the side of the incident light opening 22d of the light imaged by the imaged information arithmetic section 80) of the controller 22 is oriented to the markers 340m and 340n. It should be noted that as can be understood from FIG. 1, the markers 340m and 340n are placed in parallel with the horizontal direction of the screen of the monitor 34. In this state, the player performs a game operation by changing a position on the screen indicated by the controller 22, and changing a distance between the controller 22 and each of the markers 340m and 340n.

Figure 6:
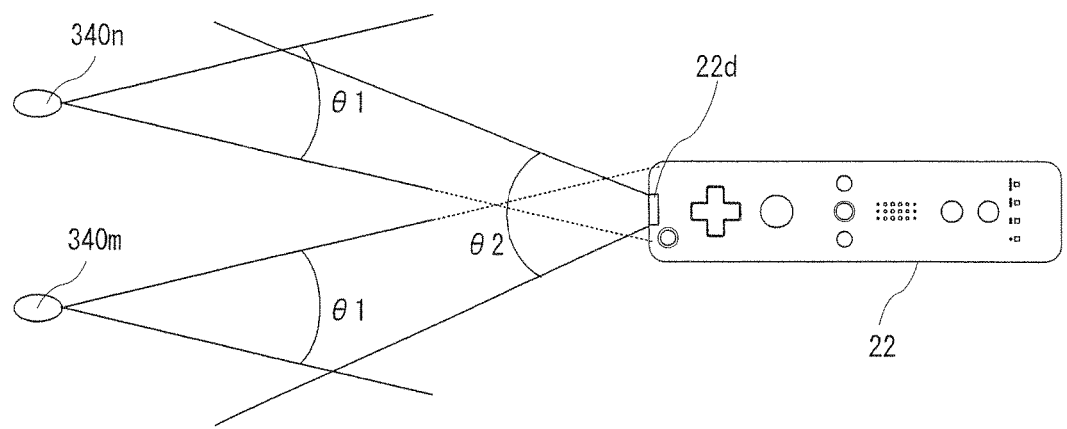
FIG. 6 is an illustrative view for explaining viewing angles of two markers and a controller shown in FIG. 1.

FIG. 6 is a view showing viewing angles between the respective markers 340m and 340n, and the controller 22. As shown in FIG. 6, each of the markers 340m and 340n emits infrared ray within a range of a viewing angle $\theta 1$. Also, the imager 80c of the imaged information arithmetic section 80 can receive incident light within the range of the viewing angle $\theta 2$ taking the line of sight of the controller 22 as a center. For example, the viewing angle $\theta 1$ of each of the markers 340m and 340n is 34° (half-value angle) while the viewing angle $\theta 2$ of the imager 80c is 41°. The player holds the controller 22 such that the imager 80c is directed and positioned so as to receive the infrared rays from the markers 340m and 340n. More specifically, the player holds the controller 22 such that at least one of the markers 340m and 340n exists in the viewing angle $\theta 2$ of the imager 80c, and the controller 22 exists in at least one of the viewing angles $\theta 1$ of the marker 340m or 340n. In this state, the controller 22 can detect at least one of the markers 340m and 340n. The player can perform a game operation by changing the position and the orientation of the controller 22 in the range satisfying the state.

If the position and the orientation of the controller 22 are out of the range, the game operation based on the position and the orientation of the controller 22 cannot be performed. Hereafter, the above-described range is called an "operable range."

Figure 7:
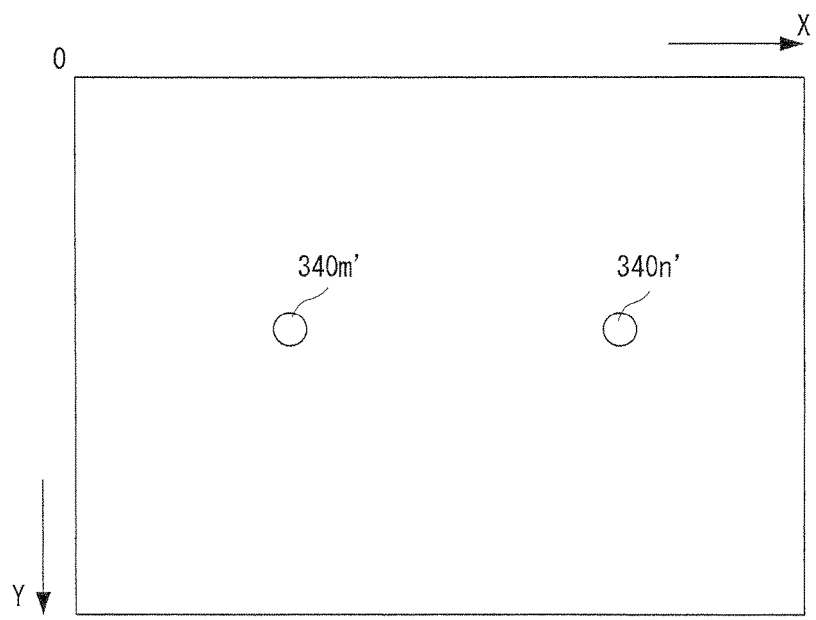
FIG. 7 is an illustrative view showing one example of an imaged image including an object image.

If the controller 22 is held within the operable range, an image of each of the markers 340m and 340n is imaged by the imaged information arithmetic section 80. That is, the imaged image obtained by the imager 80c includes an image (object image) of each of the markers 340m and 340n as an object to be imaged. FIG. 7 is a view showing one example of the imaged image including an object image. The image processing circuit 80d calculates coordinates (marker coordinates) indicative of the position of each of the markers

340*m* and 340*n* in the imaged image by utilizing the image data of the imaged image including the object image.

Since the object image appears as a high-intensity part in the image data of the imaged image, the image processing circuit 80*d* first detects the high-intensity part as a candidate of the object image. Next, the image processing circuit 80*d* determines whether or not the high-intensity part is an object image on the basis of the size of the detected high-intensity part. The imaged image may include images other than the object image due to sunlight through a window and light of a fluorescent lamp in the room as well as the images 340*m*' and 340*n*' of the two markers 340*m* and 340*n* as an object image. The determination processing whether or not the high-intensity part is an object image is executed for discriminating the images 340*m*' and 340*n*' of the two markers 340*m* and 340*n* as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80*d* calculates the position of the high-intensity part. More specifically, the barycenter position of the high-intensity part is calculated. Here, the coordinates of the barycenter position is called a "marker coordinate". Also, the barycenter position can be calculated with more detailed scale than the resolution of the imager 80*c*. Now, the resolution of the imaged image imaged by the imager 80*c* shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as an object image by the determination process, and therefore, two marker coordinates are calculated. The image processing circuit 80*d* outputs data indicative of the calculated two marker coordinates. The data (marker coordinate data) of the output marker coordinates is included in the input data by the processor 70 as described above, and transmitted to the game apparatus 12.

The game apparatus 12 (CPU 40) detects the marker coordinate data from the received input data to thereby calculate an instructed position (instructed coordinate) by the controller 22 on the screen of the monitor 34 and a distances from the controller 22 to each of the markers 340*m* and 340*n* on the basis of the marker coordinate data. More specifically, from the position of the mid point of the two marker coordinates, a position to which the controller 22 faces, that is, an instructed position is calculated. The distance between the object images in the imaged image is changed depending on the distance between the controller 22 and each of the markers 340*m* and 340*n*, and therefore, the game apparatus 12 can grasp the distance between the controller 22 and each of the markers 340*m* and 340*n* by calculating the distance between the two marker coordinates.

Figure 8:
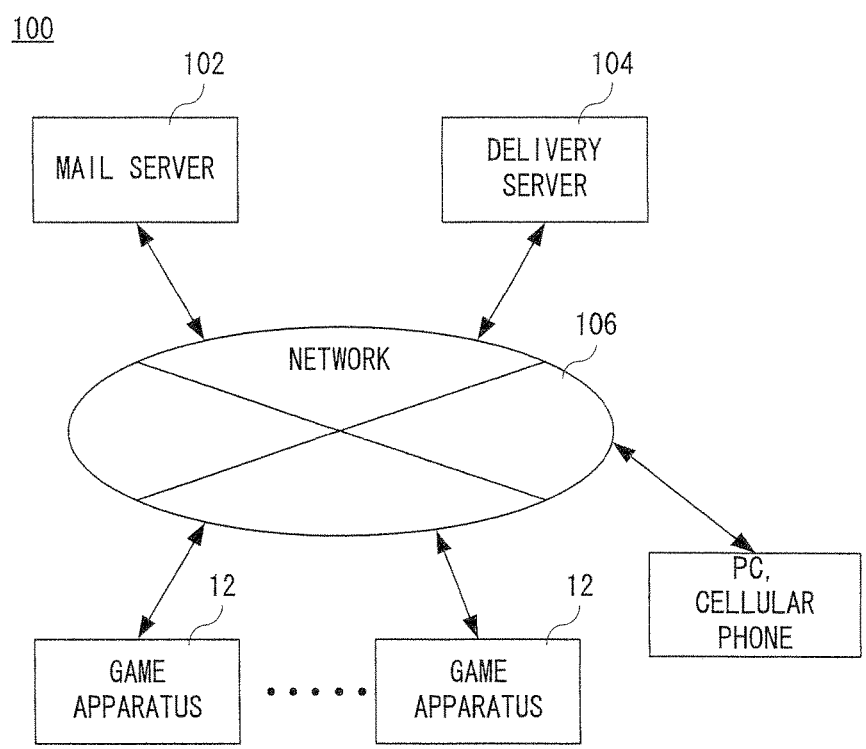
FIG. 8 is an illustrative view showing one example of a communication system in accordance with the present exemplary illustrative embodiment.

An outline of transmitting and receiving messages in accordance with one embodiment is explained below. FIG. 8 is an illustrative view showing one example of a communication system 100 utilizing the above-described game apparatus 12. As shown in FIG. 8, the communication system 100 includes a plurality of game apparatuses 12, and each of the game apparatuses 12 is connected to a mail server 102 and a delivery server 104 via a network 106 like the Internet and a LAN. By being connected to such the network 106, it becomes possible to perform transmitting and receiving of messages via the mail server 102 and download of data from the delivery server 104.

It should be noted that although a description is made on a case that a plurality of game apparatuses 12 are connected to the network 106 in this embodiment, one game apparatus 12 is appropriate. Furthermore, a plurality of delivery servers 104 may be provided depending on the kind of the download data (content). In addition, the network 106 is also connected with a PC, and a cellular phone via a cellular phone network. Other various electronic appliances can be connected to the network 106 to perform transmitting and receiving of messages with the game apparatus 12 via the mail server 102.

The game apparatuses 12 are capable of communicating with each other via the network 106. A message input by a player and a message generated by a game apparatus 12 are transformed into an electronic mail format so as to be transmitted and received (exchanged) between the game apparatuses 12 via the network 106 and the mail server 102. Thus, as a mail server 102, it is possible to use versatile mail servers. Also, the game apparatus 12 can transmit and receive messages, i.e., electronic mails with terminals (terminal except for other game apparatuses 12), such as a PC, a cellular phone. Such message transmitting and receiving process in the game apparatus 12 is automatically executed according to a predetermined schedule without the user issuing a transmitting and receiving instruction, and therefore, the user can play a game or other applications with a message held without periodically checking the mail by itself. Furthermore, the game apparatus 12 can perform transmitting and receiving of messages only with a game apparatus 12 or a terminal except for other game apparatuses 12 (hereinafter, referred to as "other terminal") whose destination is registered in the address book (friend list 44*d* described later), which prevents the user from receiving unnecessary messages like a spam even by utilizing versatile mail systems.

The game apparatus 12 can execute a message board function being an application for displaying the received message on the monitor 34. The message specific to the other application (game, etc.) and the data to be utilized by only the application are made readable in only the application. Thus, in a case that a message has to be transmitted to only the specific user, if data dependent on an individual application is included in the message and transmitted, it can be made in a format unreadable by the message board function. However, irrespective of the kind of the application, a referable message is displayed by the message board function on the monitor 34 so as to be referred (read) by anyone.

The message board function is an application having a function to display a received message on the monitor 34, and displays a message acquired from the network 106. Additionally, a message created for the user himself as well as the message received from other game apparatuses 12 and other terminals can similarly be displayed. Therefore, in a case that the game apparatus 12 is not connected to the network 106, the message board function can be used as a message board for home use and a personal note pad, and a record created by an application like a game, etc. can be browsed by the message board function afterward. At this time, if the message created in the game apparatus 12 is stored in a format similar to that of the message acquired from the network 106 (electronic mail format in the embodiment) in the same area, there is no need to separately prepare processing for display. For example, at a time of creating notes or messages, data is converted into data in an electronic mail format, or in the game program processing, data in an electronic mail format may be created.

Figure 9:
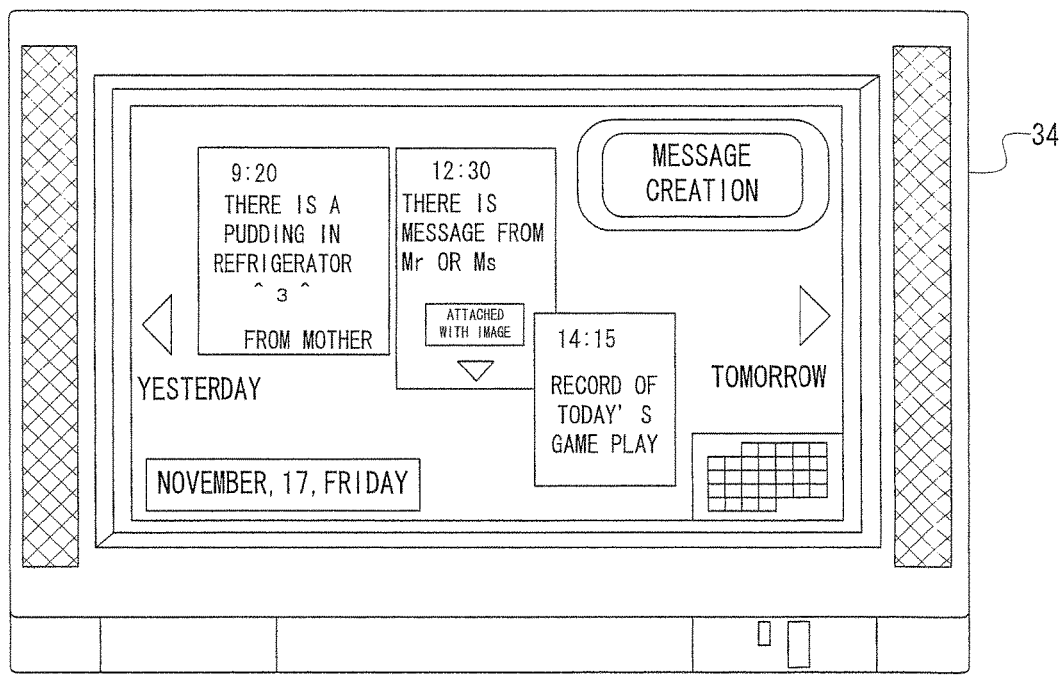
FIG. 9 is one example of a screen to be displayed by a message board function in accordance with the present exemplary illustrative embodiment.

FIG. 9 shows one example of a state in which messages are displayed on the monitor 34 by a message board function. In FIG. 9 example, the message board function displays in a menu the messages received at that day. For example, a message acquired from the network, a message from a family, a history during the game play, etc. can be displayed. A button for activating programs to create a note, a message, and a message to be transmitted to the network is displayed. The data of the message is managed for each date, and by designating another date, the screen is switched to another screen to similarly display in a menu messages received on the designated date. The content of the message (main body, etc.) may be viewable from the first, or only the current time and the title are displayed on the menu display to allow the user to look at the content by opening the message.

Furthermore, although a detailed description is omitted, data (image data) of the image (still image in this embodiment) drawn by a game application and an application for drawing the image and image data held by other terminal can be attached to the message (electronic mail). The image data is displayed on the monitor 34 with the message by the message board function. For example, the image data held by the other terminal is data of an image (still image) imaged by a digital camera and a camera of a cellular phone or data of its thumbnail image.

In addition, although a detailed description is omitted, data dependent on the application such as game data can be attached to the message (electronic mail).

A description is made on information included in the message below. In this embodiment, header information shown in FIG. 10 is added to the message. More specifically, the header information includes information of a transmission source, a destination, a subject, a date and time, identification information of an application of the transmission side, a message board display ON/OFF attribute, a message board date and time designation, an overwrite tag, an other application restriction, a disappearance attribute, a reception notification attribute, an alternate nickname, and a reply attribute.

The information of the transmission source is identification information (or e-mail address) of the game apparatus 12 and an e-mail address of other terminal as the transmission source (transmission side) of the message. Here, the identification information of the game apparatus 12 is information for individually identifying the game apparatus 12, and a character string utilizing at least any one of numeric and alphabetic characters, for example. As an e-mail address of the game apparatus 12, an e-mail address employing the character string of the identification information of the game apparatus 12 is set. The e-mail address of the game apparatus 12 is uniquely determined from the identification information, and thus may be managed by any information. The information of the destination is a destination of the message, that is, the identification information of the game apparatus 12 (e-mail address) or other terminal of the receiving side (transmission source). The subject is a title of the message.

The information of a date and time is a date (year/month/day) and time (hour/minute/second) when the message is transmitted (or created). The identification information on the transmission side (application ID) is an identification number or an identification symbol for identifying an application. In this embodiment, identification information of an application creating the message is described. The above-described message board function is one of the applications, and includes identification information representing a message board in the message created on the message board.

The reception notification attribute is information for showing whether or not receiving the message is notified to a user, and indicates values of "absent" and "pattern ID", for example. If the reception notification attribute indicates "absent", a notifying process is not executed on the receiving side even when the message is received. However, if the reception notification attribute indicates "pattern ID", the receiving the message is notified by flashing (blinking) the LED at an insertion port of the disk slot 16 according to the pattern by the pattern ID. Or, a sound (music) according to a pattern may be played.

The information of a message board display ON/OFF attribute is information for identifying whether the message is to be displayed on the message board. In this embodiment, the message board display ON/OFF attribute is identified as three kinds like "ON", "designated time", "OFF". When the attribute indicates "ON", the message is displayed on the message board. In such a case, the message is displayed (posted) on the message board, and the above-described reception notifying may be performed. Although illustration is omitted, by blinking the LED at the insertion port of the disk slot 16 of the game apparatus 12, outputting a sound (music), and so forth, it is possible to notify the display of the message. Alternatively, if the attribute indicates "designated time", the message is not displayed on the message board before a designated time from an arriving (receiving) of the message. Accordingly, for example, in a case that an event in the game is desired to be notified, or in a case that the game apparatus 12 is desired to be activated on date and time, a message describing "designated time" is transmitted. In addition, in a case that the attribute indicates "OFF", the message is not displayed on the message board.

The information of the message board date and time designation is information for indicating whether or not a year, month, and day and a time for displaying the message on the message board are designated. As the information, if a year, month, and day and a time are designated, the message is displayed on the message board at the date and time. However, if a year, month, and day, and a time is not designated as the information, the message is displayed on the received date.

The overwrite tag is information relating to whether or not an overwriting is performed by the received message. In this embodiment, the overwrite tag includes "ON" or "OFF", and "overwrite ID". When the overwrite tag as to the message (for convenience of explanation, referred to as "current message") indicates "ON", it is determined whether or not a message (for convenience of explanation, referred to as "previous message") whose transmission source, application ID, and overwrite ID are the same is present in a reception message box 44b through comparison. Then, if all of the information of the transmission source, the application ID and the overwrite ID are the same, the previous message is overwritten with the current message. That is, in a case that the latest message from the same transmitter in the same application is required (record of the game score, etc.) on the receiving side, if a message whose overwriting tag indicates "ON", and having the same overwrite ID is created in the game apparatus 12 on the transmitting side when the application creates a message, overwriting is constantly made with the latest message on the receiving side. This makes it possible to prevent the capacity of the flash memory 44 from being constrained by a useless message. However, if any one of the transmission source, the application ID, and the overwrite ID is different, this means that the message is a message for other purposes, and therefore, the message is not overwrite with the current message. In a case that the overwrite tag ID of the current message indicates "OFF", the message is never overwritten with the current message.

The information of other application restriction is information for indicating whether or not the message is made to be referred from an application except for the application indicated by the application ID. If the information indicates an electronic mail (message) that can be referred with other application (other application restriction is turned off), the message can be read from the other application. On the other hand, in a case that the information indicates that the information is a message which cannot be referred with the other application (other application restriction is turned on), the message is inhibited from being read from the other application. It should be noted that if the other application restriction is turned on, the content of the message cannot be referred from other application, but the message may be displayed on the message board.

It should be noted that electronic mail from other terminal is not a message generated by the application of the game apparatus 12, and thus cannot include the information of the other application restriction, and therefore, the electronic mail (message) is automatically allowed to be referred from all the applications.

The disappearance attribute is information indicating whether or not a message is to be automatically erased on the receiving side. When the disappearance attribute indicates "not erase", the message is not automatically erased on the receiving side. However, in a case that the disappearance attribute indicates "designated time", the message after it is past the designated time from arrival (reception) of the message is automatically erased on the receiving side. That is, in a case that it is past the designated time without the received message being utilized in an application, such as a message board function, etc., the message is erased, and therefore, it is possible to prevent the message including information which is senseless after the time expires like a notice is uselessly stored from occupying the capacity of the flash memory 44 due to being uselessly stored in it, and it is possible to prevent the useless information to the user after the time expires.

The alternate nickname is information for indicating whether or not a nickname designated by the transmitting side is displayed in a case that the message is displayed. If the information is empty, a nickname registered in the address book is referred as the information of the transmitter, and the nickname is displayed at a time of displaying the message. Furthermore, if a character string is included in the alternate nickname, the character string of the alternate nickname is displayed in place of the nickname registered in the address book at a time of displaying the message. The character string included in the alternate nickname can be utilized for displaying a predetermined letter other than the name in the displayed position.

The reply attribute is information indicating whether or not a reply to the message is possible. When users transmit and receive messages, a reply is generally performed, but as to the message, etc. automatically created from the application (a record of the result of the game playing, for example), some information should not be replied by the user, and therefore, such a reply attribute is set. When the reply attribute is "possible", it is possible to reply to the message. In such a case, if the message is displayed by the message board function, when the user selects (instructs) to reply, a message input screen to be replied (not illustrated) is displayed to allow creation of a reply message. However, when the reply attribute is "impossible", it is impossible to reply to the message. In such a case, if the message is displayed by the message board function, for example, the user is not allowed to select (instruct) the reply, or a message showing that it is not impossible to reply to the message is displayed.

However, the general electronic mails include header information like Cc, Bcc, Reply-To, Return, etc. other than the above-described header information, but in this embodiment, the game apparatus 12 can neglect the unutilized information out of the information included in the header with respect to transmission data and reception data.

Figure 11:
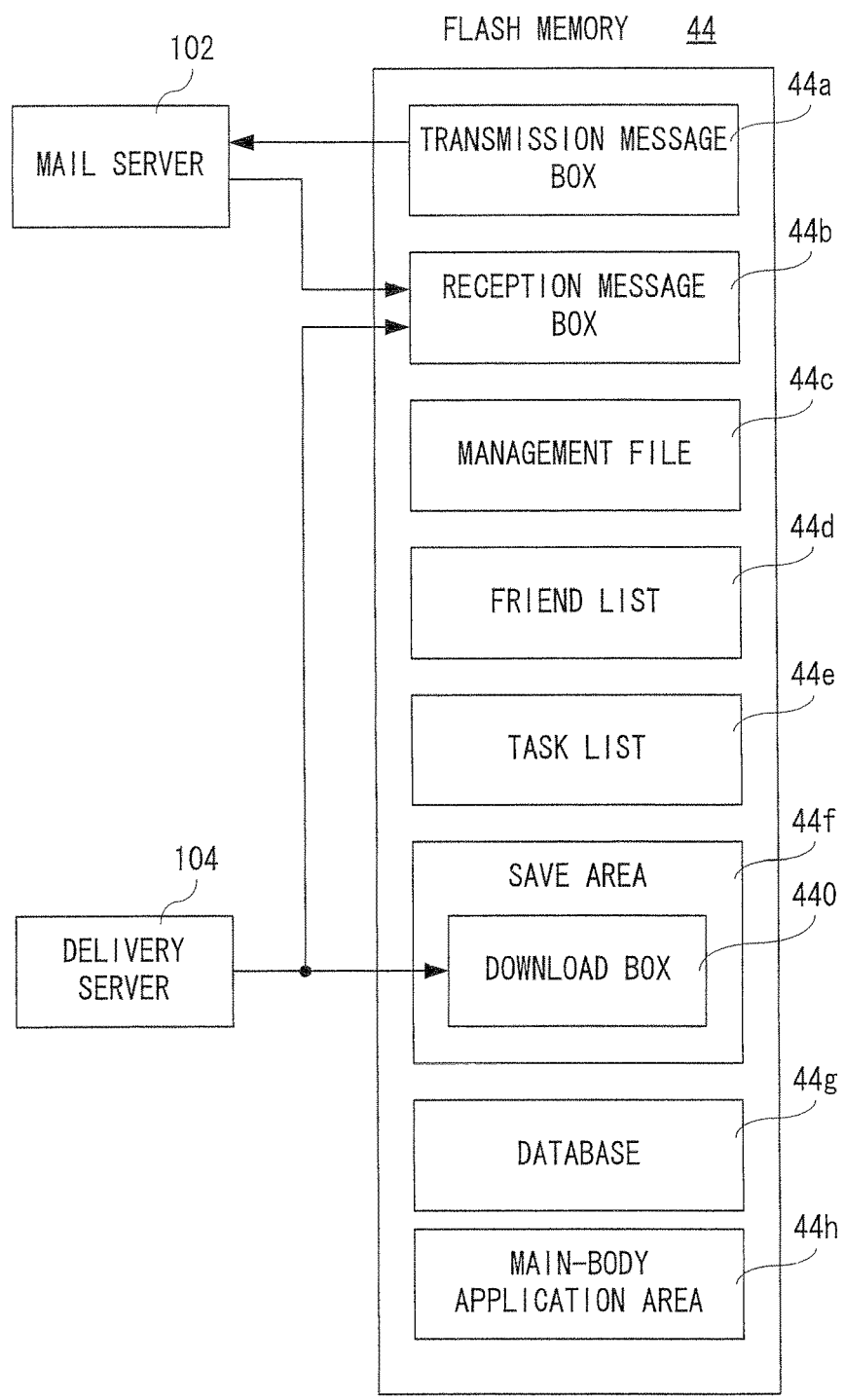
FIG. 11 is an illustrative view schematically showing data stored in a flash memory integrated in the game apparatus.

FIG. 11 is an illustrative view diagrammatically showing a configuration of data stored in the flash memory 44 integrated in the game apparatus 12. By utilizing FIG. 11, the outline of a message transmitting and receiving process and a download process in this embodiment are explained. The game apparatus 12 performs transmitting and receiving of messages with the mail server 102, and downloading data from the delivery server 104. That is, the game apparatus 12 performs two kinds of the communication processing. The message transmitting and receiving process and the download process are executed by the input-output processor 42a. The flash memory 44 includes a transmission message box 44a, a reception message box 44b, a management file 44c, a friend list 44d, a task list 44e, a save area 44f, a database 44g, and a main-body application area 44h as a memory area.

The transmission message box 44a is an area for storing a message in an electronic mail format (regarding as transmission data) to other game apparatus 12 and other terminal from the game apparatus 12. As understood from FIG. 11, the transmission data is transmitted to the mail server 102. Accordingly, the game apparatus 12 can transmit a message to other game apparatus 12 via the mail server 102 and the network 106. The input-output processor 42a refers to the transmission message box 44a on the basis of a predetermined schedule (every ten minutes, for example), and transmits, if transmission data is stored, the stored transmission data to the network 106. When the transmission data is transmitted to the network 106, the transmission data is deleted from the transmission message box 44a.

Thus, since the transmission of the electronic mail is performed independent of an application by the input-output processor 42a, in the application executed by the CPU 40, such as the message board function, the game, etc., by merely performing processing of creating a message and then recording the message in an electronic mail format in the transmission message box 44a, it is possible to transmit the message to the network.

It should be noted that in this embodiment, more versatile data in an electronic mail format is transmitted and received with a mail server, but the data is not limited to the electronic mail format, and can be diverted for various formats. Especially, in a case that communication is limited to the communication between the game apparatuses 12, there is no need to be a versatile format. Even in a case of being communicated with other terminal, a versatile format executable in the terminal would be adopted. Furthermore, the kind of the server may be a kind of server except for the mail server may be provided only that it has a feature of holding data from a terminal until being accessed.

Furthermore, in a case that a transmission function is stopped for some reason, or in a case that a communication failure occurs, transmitting the transmission data is not performed, and an excess volume of data in the transmission message box 44a may occur. In such a case, registering the transmission message in the transmission message box 44a is not accepted.

The reception message box 44b is an area for storing a message in an electronic mail format (may be referred to as a "reception data" in contrast to the "transmission data" in this embodiment) received from other game apparatus 12, other terminal, and the delivery server 104. As understood from FIG. 11, the reception data is transmitted from the mail server 102 and the delivery server 104. The input-output processor 42a accesses the mail server 102 on the basis of a predetermined schedule (for every ten minutes, for example) to confirm whether or not a new arriving e-mail is present in the server, and if the new arriving e-mail is present, the new arriving e-mail is received so as to be stored in the reception message box 44b as reception data. In the reception message box 44b, the reception data is held until it is opened (utilized) and deleted by an application, or the reception message box 44b is full. It should be noted that when the reception message box 44b becomes full, every time that new reception data is received, the reception data is deleted from the oldest one. In a case that the game apparatus 12 is in a normal mode, the reception data held in the reception message box 44b is moved to a database 44g according to the header information except for one attached with the data depending on an application, such as game data, and is readable by the message board function.

It should be noted that the reception data from the mail server 102 is a message from other game apparatus 12 and other terminal. The reception data from the delivery server 104 is a message like a notice to a plurality of users from an administrator, etc. of the delivery server 104. For example, from the administrator, etc. of the delivery server 104, a message, such as information of the latest game application (game software) and information of an event in the game are transmitted (notified). A detailed description of storing data received from the delivery server 104 in the reception message box 44b is made later.

The management file 44c is management information on the game apparatus 12, and stores information specific to the game apparatus 12, such as the identification information of the game apparatus 12, a profile of the user, etc. so as to be read as necessary. The friend list 44d corresponds to the so-called address book of the electronic mail to which identification information of the registered other game apparatus 12 (or e-mail address) and an e-mail address of other terminal are described. The friend list 44d can be referred from various applications are executed as well as in a case that message board function is executed. It should be noted that out of identification information of other game apparatuses 12 and e-mail address of other terminals described in the friend list 44d, electronic mail (reception data) except for one that transmitted from the game apparatus 12 with the identification information and other terminal with the e-mail address which is subjected to a friend registration described later is deleted. That is, if the transmission source is unidentified, the reception data is filtered. This makes it possible to automatically delete an undesired electronic mail like a spam.

Figure 12:
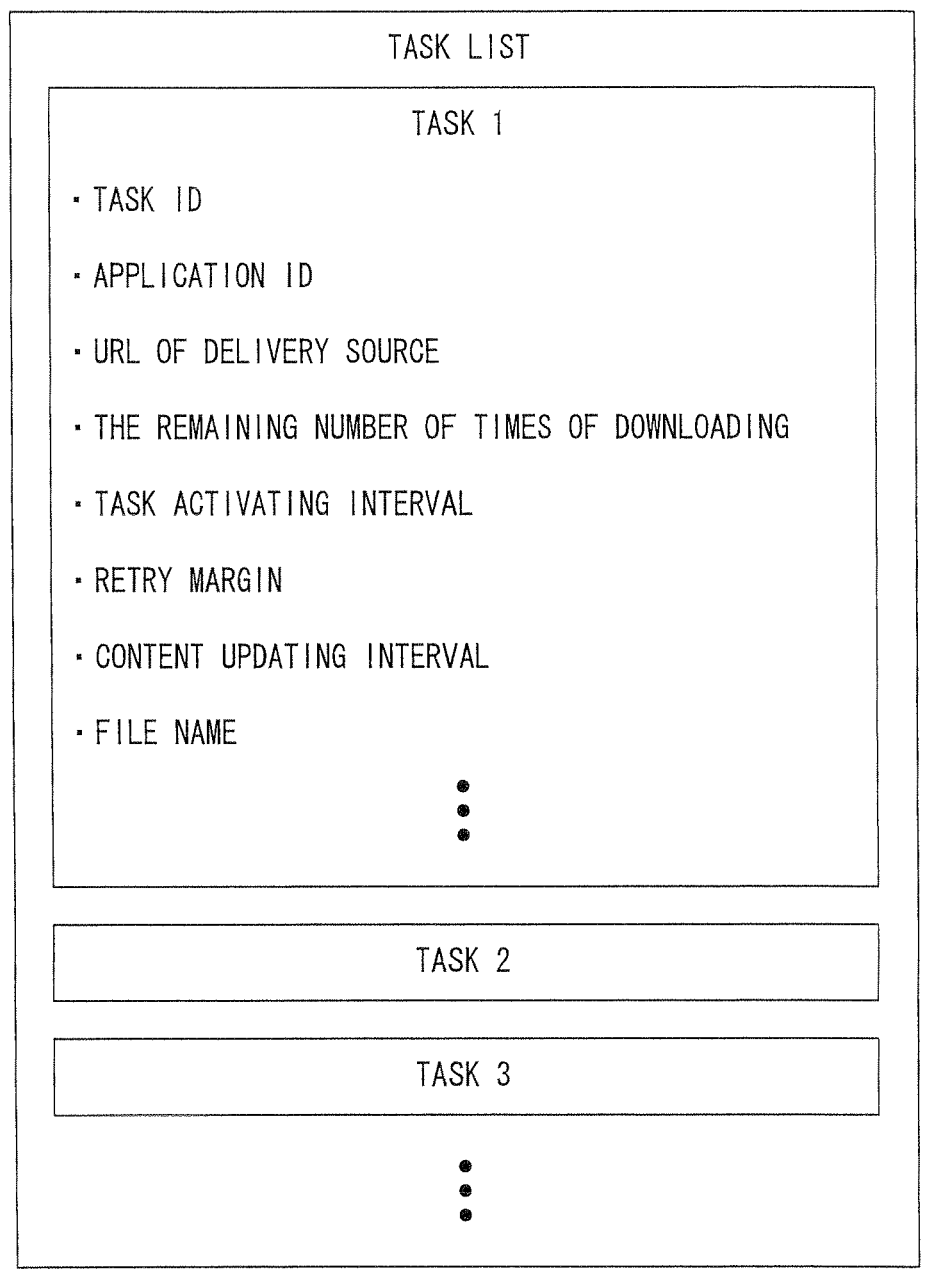
FIG. 12 shows a content of a task list.

The task list 44e is a list of tasks representing a schedule for downloading data from the delivery server 104, and stores a task registered in advance for the game apparatus 12 and a task arbitrarily registered by the user. Each of the tasks is executed to allow execution of the download process. It should be noted that in this embodiment one task can be registered in one application. FIG. 12 shows one example of attribute information included in each task. One task includes identification information of a task (task ID), identification infoitnation of an application (application ID), an URL of a delivery source, the remaining number of times of downloading, a task activating interval, a retry margin, a content updating interval, and a file name.

The task ID is an ID for uniquely identifying a task. The application ID is an ID for uniquely identifying an application in which a task is registered. The application ID is determined in correspondence with the application which performs a task registering process.

The URL of the delivery source indicates the place of the delivery source (delivery server 104), and includes a file name of the download data. The URL of the delivery source is set by the user, and automatically set by the application.

The remaining number of times of downloading indicates a download executable count. In this embodiment, when the game apparatus 12 (input-output processor 42a) transmits a connection request (request) to the network 106 (delivery server 104) for downloading, the remaining number of times of downloading is generally subtracted by 1. Then, when the remaining number of times of downloading is 0, the task is deleted from the task list 44e to make the task unexecutable. By setting the remaining number of times of downloading, it is possible to perform downloading at a necessary time, thereby preventing useless download process from continuously being executed even when the download is not needed.

The task activating interval is a time interval of executing a task, and specifically means a time (period) from execution of a task to execution of a next task. It should be noted that at a time of a task being registered, a next task executable time is determined by taking the registered time as a reference. The task activating interval is set by a user, and automatically set in correspondence with the kind of the download data (content).

The retry margin is an allowable time when an executing time (estimated time) of the next task determined by an interval of activating the download can be delayed. For example, in a case that the power of the game apparatus 12 is completely turned off, in a case that a failure occurs to the network, and so forth, the task cannot be executed and an estimated time of the task may be missed in a case that a next task executable state comes. Furthermore, in a case that the estimated time is significantly delayed, the data to be downloaded itself may already be unneeded. Thus, at a time of registering the task, the retry margin is set. When an estimated time is determined in correspondence with the task activating interval, a retry allowable hour (retry allowed hour) is determined in correspondence with the retry margin. When the retry allowable hour expires, the task is not executed, and then deleted from the task list 44e. The retry margin is set by a user, and automatically set depending on the kind of the download data.

The content updating interval is an average value of the intervals for updating a content (download data) to be set in the delivery source concerning the URL of the delivery source. Thus, depending on the kind of the download data, taking the average value of the intervals for updating the download data indicated by the content activating interval into consideration, the task activating interval is set. More specifically, if the task activating interval is set to be longer than the content updating interval, useless downloading like acquiring the same download data again can be eliminated. On the contrary thereto, if the task activating interval is set to be shorter than the content updating interval, missing the download of the content to be updated can be eliminated. The average value of the update intervals may be a value presumed in advance, and in order to update the task, the average value of the update intervals is acquired from the delivery server 104 every time that the download is executed so as to update the task.

The file name is a file name applied when the download data is stored, and can be designated by an option, for example. It should be noted that the download data is attached with a file name, and therefore, data with a predetermined file name can be acquired without designating the file name.

It should be noted that a detailed description is made on execution of the task. The download data can be used in the application indicated by the identification information (application ID). For example, in the game application, the download data is data like an addition map, an addition character, an addition item, etc. as to the game.

Returning to FIG. 11, the save area 44f is an area storing (saving) data of an application, and includes a download box 440 within the area. The download box 440 is an area to store download data downloaded from the delivery server 104 according to a task as described above. Although detailed description is omitted, an application ID for identifying the application registering a task is applied to the download data in advance. It should be that the application ID is not necessarily applied to the download data in advance, and in another embodiment, when the application ID is registered in the download box 440, the application ID indicated by the attribute of the task is referred so as to be applied. Thus, in a case that download data of various kinds of the applications is stored in the download box 440, it is possible to identify each download data by the application ID. Furthermore, the save area 44f ensures an area for each application. Thus, in another embodiment, a download box for each application may be provided in the area for storing application data corresponding to the download data.

The database 44g is an area for storing a message utilized in the above-described message board function for each date, and can be referred from another application. As described above, the reception data is stored in the reception message box 44b, but since the capacity of the reception message box 44b is limited, when the reception message box 44b is full, the reception data is deleted from the oldest one. Accordingly, the database 44g is provided for storing a message for a long time and for sharing the message, and the reception data (message) except for one utilized in the individual application, such as one attached with game data is moved to the database 44g from the reception message box 44b. At this time, the header information of the message is referred so as to be stored in each area of the database 44g managed for each date. For example, if a year, month and day, and time are described as information of the message board date and time designation, the reception data is stored in the area corresponding to the designated year, month and day. However, if the header information of a message is not designated by a date and time, etc., the message is stored in the area corresponding to the date when the message is received. The managing method of an area for each date is only necessary to set a folder for each day and store the message in corresponding folder, for example. Furthermore, the file name at a time of storage may be a file name representing an hour.

Although illustration is omitted, in a case that a memory card is attached to the connector for memory card 62, the content of the database 44g can be backed up in the memory card automatically or in accordance with an instruction by the user.

The main-body application area 44h is an area for storing a program (software) of an application incorporated as a main body function. For example, applications of the function (main body function) of the game apparatus 12 itself, such as a menu program at a time of activating the game apparatus 12, a message board function, a friend registration function are stored (installed) in the main-body application area 44h. That is, the game apparatus 12 is a game apparatus which is able to read a program of a game, etc. stored in the optical disk 18 to execute the application, and read a program stored in the flash memory 44 to execute the application. Furthermore, as a, the above-described software can be added to the program to be stored in the main-body application area 44h.

Figure 13:
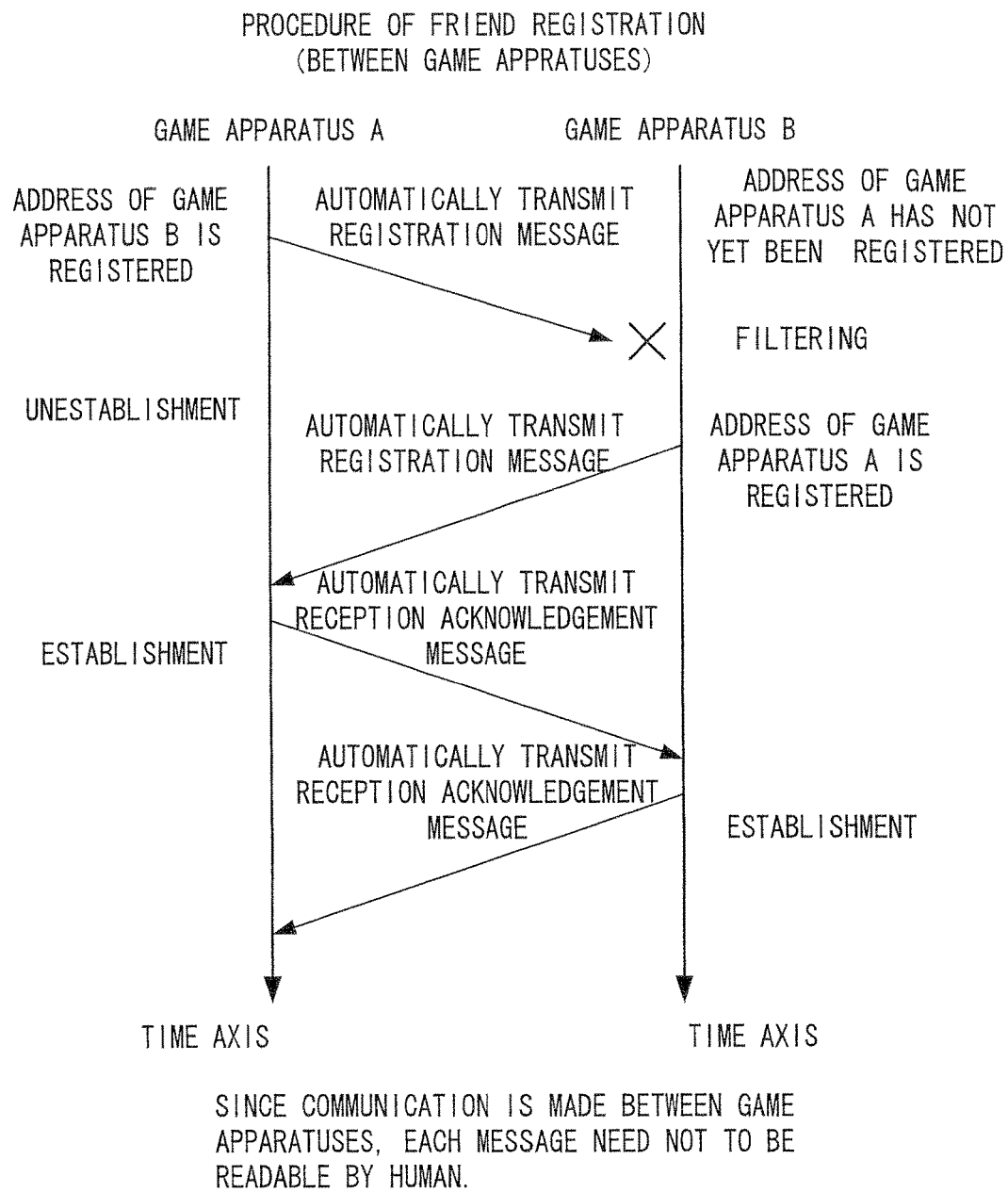
FIG. 13 is an illustrative view showing flows of a friend registration between game apparatuses.
Figure 14:
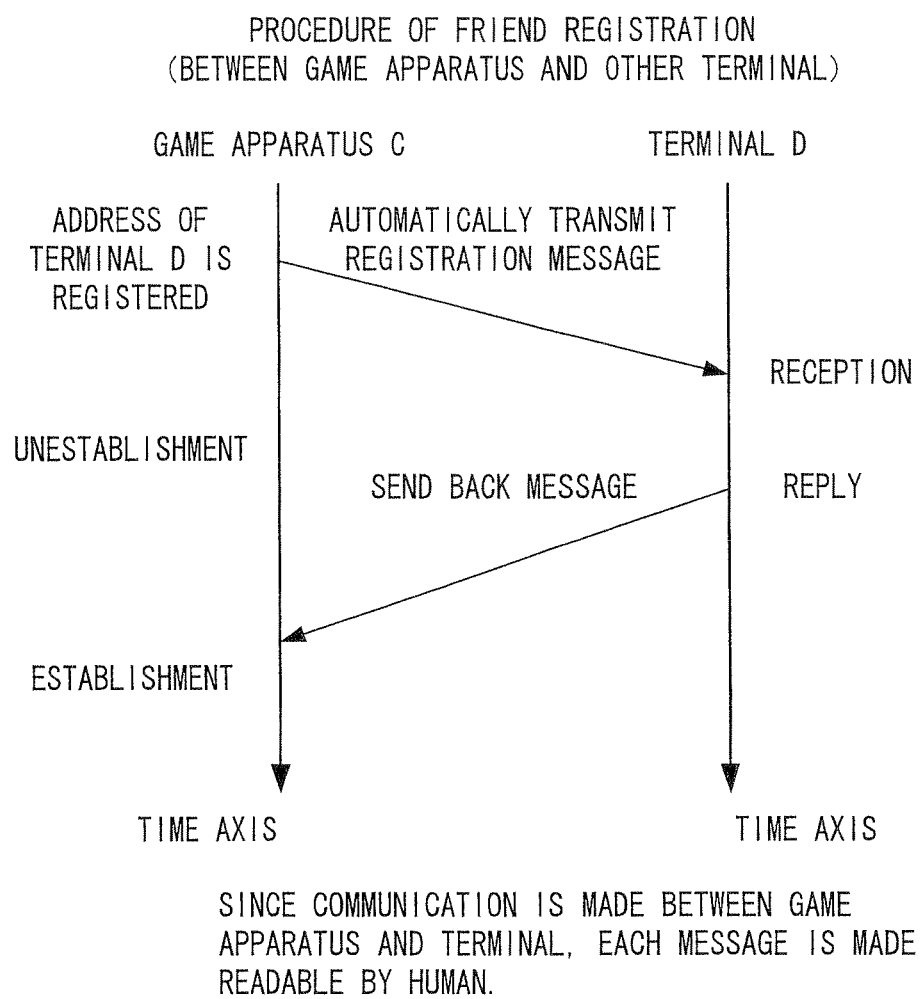
FIG. 14 is an illustrative view showing flows of a friend registration between a game apparatus and other terminal.

Next, with reference to FIG. 13 and FIG. 14, a procedure of the friend registration is explained. The friend registration is for registering in advance an opponent with whom transmitting and receiving messages are allowed in the friend list 44d. In this embodiment, a message transmitted from a transmission source on which a friend registration is not performed out of the messages to be received from the mail server 102 is automatically deleted. That is, in a case that messages are exchanged between the game apparatuses 12, an opponent of one's own has to perform a friend registration on each of the game apparatuses 12. Here, in the friend registration, not that one of the game apparatus 12 makes a registration, but that both game apparatuses 12 establishes a relationship to have an intention to make registration with each other, and in what follows, the relationship is called "friend relationship". More specifically, this is a state in which game apparatuses 12 make a friend registration to finish confirming the registration with each other, and a state in which between the game apparatus 12 and the other terminal, a game apparatus 12 registers other terminal to thereby confirm the allowance of the registration in the other terminal on the side of the game apparatus 12. Accordingly, in order to establish a friend relationship, a following procedure is executed between the game apparatus 12 and other game apparatus 12 or other terminals. FIG. 13 shows a procedure of the friend registration between the game apparatuses 12, and FIG. 14 shows a procedure of a friend registration between the game apparatus 12 and other terminal. The friend registration is performed by transmitting and receiving messages. That is, a friend registration is executed through processing in the input-output processor 42a of each game apparatus 12.

In FIG. 13, in order to easily identifying two game apparatuses 12, one of the game apparatus 12 is called a "game apparatus A", and the other game apparatus 12 is called a "game apparatus B". Furthermore, in FIG. 14, the game apparatus 12 is called a "game apparatus C", and the other terminal is called a "terminal D".

In addition, in a friend registration, prior to the registration, by getting in touch with users in advance or talking with each other, the identification information of the game apparatus 12 and an e-mail address of other terminal have to be informed to each other. It should be noted that in a case that a friend registration is performed on the game apparatus 12 possessed by one user and other terminal, the user merely know an e-mail address of the other terminal. A description of the friend registration is made according to a time axis.

First, with reference to FIG. 13, a procedure of establishing a friend relationship between the game apparatuses 12 is explained. A registration in the friend list 44*d* is performed by each user in the game apparatus 12 of his own, and therefore, the timing for registration may be different between the game apparatuses 12, but a description is made by regarding a game apparatus 12 which is registered first as a game apparatus A. The user of the game apparatus A inputs an e-mail address (identification information) of the game apparatus B in the friend list 44*d* of the game apparatus A to register it. Then, the game apparatus A automatically transmits a message (registration message) showing that the e-mail address of the game apparatus B is registered in the address book (friend list 44*d*) to the game apparatus B. As described above, the registered message is transmitted by an electronic mail format. It should be noted that a message is automatically transmitted and received between the game apparatuses 12, and therefore, it is only necessary to readable by the game apparatus 12. Accordingly, the registration mail may merely be a message which is not readable by a human, such as a character string simply arranging alphabetic characters and numeric characters, and an empty e-mail. In what follows, this holds true for a case that messages are automatically transmitted and received between the game apparatuses 12.

On the other hand, in the game apparatus B, the registration message is received, but as described above, a registration timing is different for each user, and in this step, an e-mail address of the game apparatus A is not registered, and therefore, even when the game apparatus B receives a registration message from the game apparatus A, it immediately deletes the registration message. At this time, the game apparatus A is in a state that a friend relationship is not established with the game apparatus B. Naturally, in the game apparatus B, a friend relationship with the game apparatus A is not established.

Thereafter, when the user of the game apparatus B registers the e-mail address of the game apparatus A in the friend list 44*d* of the game apparatus B, it automatically transmits to the game apparatus A a registration message showing that the game apparatus B registers the e-mail address of the game apparatus A in the address book. In the game apparatus A, the e-mail address of the game apparatus B has already been registered in the friend list 44*d*, and therefore, the game apparatus A receives the registration message transmitted from the game apparatus B and stores it in the reception message box 44*b*. This makes it possible for the game apparatuses to confirm the registration with each other, and therefore, a friend relationship with the game apparatus B is established in the game apparatus A. Then, the game apparatus A automatically transmits to the game apparatus B a confirmation message (reception acknowledgement message) showing that the registration mail is received from the game apparatus B.

At this time, in the game apparatus B, the e-mail address of the game apparatus A has already be registered in the friend list 44*d*, and therefore, the game apparatus B receives the reception acknowledgement message transmitted from the game apparatus A to hold it in the reception message box 44*b*. This makes it possible for both of the game apparatuses to confirm the registration with each other, and therefore, a friend relationship with the game apparatus A is established in the game apparatus B. Then, since the game apparatus B performs processing similar to the game apparatus A, it automatically transmits to the game apparatus A a reception acknowledgement message. Although the game apparatus A receives the reception acknowledgement message from the game apparatus B, a friend relationship has already been established at this time, and therefore, processing such as a reply, etc. is not performed in response thereto, and the reception acknowledgement message is thereafter deleted from the reception message box 44*b*.

As described above, in each of the game apparatuses 12, a registration message is automatically transmitted after registering the address, and in a case that a message is received after the registration, a friend relationship is established to transmit a reception acknowledgement message. These processes are performed in both of the game apparatuses 12 to allow each of the game apparatuses 12 to automatically establish a friend relationship after registration.

Next, with reference to FIG. 14, a description is made on a procedure of establishing a friend relationship between the game apparatus 12 and other terminal. The other terminal is a versatile terminal capable of performing electronic mail processing, and does not has a configuration of an input-output processor 42*a*, etc. of the game apparatus 12, and therefore, in a case of the game apparatus 12 and the other terminal, a registration shall be started only from the game apparatus 12. When a user of the game apparatus C registers an e-mail address of the terminal D in the friend list 44*d* of the game apparatus C, the game apparatus C transmits a registration message to the terminal D. It should be noted that since the terminal D is not a game apparatus 12, in order to transmit a message to the game apparatus C, a user of the terminal D has to send back a message to the game apparatus C. Accordingly, as a registration message, a message to prompt the game apparatus C to transmit a reply has to be transmitted in a readable manner by the user (human) of the terminal D. For example, a registration message including "If you reply to the mail, it is possible to transmit and receive electronic mails with the game apparatus C" is transmitted. At this time, a friend relationship with the terminal D is not established in the game apparatus C.

Thereafter, the user of the terminal D sends back to the game apparatus C a message in response to the registration message from the game apparatus C. In the game apparatus C, the e-mail address of the terminal D has already been registered in the friend list 44*d*, so that when the message is received from the terminal D, a friend relationship with the terminal D is established.

It should be noted that it is impossible to confirm the establishment of a friend relationship in the terminal D, and therefore, from the game apparatus C a friend relationship needs not to be established, and a reception acknowledgement message also needs not to be transmitted.

Furthermore, as described above, in this embodiment, if one game apparatus 12 registers the e-mail address of the other game apparatus 12 out of the two game apparatuses 12, a friend relationship is not established. In such a case, although illustration is omitted, an address registered in one of the game apparatuses 12 is displayed in a pale gray, and when a friend relationship is established thereafter, it is displayed in black, and whereby, a presence or absence of establishment of the friend relationship can be confirmed by a user. However, this is a merely example, and the display can be changed by the difference in luminance in the same color or by different colors. Also, the game apparatus 12 determines the presence or absence of establishment of the friend relationship with the game apparatus 12 and other terminal registered in the friend list 44d by a flag, etc. in the friend list 44d. For example, a flag corresponding to the identification information of the game apparatus 12 (or e-mail address) or an e-mail address of other terminal with which a friend relationship is established is turned on. On the other hand, a flag corresponding to the identification information of the game apparatus 12 (or e-mail address) or an e-mail address of other terminal with which a friend relationship is not established is turned off. By referring to the flag, it is possible to determine whether creating a normal message except for the registration message is possible or impossible, and whether or not the received message is deleted or stored in the reception message box 44b. It should be noted as means except for one utilizing a flag, for example, an address before a friend relationship is established and an address after a friend relationship is established are stored in a separate areas to determine the friend relationship.

Figure 15:
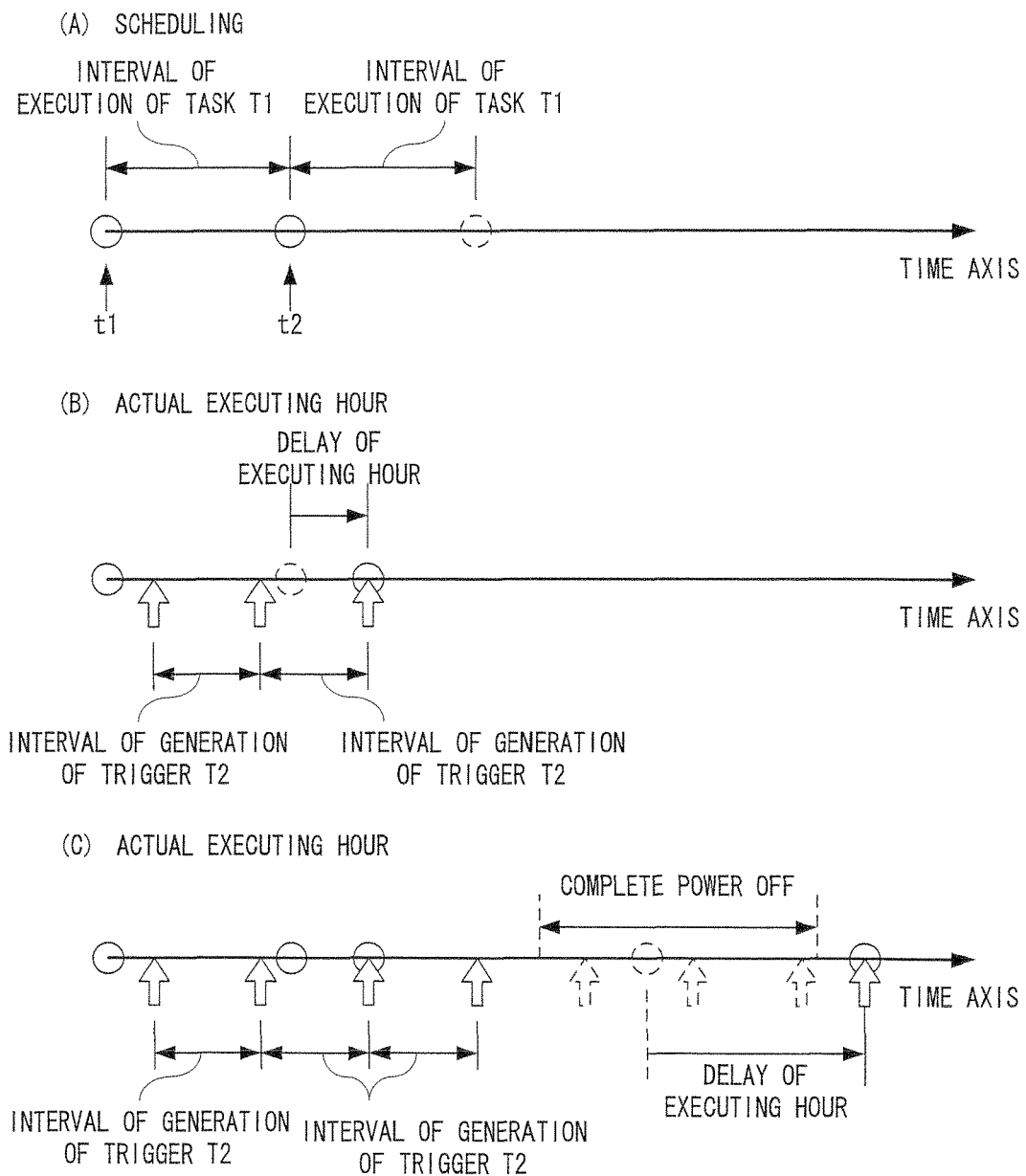
FIG. 15 is an illustrative view illustrating a scheduling and an executing hour of the tasks.

Next, an outline of the download process to be executed by the input-output processor 42a is explained. In this embodiment, the download data is acquired from the delivery server 104. As shown in FIG. 15 (A), if a certain task is registered in the task list 44e, the task is scheduled by taking a current time t1 as a reference. For example, in the example shown in FIG. 15 (A), scheduling of the task is executed at a time (estimated time) t2 in accordance with an execution interval T1 of the task. Additionally, the execution time T1 corresponds to the task activating interval of the attribute information of the task. The time can be obtained from the ROM/RTC 48. When the task is executed, a next task is executed at the estimated time adding the execution time T1 to the executing time. The downloading task decrements the remaining number of times of downloading by one when a downloading is executed. At this time, a scheduling of an estimated time (execution estimated time) when the next task is executed is made.

As shown in FIG. 15 (B), inside the input-output processor 42a, a trigger is generated every predetermined time per unit of time of the processing, and at a time of generating a trigger, processing of comparing a trigger generation time, and the afore-stated estimated time of transmitting and receiving of messages and an estimated time of downloading, etc. is performed. If the estimated time expires, the processing is activated. Thus, if the scheduling of the task is set after the trigger generation, the task is executed at the next trigger generation, and therefore, an actual executing time of the task may slightly be delayed from the estimated time t2 set in FIG. 15 (A).

Furthermore, as shown in FIG. 15 (C), execution of the task itself may be stopped similar to a case that the power of the game apparatus 12 is completely off unlikely to the standby mode. In such a case, the task is executed after the game apparatus 12 is activated again, but a long-delay of an executing time of the task may occur.

Additionally, execution of the task can temporarily be stopped or restarted in accordance with the request from an application, and in such a case also, a delay of an executing time of the task may occur.

If a delay of an executing time of the task occurs, the data to be downloaded may be already useless. Therefore, if a delay occurs, a retry margin is set for determining whether or not the execution of the task is allowed as attribute information of the task. More specifically, when a task is executed, it is determined whether or not timing when the execution of the task is started (current hour) is past a retry allowable time which is obtained by adding a time indicated by a retry margin to the estimated time of the task execution.

Then, if the current time is past the retry allowable time, the task execution is not performed, and the task is deleted from the task list 44e. On the other hand, if the current time is before the retry allowable time, the task is executed to continue the following processing.

Figure 16:
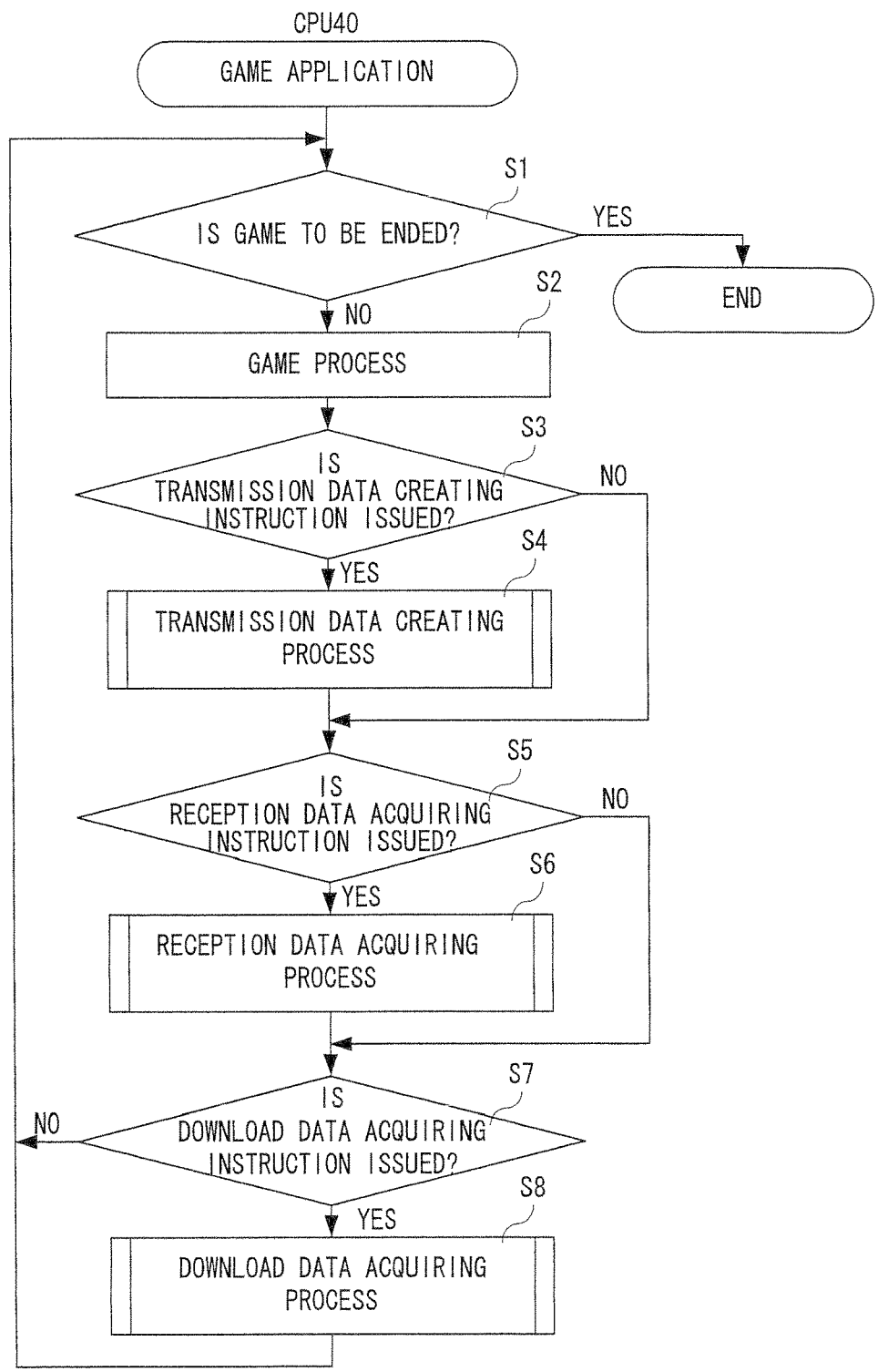
FIG. 16 is a flowchart showing a game application process of a CPU shown in FIG. 2.

In what follows, processing of software to be executed in each of the CPU 40 and the input-output processor 42a is explained in detail. FIG. 16 is a flowchart showing a game application process to be executed by the CPU 40 shown in FIG. 2. It should be noted that in this embodiment, a game application is explained by way of example here, but it goes without saying that an application except for the game may be adopted. With reference to FIG. 16, when the CPU 40 starts the game application process, it is determined whether or not a game is to be ended in a step S1. Here, it is determined whether or not a game is over, or whether or not the game is to be ended in accordance with player' instruction. If "YES" in the step S1, that is, if the game is to be ended, the game application processing is directly ended. On the other hand, if "NO" in the step S1, that is, the game is not to be ended, the game process is executed in a step S2. Here, the CPU 40 makes a player character to execute an arbitrary action in accordance with a player's operation, controls the movement of a non-player character, and so forth. At this time, the GPU 42b generates (updates) game image data in accordance with an instruction from the CPU 40. Furthermore, the DSP 42c generates sound data in accordance with the instruction by the CPU 40 as needed. Thus, the game is advanced.

In what follows, a description is made on a case that an instruction of creating the transmission data, acquiring the reception data, and acquiring the download data during the game process are generated. Here, the CPU 40 determines whether or not these instructions are input in accordance with player's operation and in correspondence with occurrence of a game event.

It should be noted that since depending on the kind of the application, some applications may utilizes only any one of the transmission data, the reception data, and the download data, all the instruction determining processes are not always executed.

Figure 17:
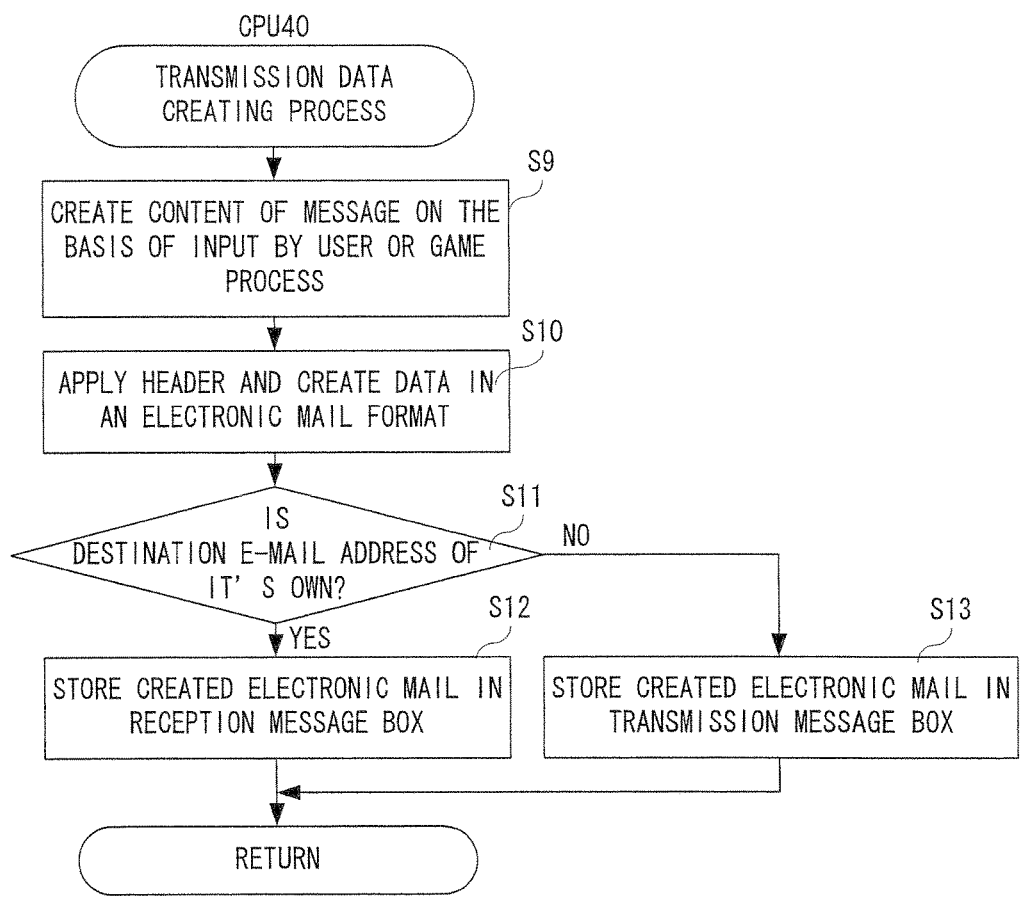
FIG. 17 is a flowchart showing a transmission data creating process being a part of the game application process of the CPU shown in FIG. 2.

First, in a step S3, it is determined whether or not a transmission data creating instruction is issued, and if "YES" is determined, that is, if a transmission data creating instruction is issued, the process proceeds to a transmission data creating process in a step S4 shown in FIG. 17. On the other hand, if "NO" in the step S3, that is, if a transmission data creating instruction is not issued, the process proceeds to a step S5.

Figure 18:
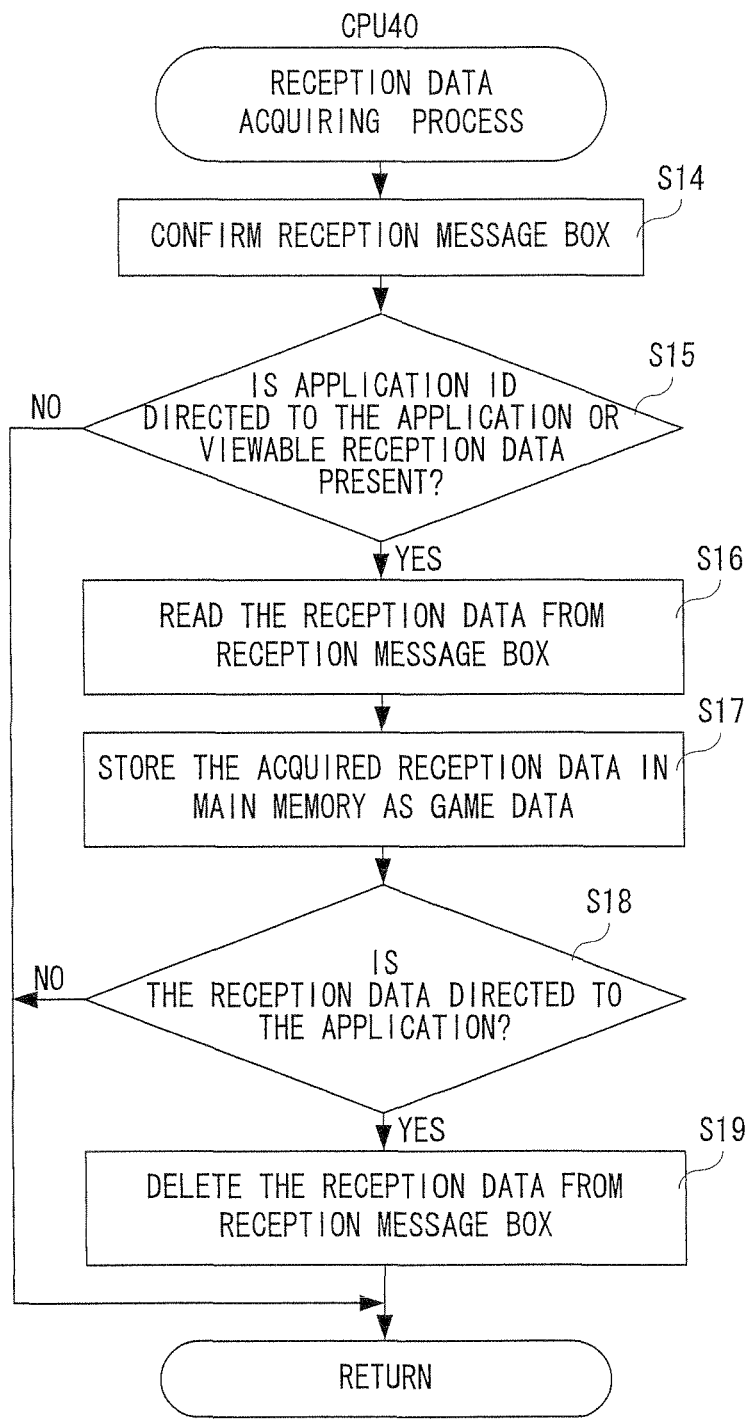
FIG. 18 is a flowchart showing a reception data acquiring process being a part of the game application process of the CPU shown in FIG. 2.

Next, in the step S5, it is determined whether or not a reception data acquiring instruction is issued, and if "YES" is determined, that is, if a reception data acquiring instruction is issued, the process proceeds to a reception data acquiring process in a step S6 shown in FIG. 18. On the other hand, if "NO" in the step S5, that is, if a reception data acquiring instruction is not issued, the process proceeds to a step S7.

Figure 19:
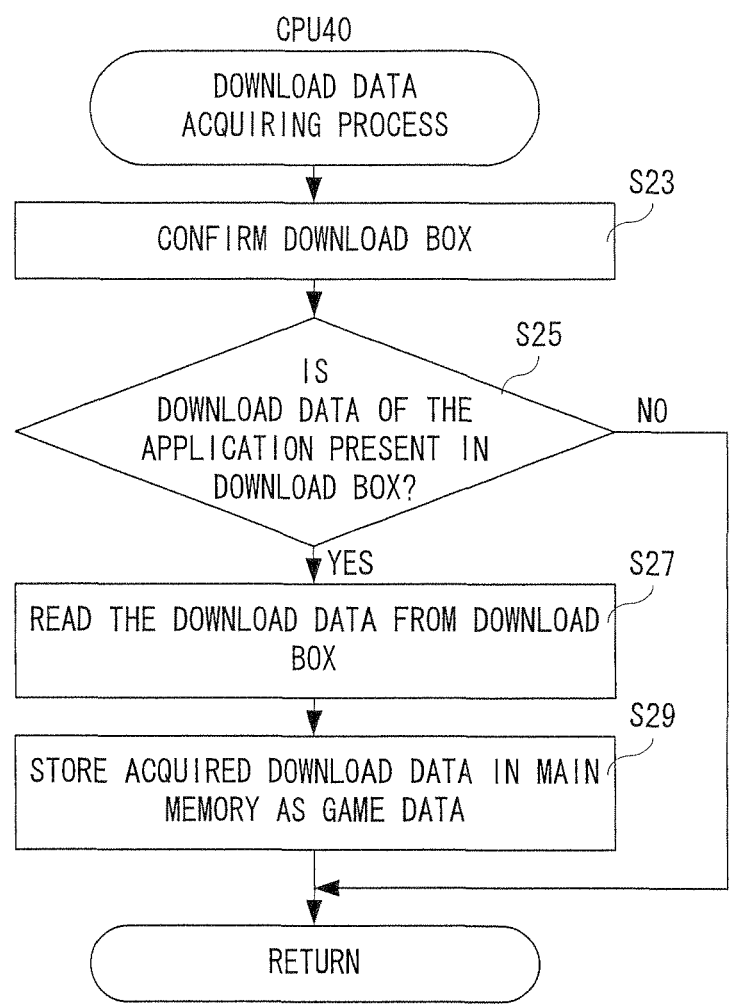
FIG. 19 is a flowchart showing a download data acquiring process being a part of the game application process of the CPU shown in FIG. 2.

Next, it is determined whether or not a download data acquiring instruction is issued in the step S7, and if "YES" is determined, that is, if a download data acquiring instruction is issued, the process proceeds to a download data acquiring process in a step S8 shown in FIG. 19. On the other hand, if "NO" in the step S7, that is, if an download data acquiring instruction is not issued, the process returns to the step S1. According to the above-described processes, reception data, transmission data, and download data can be used as necessary while the game process is executed.

Although illustration is omitted, processing of generating a downloading task under a predetermined condition in accordance with player's operation and in correspondence with occurrence of an event and storing it in the task list 44e may be included.

Next, a description is made on the transmission data creating process in the step S4, the reception data acquiring process in the step S6, and the download data acquiring process in the step S8.

First, a description is made on the transmission data creating process in the step S4 with reference to FIG. 17. First, in a step S9, a content of a message is created. The content of the message corresponds to the body of the electronic mail, like a content input by a user through a display of a software keyboard, a content automatically generated on the basis of the data generated in the game processing and etc. Next, in a step S10, a message in an electronic mail format including the body with the content is generated. Here, designating the destination, etc. is performed, and the header information shown in FIG. 10 is applied to the message.

Next, in a step S11, it is determined whether or not the destination is the game apparatus 12 of its own. The destination of the game apparatus 12 of its own is stored in the management file 44c described above, and the destination is thus read to be compared with the destination of the message. If "YES" in the step S11, the electronic mail created is stored in the reception message box 44b in a step S12. This is a case that a note, a message, a result of the game, etc. to be viewed by a user are created by utilizing a message board function, and by storing it in the reception message box 44b, the user can view it as in other reception data case without other processing for view being performed.

If "NO" in the step 11, the created electronic mail is stored in the transmission message box 44a in a step S13. The message is transmitted to a network 106 at an arbitrary timing in the input-output processor 42a independent of the processing by the CPU 40, and therefore, the game program is only necessary to include processing for generating data and storing it without preparation for a complicated program for transmission and reception.

Next, a description is made on the reception data acquiring process in the step S6 with reference to FIG. 18. First, in a step S14, a reception message box 44b is confirmed. Succeedingly, in a step S15, it is determined whether or not reception data having an application ID directed to the application or viewable reception data is present. That is, the CPU 40 determines whether or not an application ID matches the application ID indicated by the application with reference to the header information of the reception data stored in the reception message box 44b. Then, when the application ID is the information for identifying the application, the CPU 40 acquires the reception data. Furthermore, even when the application ID does not match the application ID of the application, if other application restriction is turned off, the CPU 40 can acquire the reception data as needed. It should be noted that the CPU 40 does not acquire the reception data except for these.

If "NO" in the step S15, that is, if reception data of the application ID directed to the application or viewable reception data is not present, the reception data acquiring process is directly ended and returned. On the other hand, if "YES" in the step 15, that is, if reception data of the application ID directed to the application or viewable reception data is present, the reception data is read from the reception message box 44b in a step S16. In a next step S17, the acquired reception data is stored in the main memory (42e, 46) as game data. Accordingly, the reception data is utilized in the game processing thereafter. For example, in correspondence with the game processing thereafter, the reception data may be stored in the save area 44f, and may be removed from the main memory after being utilized in the game processing.

In a step S18, it is determined whether or not the acquired reception data is the reception data directed to the application. If "NO" in the step S18, that is, if the acquired reception data is not the reception data directed to the application, the reception data acquiring process is directly ended and returned. That is, the reception data directed to other application is naturally for being utilized for other applications and inhibited from being deleted. On the other hand, if "YES" in the step 18, that is, if the reception data is the reception data directed to the application, the reception data normally need not to be left in the message box 44b after being acquired, and therefore, in a step S19, the reception data is deleted from the reception message box 44b, and the process is returned. However, if the disappearance attributes of the header information of the reception data shows "not erase", even if the reception data is directed to the application, the CPU 40 does not execute the process in the step S19 and returns the processing.

Next, referring to FIG. 19, a description is made on the download data acquiring processing in the step S8. First, in a step S23, the download box 44o is confirmed. Then, in a step S25, it is determined whether or not download data of the application is present. That is, the CPU 40 determines whether or not the download data attached with the application ID of the application is stored in the download box 44o.

If "NO" in the step S25, that is, if download data of the application is absent, the process directly returns. On the other hand. If "YES" in the step 25, that is, if download data of the application is present, the download data is read from the download box 44o in a step S27, and the acquired download data is stored as game data in the main memory (42e, 46) in a step S29, and the process is returned. Accordingly, the download data is utilized in the game process thereafter.

Additionally, the CPU 40 can access the internal main memory 42e and the external main memory 46 at higher rates of speed, and therefore, the reception data and the download data can be stored in any of the memories. For example, the reception data and the download data can be stored in the memory utilized by the game application (game program) and the game data.

Furtheimore, in this embodiment, although a description is made on a case that the CPU 40 executes the game application processing, the kind of the application need not to be restricted thereto, and similar processing can be executed in other kinds of the applications like image viewing software, for example.

For example, the aforementioned message board function is also an application, and therefore, a similar process is performed, but the message board function is an application for mainly creating and viewing a message, and therefore, the processes in the steps S7 and S8 are not executed. In what follows, with reference to FIG. 20 or FIG. 22, a description with respect to the message board function is made on more specific and detail processing than the above-described general (game) application. It should be noted that the description is made assuming that the message board function here includes processing of the reception data automatically executed when the power supply of the game apparatus 12 is turned on or in a state that the power supply of the game apparatus 12 is turned on as well as the processing relating to the display of the message board.

Figure 20:
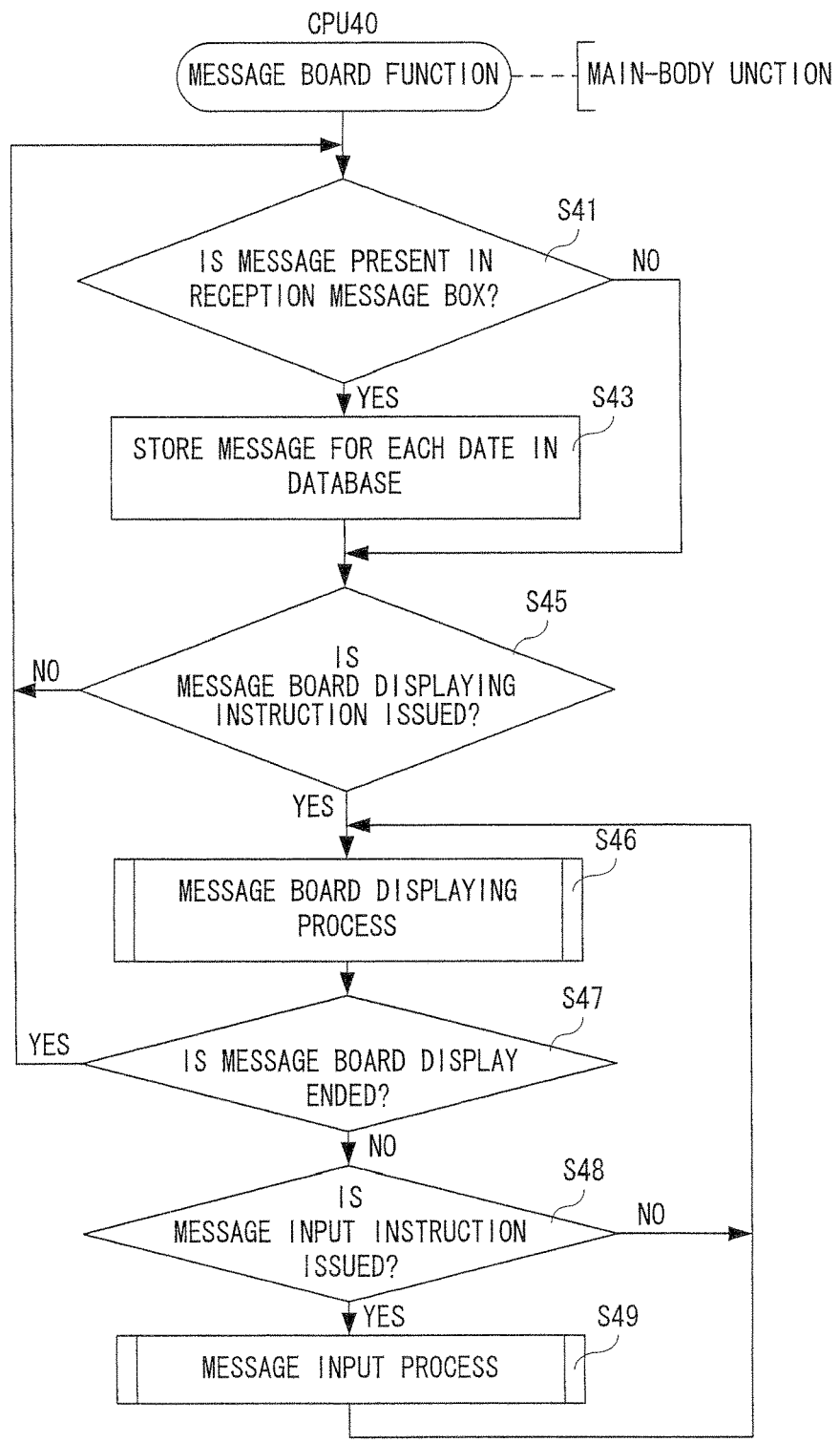
FIG. 20 is a flowchart showing a message board function being one of the applications of the CPU shown in FIG. 2.

With reference to FIG. 20, the CPU 40 periodically determines whether or not a message (reception data) is present in the reception message box 44b in a step S41 when the power supply of the game apparatus 12 is turned on, for example, when a menu screen is displayed. If "NO" in the step S41, that is, if the message is not present in the reception message box 44b, the process directly proceeds to a step S45. On the other hand, if "YES" in the step 41, that is, if a message is present in the reception message box 44b, the message is stored in the database 44g according to the header information for each date in a step S43, and the process proceeds to the step S45. That is, for displaying a message on the message board for each date, the reception data within the reception message box 44b is moved to the database 44g. As a method of storing the reception data in the database 44g for each date, for example, a folder is created for each date, for example and a message with a date may be stored in the folder corresponding to the date of the message. Furthermore, a file name of the message may be a designation representing the time.

In the step S45, it is determined whether or not a message board displaying instruction is issued. If "YES" in the step 45, that is, if a message board displaying instruction is issued, the process proceeds to the message board displaying process in a step S46 shown in FIG. 21. On the other hand, if "NO" in the step S45, the process returns to the step S41. That is, with respect to an entire message board function, even when the message board is not displayed, the reception data is moved to the database 44g. Furthermore, even during displaying the message board, the reception data may be moved, and if so, a message newly received can be confirmed in real time while viewing the message.

Figure 21:
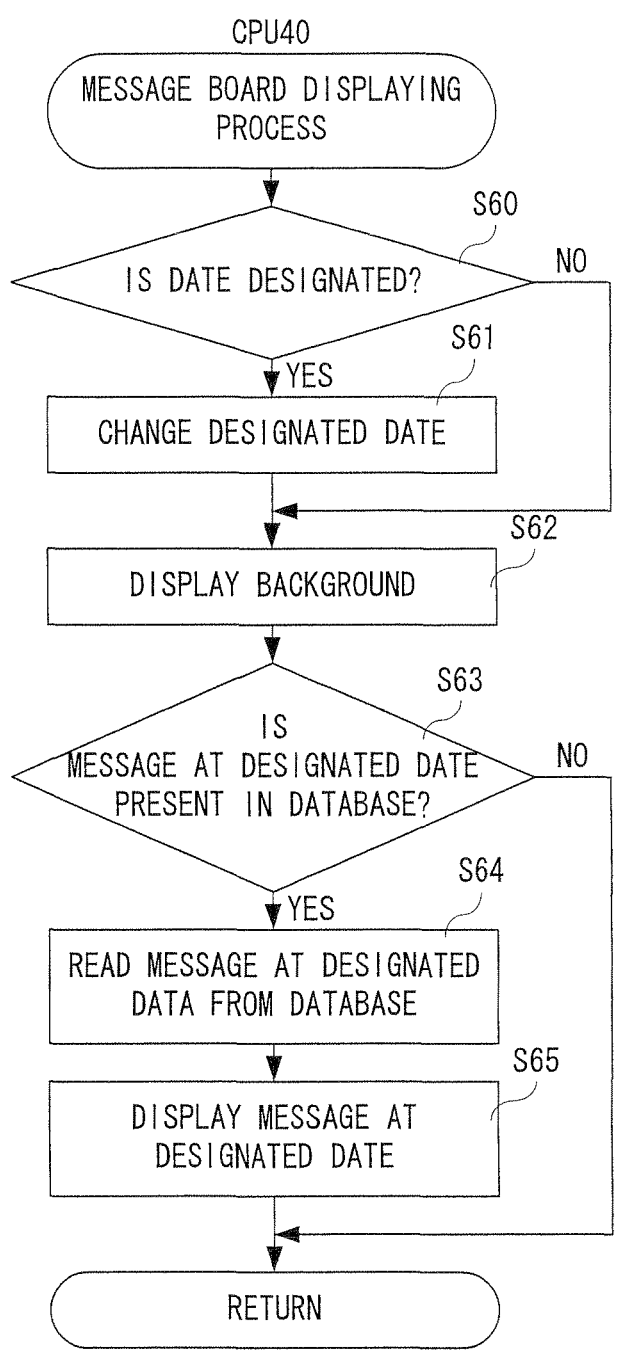
FIG. 21 is a flowchart showing a message board display process being a part of the message board function of the CPU shown in FIG. 2.

Next, with reference to FIG. 21, a description is made on the message board display process in the step S46. First, in a step S60, it is determined whether or not a date is designated. The message board is for displaying in a menu message for each date as shown in FIG. 9, and changing a designation of the date allows a user to view a message at the date. As a default of the designated date, the date on which display of the message board is performed, that is, "TODAY" is designated, and the date can be changed at any time until the end of displaying the message board. It should be noted that Today's date (year, month, and day) data can be acquired through an access to the ROM/RTC 48.

If "YES" in the step S60, that is, if the designated date is changed, the date is changed to the designated date in step S61. If "NO", the processing relating to the display described later is performed at the same date.

In a step S62, a process for displaying ones except for a message is performed by arranging a background and other objects. In a step S63, it is determined whether or not a message at the designated date is present within the database 44g. More specifically, in such an embodiment storing a message in a folder for each date, it is determined whether or not a file is present in the folder corresponding to the date. If "NO" in the step S63, a message to be displayed is absent, and therefore, a background except for the message is only displayed as it is, and the process is then returned.

If "YES" in the step 63, the CPU 40 reads a message at the date from the database 44g in a step S64. For example, in a case of the afore-stated embodiment, all the files within the folder corresponding to the date are read. Then, in a step S65, a process relating to displaying the read message is performed, and a message is displayed in a menu as shown in FIG. 9.

Returning to FIG. 20, in a step S47, it is determined whether or not displaying the message board is to be ended. For example, if an instruction from the user is issued, the display of the message board is ended. Accordingly, if "YES" in the step 47, the process returns to the step S41.

If "NO" in the step S47, displaying the message board is continued, but in a step S48, it is then determined whether or not a message input instruction is issued. On the message board, as shown in FIG. 9, a message creation button is displayed to allow a message creation in response to a user's instruction. If "YES" in the step S48 according to a condition that the message creation button is operated by the user, and so on, a message input process is performed in a step S49 shown in FIG. 22. If "NO", the process returns to the step S46 to continue to display the message board.

Figure 22:
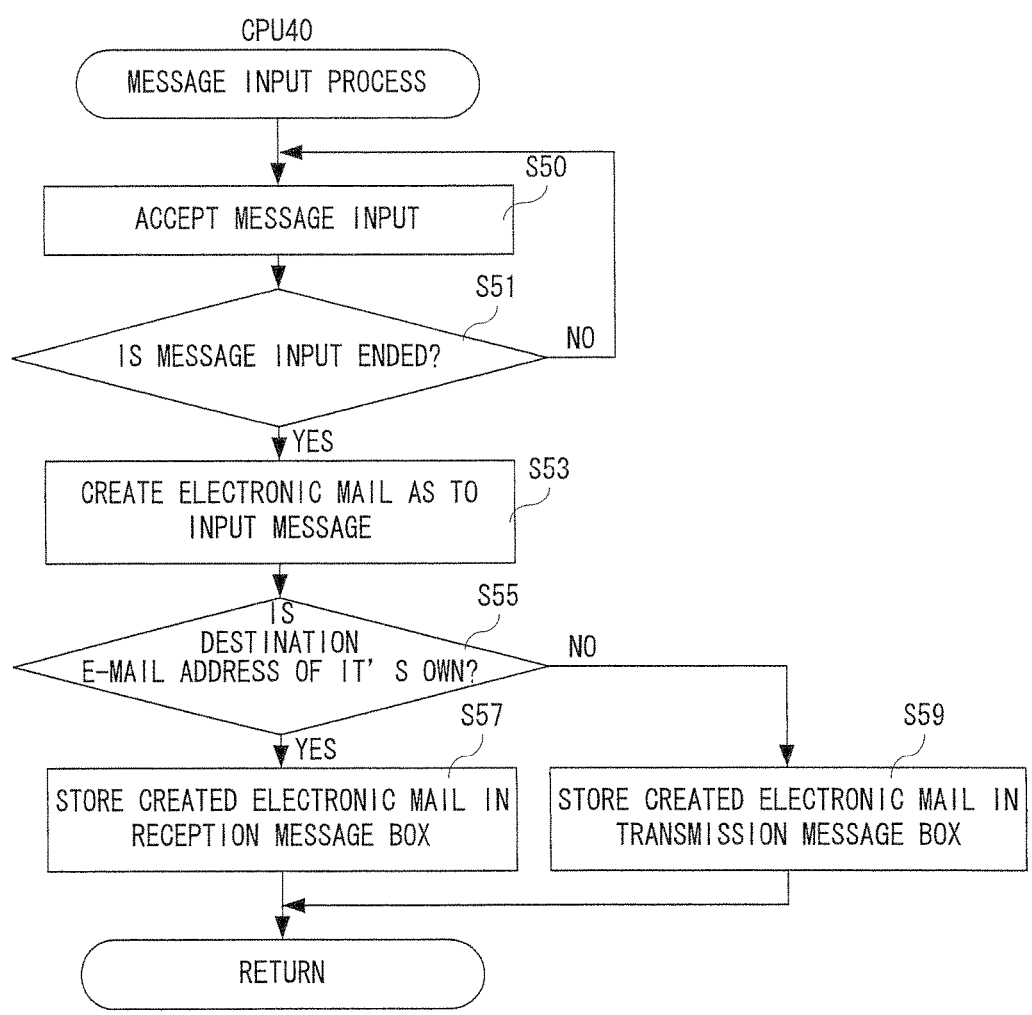
FIG. 22 is a flowchart showing a message input process being a part of the message board function of the CPU shown in FIG. 2.

The message input process shown in FIG. 22 is processing approximately similar to the processing of the transmission data creating process shown in FIG. 17, and the message creating means is performed in response to an input by the user. That is, in a step S50, an input of the message from the user is accepted. In this case, by displaying a software keyboard, for example, an input is accepted. Although illustration is omitted, if stopping the input of a destination and a message is instructed by the user, the input of the destination and the message is stopped, that is, the creation of the message is stopped, and the process returns to the step S47 shown in FIG. 20. Next, it is determined whether or not a message input is ended in a step S51. If "NO" in the step S51, that is, if the input of the message is not ended, since the message is being inputted, the process returns to a step S50. On the other hand, if "YES" in the step 51, that is, if the input of the message is ended, electronic mail relating to the input message is created in a step S53.

In what follows, the processing in the steps S53-S59 is the same as the processing in the steps S10-S13 shown in FIG. 17, and therefore, the description thereof is omitted. After completion of the message input process, the process returns to the message board display process in the step S46 to display in a menu the message to the end again.

Figure 23:
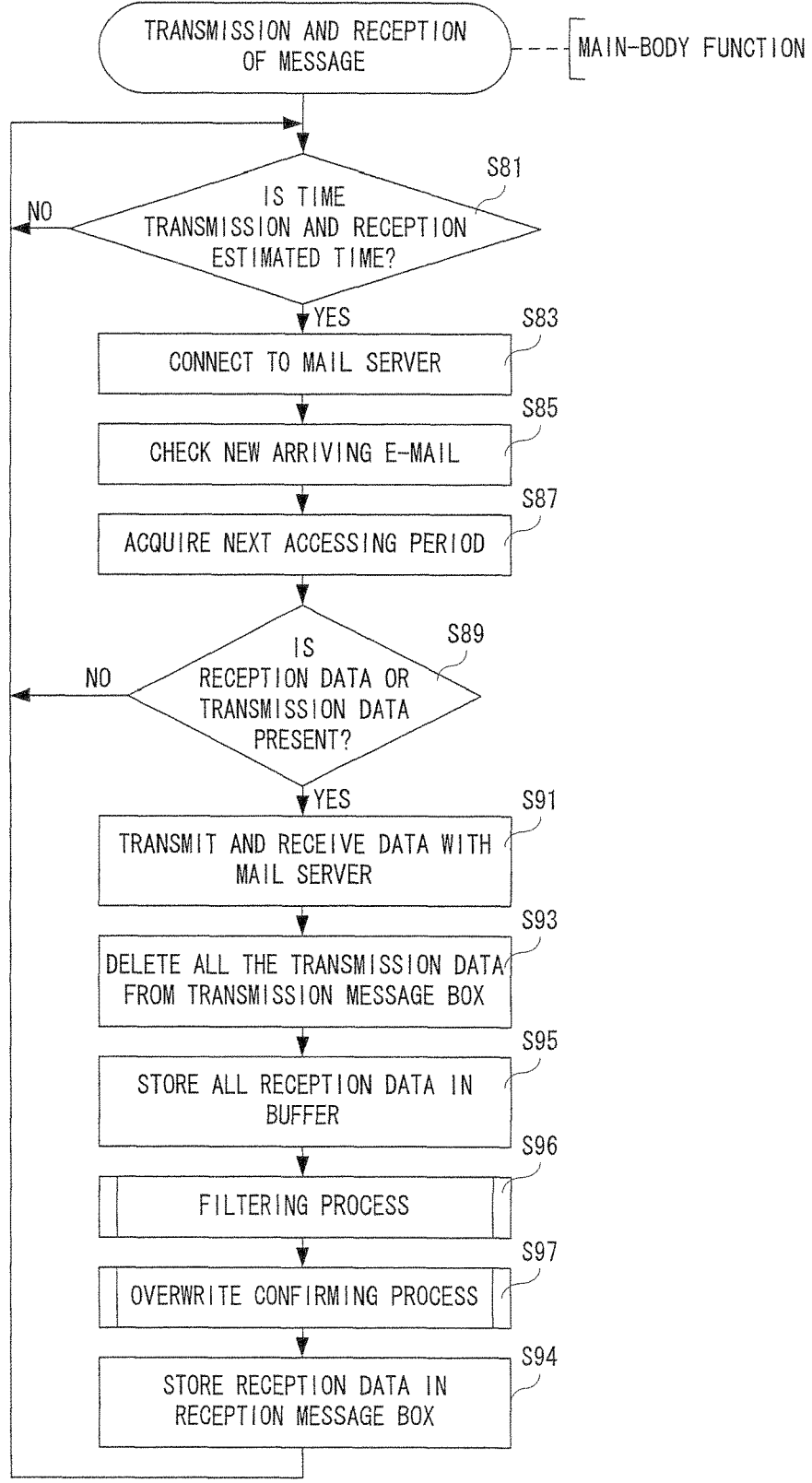
FIG. 23 is a flowchart showing a message transmitting and receiving process of an input-output processor shown in FIG. 2.
Figure 25:
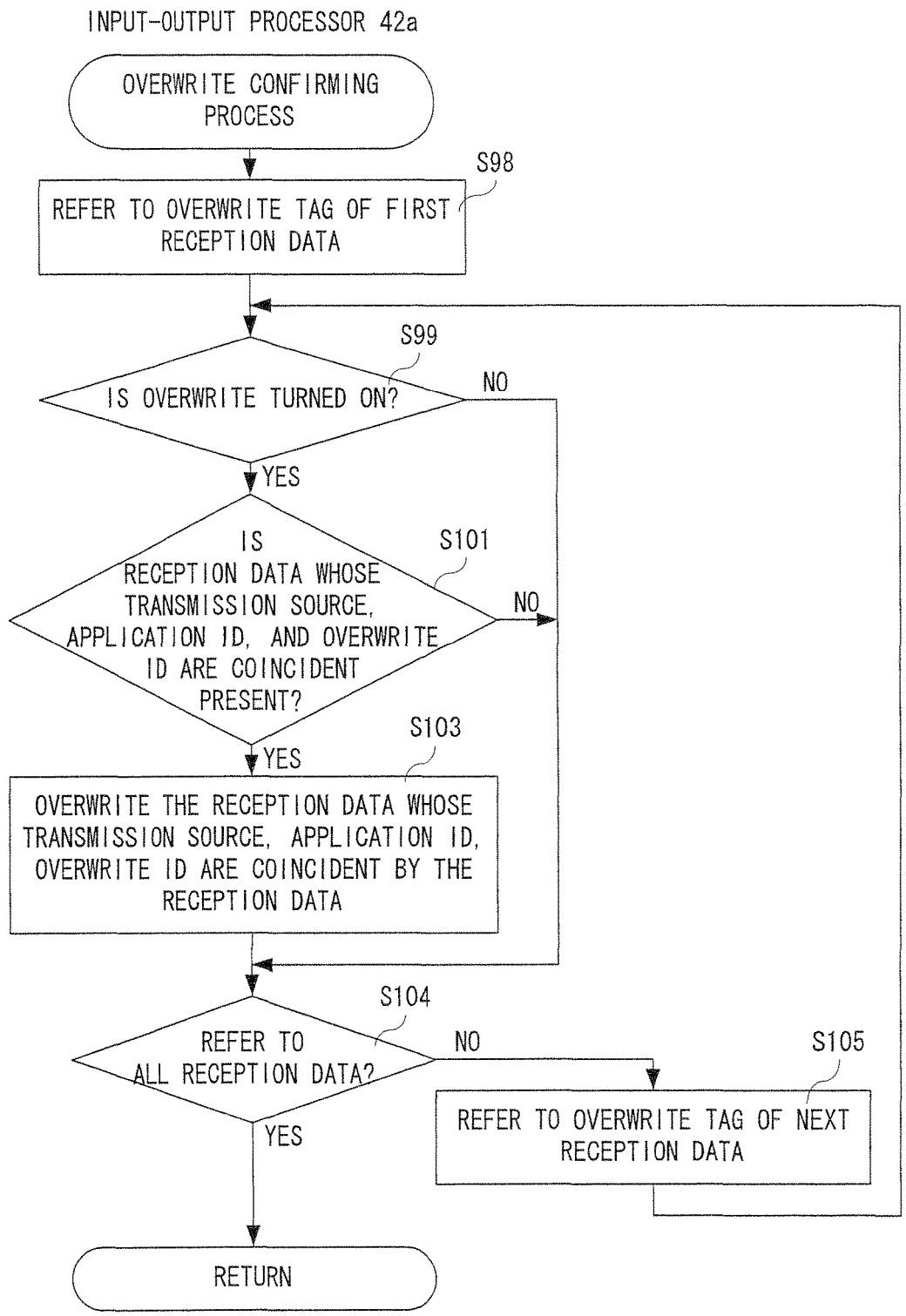
FIG. 25 is a flowchart showing overwrite confirming process being a part of the message transmitting and receiving process of the input-output processor shown in FIG. 2.

Next, with reference to FIG. 23 or FIG. 25, a description is made on a message transmitting and receiving process for allowing the input-output processor 42a shown in FIG. 2 to transmit and receive messages. The following processing is performed independent of the CPU 40, and executed even in the above-described standby mode because the input-output processor 42a is supplied with power. Thus, even when the user does not activate the game apparatus 12, the game apparatus 12 automatically makes the communication process in the standby mode, so that when the user activates the game apparatus 12, a new message has already been arrived, allowing the user to view the message immediately. As described above, the input-output processor 42a executes a process in accordance with a trigger generated per a predetermined unit of time. First, when a trigger is generated, it is determined whether or not a transmission and reception estimated time has come in a step S81. Here, the input-output processor 42a acquires a time from a time circuit provided in the ROM/RTC 48, and determines by comparison whether or not the time is equal to the transmission and reception estimated time set in advance.

If "NO" in the step S81, that is, if the transmission and reception estimated time has not come, the process returns to the same step S81 as it is to wait for a next trigger generation. In other words, the process in the step S81 is repeated every trigger generation until the transmission and reception estimated time expires. On the other hand, if "YES" in the step 81, that is, if the acquired time is equal to the transmission and reception estimated time, the game apparatus 12 is connected to the mail server 102 in a step S83. In a succeeding step S85, it is checked whether or not new arriving e-mail (new arriving message), that is, reception data is present in the server, and in a step S87, a next accessing period is acquired from the mail server 102 at the same time. It should be noted that in general, the game apparatus 12 (input-output processor 42*a*) is set so as to access the mail server 102 for every predetermined time (10 minutes, for example), and the predetermined time is acquired from the server every time. The change of the next accessing period is performed in a case that an access period is shifted due to maintenance, increase in the load, for example.

Succeedingly, in a step S89, it is determined whether or not reception data or transmission data is present. Here, the input-output processor 42*a* determines the presence or absence of the reception data to be received in accordance with the check of the new arriving mail in the step S85, and determines the presence or absence of the transmission data required to be transmitted by accessing the transmission message box 44*a*. If "NO" in the step S89, that is, if reception data or transmission data is absent, since the transmission and reception process is not required, the process directly returns to the step S81. If the transmission and reception are not required, the transmission and the reception are not performed by merely checking new arriving mail by the step S81, and therefore, it is possible to reduce the load on the network. On the other hand, if "YES" in the step 89, that is, if the reception data or the transmission data, or both of them are present, it is necessary to transmit and receive the data with the server, and therefore, in a step S91, the data is transmitted and received with the mail server 102. Here, the input-output processor 42*a* executes a transmitting process for transmitting the transmission data stored in the transmission message box 44*a* to the network 106, and executes a receiving process for receiving the reception data from the mail server 102 via the network 106.

In a succeeding step S93, all the transmission data transmitted in the step S91 is deleted from the transmission message box 44*a*. However, if the transmission data is not stored in the transmission message box 44*a*, and the transmitting process of the transmission data is not executed in the step S91, the input-output processor 42*a* does not perform the deleting process in the step S93, and therefore, the process directly proceeds to a step S95. In the step S95, all the reception data received in the step S91 is stored (temporarily stored) in the buffer. Although illustration is omitted, a buffer area is provided in the internal main memory 42*e* or the external main memory 46. The reception data stored in the buffer is stored in the reception message box 44*b* in a step S94, and a filtering process in a step S96 and an overwrite confirming process in a step S97 are performed on the reception data at the same time.

It should be noted that as a result of the checking the incoming mail, if the reception data is absent, that is, if only the transmission is performed, no processing is performed in the step S95 and the onward, and the process directly returns to the step S81.

Figure 24:
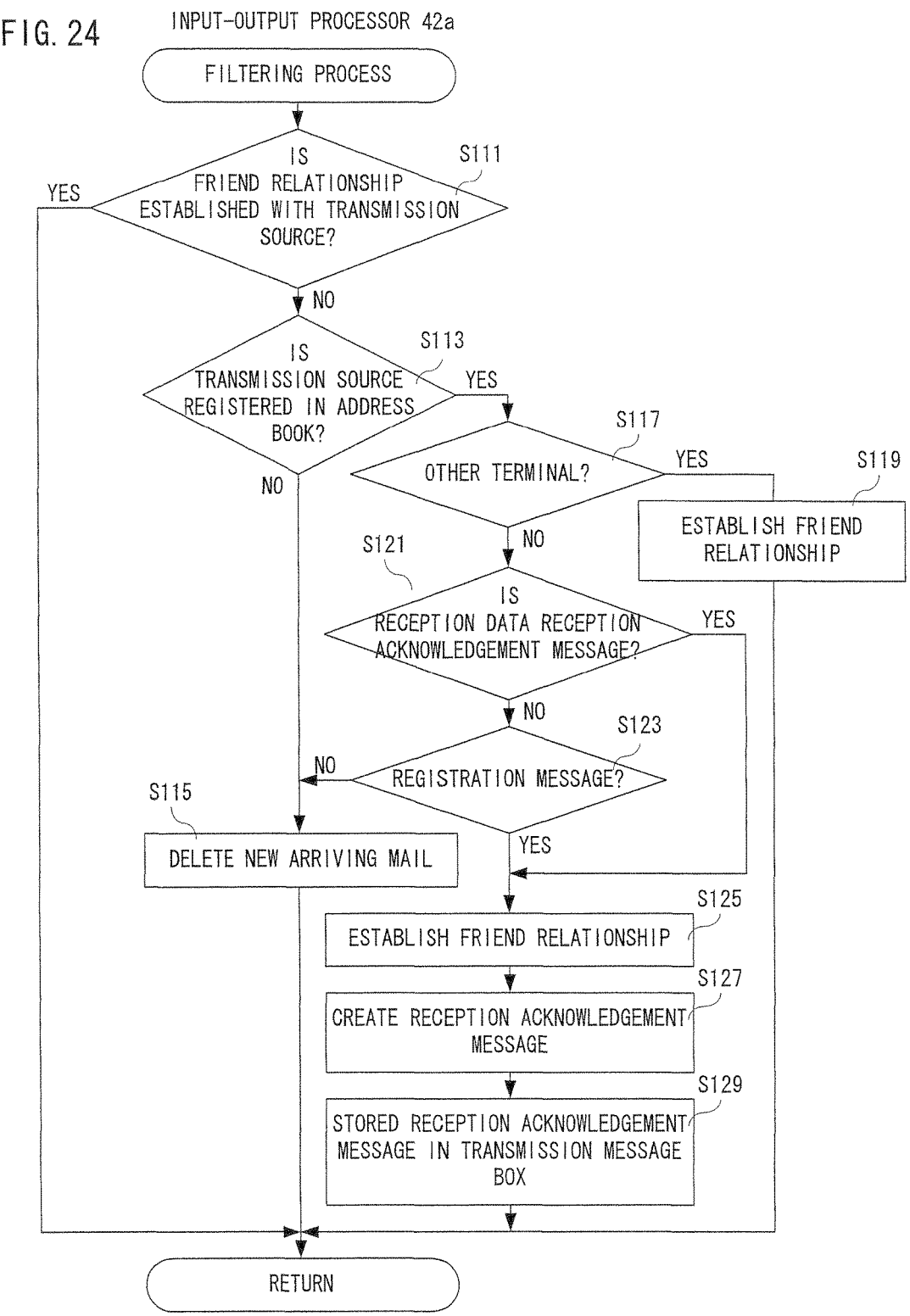
FIG. 24 is a flowchart showing a filtering process being a part of the message transmitting and receiving process of the input-output processor shown in FIG. 2.

Next, with reference to FIG. 24, a description is made on the filtering process in the step S96. First, in a step S111, with reference to the header information of all the reception data stored in the reception message box 44*b* and the friend list 44*d*, it is determined whether or not a friend relationship is established with each transmission source. For example, with reference to the friend list 44*d*, the input-output processor 42*a* determines whether or not a friend relationship is established (a flag is turned on, for example) with respect to the information on the transmission source (identification information or e-mail address) described in the header information. If "YES" in the step 111, if all the reception data is transmitted from the transmission source with which a friend relationship is established, the processing is returned in order to directly register them in the reception message box 44*b* in the processing onward.

On the other hand, if "NO" in the step S111, that is, if the reception data is transmitted from the transmission source with which a friend relationship is not established, it is determined whether or not the transmission source is registered in the address book, i.e., the friend list 44*d* in a step S113. That is, it is determined whether or not the state is that the opponent is merely registered, that is, before the friend relationship is established. It should be noted that the processes in the steps S113 to S129 are performed on each of the reception data from the transmission source with which a friend relationship is not established.

If "NO" in the step S 113, that is, if the transmission source is not registered in the address book, the new arriving e-mail (the reception data) is deleted from the buffer in the step S115 so as not to be registered in the reception message box 44*b*, and then, the process is returned. That is, the message whose transmission source is unidentified is filtered. On the other hand, if "YES" in the step 113, that is, if the transmission source is registered in the address book, it is determined whether or not the transmission source is other terminal in the step S117. Here, the input-output processor 42*a* determines whether or not the e-mail address does not include the identification information of the game apparatus 12 as the information of the transmission source.

If "YES" in the step 117, that is, if the transmission source of the reception data is other terminal, it is determined to be a reply to the registration message transmitted from the game apparatus 12 as shown in FIG. 14, and a friend relationship with the other terminal is established (the flag corresponding to the other terminal is turned on, for example) in the step S119. Then, the process returns to the step S81. On the other hand, if "NO" in the step S117, that is, if the transmission source of the reception data is other game apparatus 12, it is determined whether or not the reception data is a reception acknowledgement message shown in FIG. 13 in the step S121. Additionally, the reception acknowledgement message is a message (character string) capable of being transmitted and received with the game apparatus 12, and the content thereof is readable by each game apparatus 12 as described above.

If "YES" in the step 121, that is, if the reception data is a reception acknowledgement message, it is determined to be a reception acknowledgement message to the registration message transmitted from the game apparatus 12, the process directly proceeds to the step S125 in order to establish a friend relationship with the transmission source of the reception data. On the other hand, if "NO" in the step S121, that is, if the reception data is not a reception acknowledgement message, it is determined whether or not the reception data is a registration message in the step S123. If "NO" in the step S123, that is, if the reception data is not a registration message, the process directly proceeds to the step S115. On the other hand, if "YES" in the step 123, that is, if the reception data is a registration message, the process proceeds to the step S125 in order to establish the friend relationship with the transmission source of the reception data.

In the step S125, the input-output processor 42*a* establishes a friend relationship with the transmission source of the reception data (the flag of the friend relationship corresponding to the transmission source is turned on in the friend list 44*d*, for example.) Succeedingly, a reception acknowledgement message to be directed to the transmission source is created in the step S127, the created reception acknowledgement message is stored in the transmission message box 44*a* in the step S129, and the process is then returned. The reception acknowledgement message is transmitted when the transmission and reception of a message is activated at a next time.

Succeedingly, with reference to FIG. 25, a description is made on the overwrite confirming process in the step S97. In a step S98, an overwrite tag of first reception data is referred. Additionally, although a detailed description is omitted, the order of the reception data is for merely identifying the reception data, such as an order of receiving the data or an order according to the storage position within the buffer, and etc. This holds true for the following. In a next step S99, it is determined whether or not the reception data is to be overwritten. Here, the input-output processor 42*a* determines whether or not the overwrite tag included in the header information of the reception data indicates "ON".

If "NO" in the step S99, that is, if the overwriting is not performed, the process directly proceeds to a step S104. On the other hand, if "YES" in the step 99, that is, if the overwrite tag is turned on, it is determined whether or not reception data whose transmission source, application ID, and overwrite ID matches are equal to that of the reception data is stored in the reception message box 44*b* in a step S101. If "YES" in the step 101, that is, if reception data whose transmission source, application ID, and overwrite ID are equal to that of the reception data is stored in the reception message box 44*b*, the message is a message to be overwritten, and therefore, the reception data is stored in the reception message box 44*b* such that the reception data is overwritten with the reception data whose transmission source, application ID, and overwrite ID are equal in a step S103, and then, the process proceeds to the step S104. Additionally, in this explanation, since storing the reception data in the reception message box 44*b* is performed in the step S94, the process proceeds to a next step while temporarily holding a setting of overwrite, or the overwrite may be performed first in the step S103 to delete the data from the buffer, and the data satisfying the above-described condition is only necessary to be overwritten. On the other hand, if "NO" in the step S101, that is, if reception data whose transmission source, application ID, and overwrite ID are equal to that of the reception data is not stored in the reception message box 44*b*, there is no message to be overwritten, and therefore, the process directly proceeds to the step S104.

In the step S104, it is determined whether or not the above-described processing is performed with reference to all the reception data. If "YES" in the step 104, that is, if the processing is performed with respect to all the reception data, the process is returned. On the other hand, if "NO" in the step S104, that is, if the processing with respect to all the reception data has not yet finished, an overwrite tag of the next reception data is referred in a step S105, and the process returns to the step S99.

Figure 26:
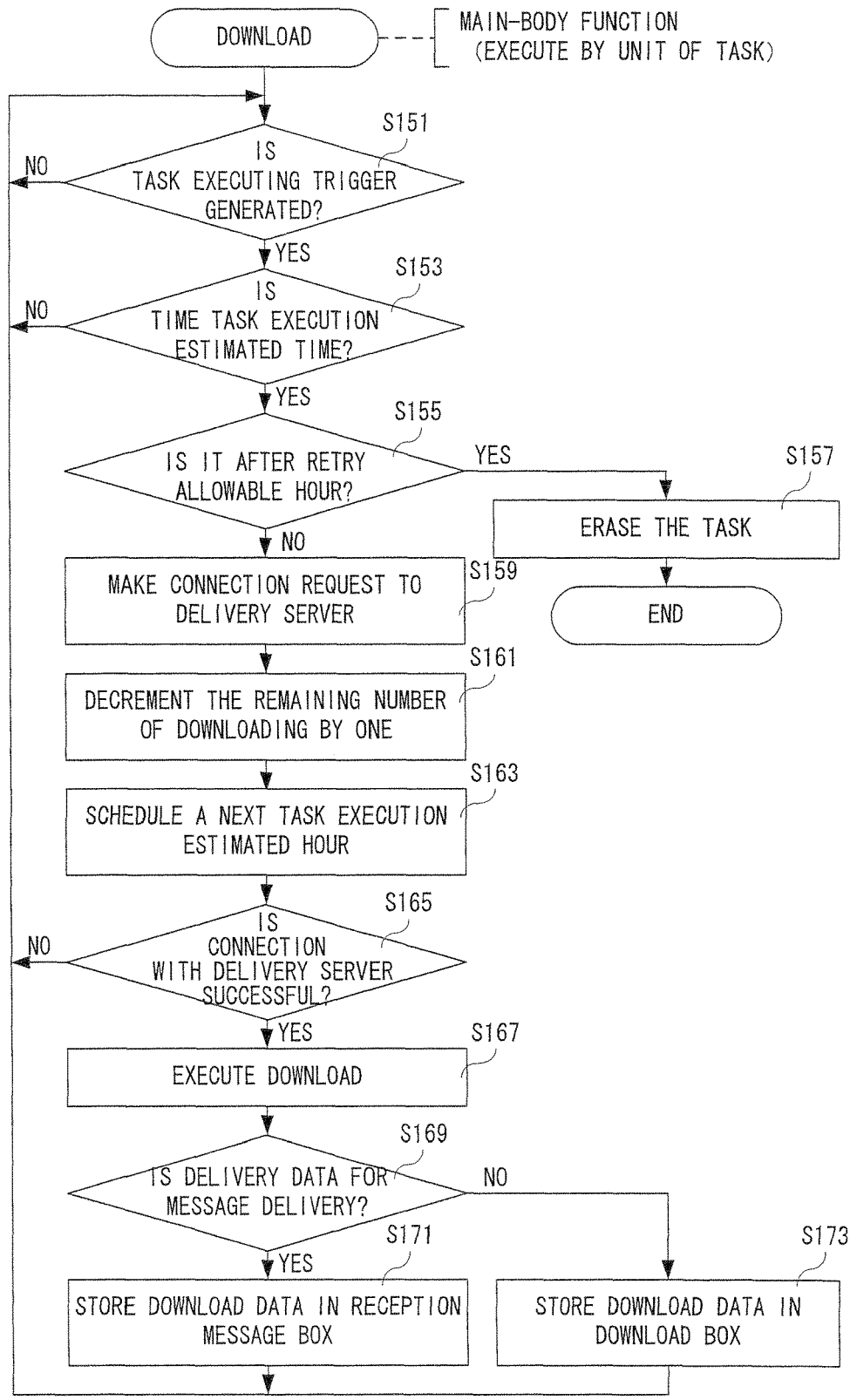
FIG. 26 is a flowchart showing a download process of the input-output processor shown in FIG. 2.

Next, with reference to FIG. 26, a description is made on the download process of the input-output processor 42*a*. The download process is executed by the input-output processor 42*a* independent of the CPU 40, and executed also in the above-described standby mode. Furthermore, the download process is independently executed during execution of an application by the CPU 40. Additionally, the download process is continued to be executed with the task registered every time that a trigger is generated within the input-output processor 42*a*. However, the download process is executed in each of the tasks. As shown in FIG. 26, the input-output processor 42*a* detects generation of the trigger for executing a task (task executing trigger) in a step S151. If "NO" in the step S151, that is, if the task executing trigger is not generated, the process returns to the step S151. On the other hand, if "YES" in the step 151, that is, if the task executing trigger is generated, it is determined whether or not the task execution estimated time has come in a step S153. Strictly speaking, the input-output processor 42*a* determines whether or not the time is an execution estimated time, or it is after the execution estimated time.

If "NO" in the step S153, that is, if it is not the task execution estimated time, the process directly returns to the step S151. On the other hand, if "YES" in the step 153, that is, if the time is the task execution estimated time it is determined whether or not it is after a retry allowable hour in a step S155. If "YES" in the step 155, that is, if it is after the retry allowable hour, the task is erased from the task list 44*e* in a step S157, and the download process is then ended. However, the download process is executed for each task, and this means that the task relating to the download process is ended, but the download process as to other task is activated in response to generation of a trigger.

On the other hand, if "NO" in the step S155, that is, it is not after the retry allowable hour, a connection request is transmitted to the delivery server 104 in a step S159. That is, the input-output processor 42*a* sends an access request to the URL of the acquiring source of the content (download data) indicated by the attribute of the task. Succeedingly, in a step S161, the remaining number of times of downloading as to the task is subtracted by one. Here, although illustration is omitted, the input-output processor 42*a* deletes the task from the task list 44*e* at a time when the remaining number of times of downloading becomes zero so as to prevent a next downloading from being performed. In a step S163, a next task execution estimated time is scheduled.

Then, in a step S165, it is determined whether or not a connection with the delivery server 104 is successful. If "NO" in the step S165, that is, if a connection with the delivery server 104 is unsuccessful, the process directly returns to the step S151. In this embodiment, the input-output processor 42*a* directly returns to the step S151, when a connection with the delivery server 104 is unsuccessful, but where a connection is unsuccessful if a connection request is issued at predetermined number of times (three times of retry, for example), the process may be returned to the step S151. Furthermore, in a case that an error occurs to the network and the server, the retry may not be performed. Furthermore, in such an error, when the above-described subtraction of the remaining number of times is performed, the process may be ended without executing a download, and therefore, the process in the step S161 is performed after the step S165 so as not to perform the subtraction of the remaining number of times.

If "YES" in the step 165, that is, if a connection with the delivery server 104 is successful, downloading is executed in a step S167. That is, the input-output processor 42*a* acquires download data. Then, in a step S169, it is determined whether or not the download data is data for a message delivery. For example, if the data for message delivery is the data in an electronic mail format, the input-output processor 42*a* determines whether or not the acquired download data is in an electronic mail format. Or, information indicative of the message delivery data is included in the download data, and after execution of the download, the download data may be transformed into the data in an electronic mail format in the game apparatus 12.

If "YES" in the step 169, that is, if the download data is data for message delivery, the download data is stored in the reception message box 44h as reception data in a step S171, and the process returns to the step S151. On the other hand, if "NO" in the step S169, that is, if the download data is not data for message delivery, the download data is stored in the download box 440 in a step S173, and the process then returns to the step S151.

The above-described message transmitting and receiving process and download process are basically executed by the input-output processor 42a independent of the CPU 40 during execution of an application like a game application by the CPU 40 and during the stand-by mode. However, in a case that a suspend instruction is especially issued from the CPU 40 (application), the message transmitting and receiving process (automatically transmitting and receiving function) is temporarily stopped. Thereafter, in response to a restart instruction from the CPU 40 (application), the message transmitting and receiving process is restarted. Such a suspend and restart function of the message transmitting and receiving process and the download process (hereinafter to be called a scheduler operation function) may be included in each application program.

For example, in a case that the CPU 40 executes a high usage application, it is possible to prevent the processing speed from temporarily being reduced. Furthermore, in a case that a communication process (playing a network game, for example) except for the above-described message transmitting and receiving process and download process is simultaneously executed, it is possible to prevent a communication speed from being reduced. Furthermore, in the application, depending on accessing timing to the flash memory 44, it is possible to prevent temporary reduction in an accessing speed due to concentrated access to the flash memory 44.

Accordingly, by utilizing such a scheduler operation function, it is possible to temporarily stop the message transmitting and receiving process and download process. The scheduler operation function can be called at any step during execution of an application. Thus, the message transmitting and receiving process and the download process are temporarily stopped before mass data is read from the flash memory 44, and the message transmitting and receiving process and the download process can be restarted after completion of the reading, for example. Alternatively, at a time when the transmitting process of the message is completed, the message transmitting and receiving process is temporarily stopped, and then, after the message transmitting and receiving process is restarted, the receiving process of the message may be executed, for example.

According to this embodiment, a transmitting and receiving of messages is performed irrespective of the normal mode and the standby mode, and therefore, the game apparatus to be communicated with each other do not have to be activated. Furthermore, the data capable of identifying the application is transmitted and received by a main body function, and therefore, a communication function is not required to be provided for each application, is thus capable of cutting down on the cost. Furthermore, there is no need to be connected to the network during creation of a message, and therefore, it is possible to save a work by a user and cut down on the communication cost. Accordingly, it is possible to provide a communication method in high general versatility with less cost and user's work.

In this embodiment, in a case that the overwrite ID of the overwrite tag indicates "overwrite", when the previous message whose information of the transmission source, application ID, and overwrite ID are equal to that of the acquired message is present in the reception message box 44b, the previous message is overwritten by the current message. However, there may be a case that an older message may be received after the latest message. In such a case, the latest message may be overwritten by the older message. Furthermore, there may be a case that a much important message is overwritten by a less important message.

For avoiding such a disadvantage, information (priority ID) indicative of priority of overwriting depending on newness and importance of the message is added. For example, the priority ID is numeric, and the larger the number is, the higher the priority is while the smaller the number is, the lower the priority is. Accordingly, when a message is received, in a case that the information of the transmission source, the application ID, and the overwrite ID of the message are coincident with that of the previous message and the number indicated by the priority ID is larger, the previous message is overwritten by the message.

Furthermore, in the game apparatus 12 of other embodiment, a message automatic reply function may be provided. The other embodiment is the same as the above-described embodiment except for provision of the message automatic reply function, and therefore, a redundant explanation is omitted. In the game apparatus 12 of the other embodiment, message automatic reply information is described so as to be added to the header information of the message or included in the header information. The automatic reply information is identified by three kinds like "not automatically reply", "automatically reply (copy attribute)", and "automatically reply (move attribute)".

For example, if a message is auto-replied, identification information (message ID) for identifying the message including information as to a transmittable state is applied. In a case that the message ID is added to the message (transmission data), the transmission data is in the stand-by state even in the message transmitting and receiving process without being transmitted to the network 106. By deleting the message ID, the message becomes a transmittable state, and transmitted in a message transmitting and receiving process to be executed at the next time. In this embodiment, in a case that reception data added with a message ID the same as the message ID, the message ID added to the transmission data is deleted.

However, in the other embodiment, the reception data to which the message ID the same as the message ID added to the transmission data is added is received, the message ID of the transmission data is deleted. It should be noted that a message ID added to the reception data (for convenience of explanation, referred to as "receiving side message ID") does not have to be the same as the message ID added to the transmission data (for convenience of explanation, referred to as "sending side message ID"). For example, the receiving side message ID and the sending side message ID has a relationship of a pair of (a set of) keys, and the sending side message ID may be solved by the receiving side message ID. Furthermore, irrespective of the content of the receiving side message ID, by deleting the sending side message ID, a reply is transmitted to all the apparatuses which make a reply request.

Thus, the user separately transmits or notifies by other means a message ID the same (or a pair of (a part of)) as the message ID of the transmission data to other user with whom an automatic reply is made. However, the user can know a message ID to be separately transmitted by a notification (screen display) from the game apparatus 12 (input-output processor 42*a*) when creating a message for auto-reply.

When a reply (transmission request) to the message ID notifying message or a message to which a separately notified message ID is added is received from the user to which the message ID has separately been transmitted, the message ID added to the transmission data is deleted, the transmission data sets in a transmittable state, and then can be transmitted to the game apparatus 12 of other user and other terminal. That is, it is possible to make an auto reply to other user.

In what follows, an example of utilizing the auto-reply of this embodiment in the game is explained. For example, in this application, it is supposed that a player can produce a weapon (item) for himself, and can sell the weapon in a flea market. In such a case, a user A which produces an original weapon sells the weapon in the flea market. That is, an application on the user A side registers a message including weapon data as an auto-reply message (message attached with message ID) in the transmission message box 44*a*. At this time, the application on the user A side can know a message ID of the message including weapon data. The application on the user A side transmits the message ID of the message including the weapon data to the user B. An application on the user B side notifies a user B that "a weapon is sold in a user A's flea market" by a message. When the user B determines to buy the weapon, the application on the user B side transmits to the user A a message ID of a message including weapon data and a message utilizing an auto-reply function of designating "move attribute". The user A side which has received the message including the auto-reply function from the user B searches whether or not transmission data (message) to which the designated message ID is added is present in the transmission message box 44*a* by a message transmitting and receiving function. Then, if the transmission data (message) to which the designated message ID is added is present in the transmission message box 44*a*, an attribute for an auto-reply (message ID, here) is deleted, and the transmission data is made transmittable. Thereafter, transmission data including the weapon data is sent so as to be directed to the user B.

In a case that the move attribute is thus designated, the transmission data (weapon data) is not copied but deleted after replying once. Additionally, if the copy attribute is designated, when the attribute for an auto-reply is deleted from the transmission data, a copy of the transmission data is held in a transmittable manner in the transmission message box 44*a*. Depending on the difference in purposes, that is, depending on whether an auto-reply is performed only once or every time, respective attributes can be discriminated.

In the above-described embodiment, the auto-reply function is utilized for selling and buying a weapon in the game, and the object to be utilized is not limited to the weapons, and can be used in various purposes like an exchange of items and characters, an exchange of a history, etc.

A detailed processing for an auto-reply is made by modifying a part of the message transmitting and receiving process shown in the above-described embodiment. Additionally, the embodiment is the same as the above-described embodiment except for the modified part, and therefore, a description is made on only the different part. Although a detailed description is omitted, in the message input process in the above-described embodiment, it is only necessary to select (set) "copy attribute" and "move attribute" at a time of making electronic mail.

Figure 27:
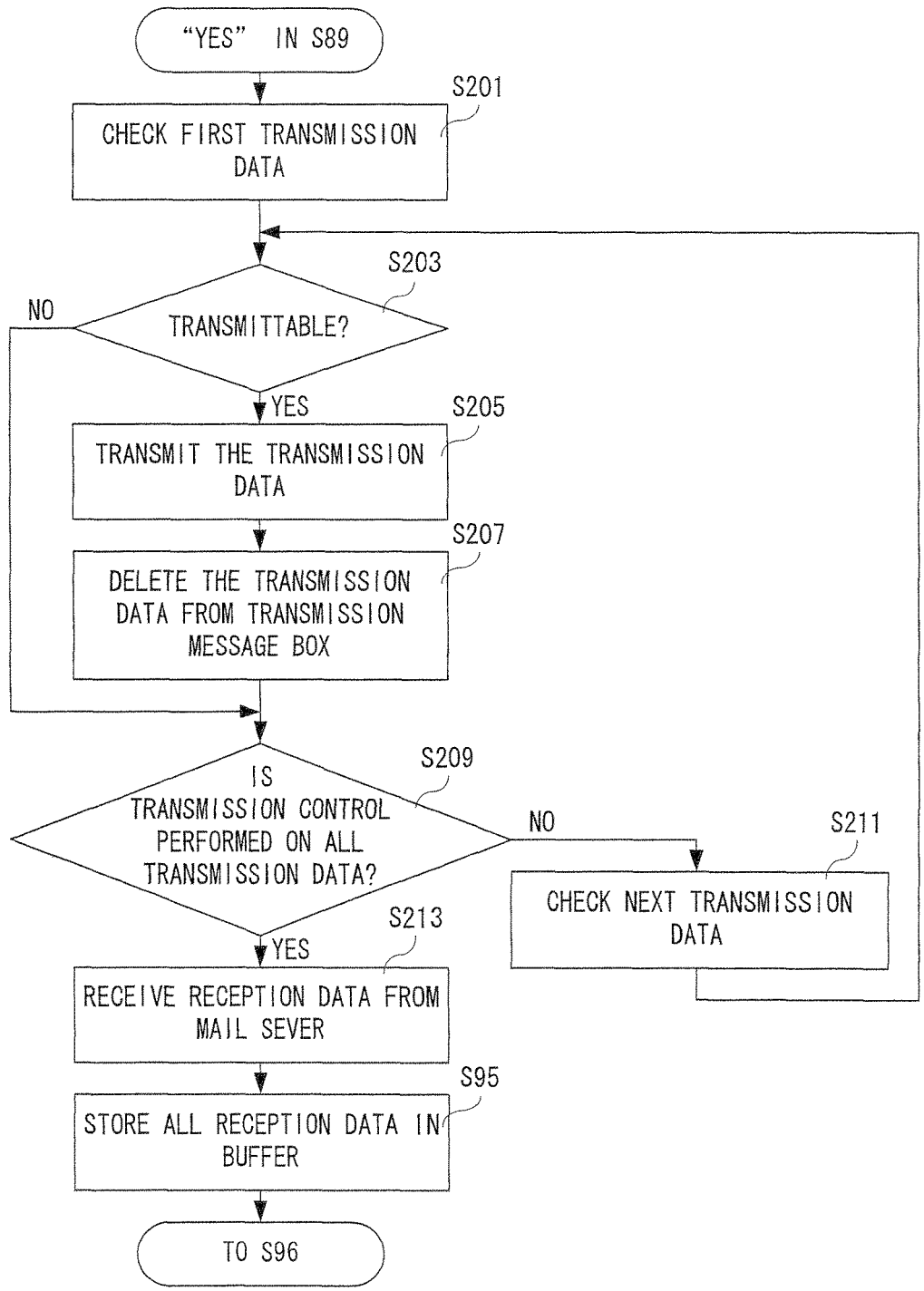
FIG. 27 is a flowchart showing a part of the message transmitting and receiving process in another embodiment of the present exemplary illustrative embodiment.

If "YES" in the step 89 shown in the message transmitting and receiving process shown in FIG. 23, the processes shown in the steps S91, S93, and S95 become processes shown in FIG. 27. In a step S201, first transmission data in the transmission message box 44*a* is checked. In a succeeding step S203, it is determined whether or not the transmission data is transmittable. More specifically, the input-output processor 42*a* determines whether or not a message ID is added to the transmission data.

If "NO" in the step S203, that is, if the transmission data is untransmittable, the process directly proceeds to a step S209. On the other hand, if "YES" in the step 203, that is, if the transmission data is transmittable, the transmission data is transmitted to the network 106 in a step S205. Then, in a step S207, the transmission data is deleted from the transmission message box 44*a*, and then, the process proceeds to the step S209.

In the step S209, it is determined whether or not a transmission control is executed on all the transmission data. If "NO" in the step S209, that is, if a transmission control of all the transmission data is not executed, next transmission data is checked in a step S211, and then, the process returns to the step S203. On the other hand, if "YES" in the step 209, that is, if a transmission control of all the transmission data is executed, reception data is received from the mail server 102 in a step S213, and then, the process proceeds to the step S95.

Figure 28:
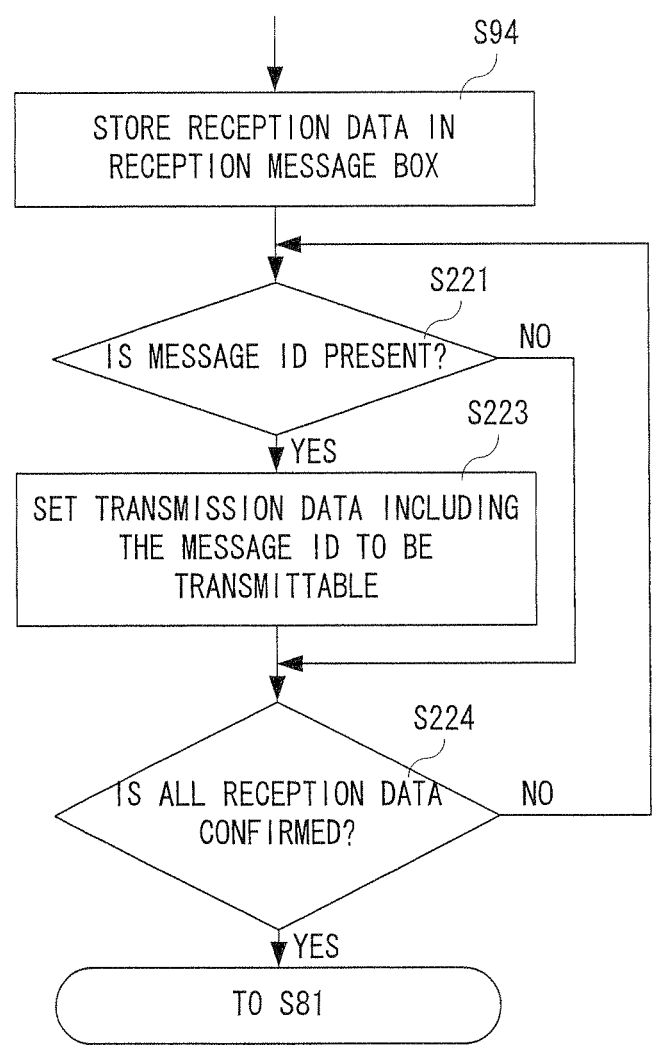
FIG. 28 is a flowchart showing another part of the message transmitting and receiving process in another embodiment of the present invention.

Furthermore, a process shown in FIG. 28 is executed after the step S94 in the message transmitting and receiving process. When the reception data is stored in the reception message box 44*b* in the step S94, it is determined whether or not the reception data has a message ID in a step S221. If "NO" in the step S221, that is, if the reception data does not have a message ID, the process directly proceeds to a step S224. On the other hand, if the reception data has a message ID in the step S221, the transmission data including the message ID is set to be transmittable in a step S223, and then, the process proceeds to the step S224. That is, in the step S223, if "copy attribute" is designated as an attribute of the auto-reply function, a copy of the transmission data to which a message ID the same as the message ID included in the reception data is added is stored in the transmission message box 44*a*, and the copy is made transmittable. Furthermore, in the step S223, if "move attribute" is designated as an attribute of the auto-reply function, from the transmission data to which a message ID the same as the message ID included in the reception data, the message ID is deleted to make the transmission data transmittable.

However, when the transmission data which is made transmittable is stored in the transmission message box 44*a*, the transmission data is transformed in an electronic mail format, and an e-mail address of the game apparatus 12 which request an auto reply is automatically registered as a destination. However, the processes in the S221, S223, and S224 may be performed on not the data stored in the reception message box 44*b*, but may be performed on the data held in the buffer.

According to the other embodiment, by means of the auto-reply function, it is possible to exchange a specific item with a specific user, and give a specific item to a specific user. Thus, it is possible to provide a communication environment increased in customer convenience in addition to the advantage in the above-described embodiment.

While the exemplary embodiments of the present invention have been described above, it is to be understood that the present invention is not to be limited to the above disclosed embodiments but on the contrary, is intended to cover various modifications and equivalent arrangements included within the spirit and scope of the appended claims.

What is claimed is:

1. An information processing system including communication circuitry for transmitting and receiving data with a network and a storage medium having a download data storage location for storing received download data, said information processing system being configured to execute an application by utilizing said download data from said network, said information processing system comprising:
application processing circuitry for executing said application;
a task storage location in said download data storage location for storing communication schedule data including at least information of a downloading schedule for each application, said communication schedule data including:
a permissible remaining number of times to download a file, and
a past time indicating an estimated time for a next download to occur after a downloading interval;
download managing circuitry for reading said communication schedule data from said task storage location, causing said communication circuitry to communicate with said network on the basis of said communication schedule to download predetermined data, storing in said download data storage location said download data from said network for said application, detecting a communication error, causing a permissible remaining number of times said file may be downloaded to not be decremented in response to detecting said communication error, and deleting said communication schedule data if said past time expires without said download being made;
wherein in a first mode of said information processing system said application processing circuitry is powered to execute said application and said communication circuitry is powered to transmit and receive data with said network, and in a second mode of said information processing system said application processing circuitry is not powered to execute said application but said communication circuitry is powered to transmit and receive data with said network; and
switching circuitry for switching said information processing system between said first mode and said second mode,
wherein said application processing circuitry, when said download data for said application exists in said download data storage location, performs utilization of said download data when said information processing system is in said first mode.

2. The information processing system according to claim 1, wherein said application processing circuitry further performs a task registering process for storing said communication schedule data in said task storage location.

3. The information processing system according to claim 1, wherein said download managing circuitry deletes said communication schedule data when said permissible remaining number of times said file may be downloaded is zero.

4. The information processing system according to claim 1, further comprising time outputting circuitry for outputting data indicative of said past time, and said download managing circuitry determines said estimated time for a subsequent download on the basis of said downloading interval.

5. The information processing system according to claim 1, wherein said download managing circuitry causes said communication circuitry to make a communication in at least said second mode.

6. A system comprising:
one or more processors for executing an application;
an input/output processor, operatively coupled to the one or more processors, for communicating data with a network based at least in part on communication schedule data, wherein the communication schedule data includes a time limit for a download to occur;
download managing circuitry for deleting the communication schedule data if the time limit expires without the download occurring; and
switching circuitry for switching the system between a first mode of operation and a second mode of operation;
wherein, in the first mode of operation, sufficient power is provided to enable the one or more processors to execute the application and to enable the input/output processor to communicate data with the network; and
wherein, in the second mode of operation, power to the one or more processors is restricted so that the one or more processors cannot execute the application, while sufficient power is provided to the input/output processor to enable communication of data with the network.

7. The system as in claim 6, further comprising a flash memory which stores data received from the network and data to be transmitted to the network by the input/output processor in both the first mode and the second mode.

8. The system as in claim 6, further comprising a flash memory which stores data received from the network and data to be transmitted to the network by the input/output processor in both the first mode and the second mode, the data stored in the flash memory being in an electronic mail format.

9. The system as in claim 6, further comprising a flash memory which stores data received from the network and data to be transmitted to the network by the input/output processor in both the first mode and the second mode, the data stored in the flash memory including data identifying an application which will utilize the stored data.

10. A method of operating a system, the method comprising:
controlling power to one or more processors for executing an application;
controlling power to an input/output processor, operatively coupled to the one or more processors, for communicating data with a network based at least in part on communication schedule data, wherein the communication schedule data includes:
a permissible remaining number of times to download a file, and
a past time indicating an estimated time for a next download to occur after a downloading interval;
decrementing the permissible remaining number of times every time the file is downloaded;
receiving a first input;
switching from a normal mode of system operation to a standby mode of system operation based at least in part on receiving the first input;
receiving a second input;
switching from the standby mode to the normal mode based at least in part on receiving the second input;
wherein, in the normal mode, power to the one or more processors and the input/output processor is controlled so that the one or more processors executes the application and the input/output processor communicates data with the network; and wherein, in the standby mode, power to the one or more processors and the input/output processor is controlled so that the one or more processors cannot execute the application but the input/output processor can communicate data with the network.

11. The method as in claim 10, further comprising storing, in a flash memory, data received from the network and data to be transmitted to the network by the input/output processor in both the normal mode and the standby mode.

12. The method as in claim 10, further comprising storing, in a flash memory, data received from the network and data to be transmitted to the network by the input/output processor in both the normal mode and the standby mode, the data stored in the flash memory being in an electronic mail format.

13. The method as in claim 10, further comprising storing, in a flash memory, data received from the network and data to be transmitted to the network by the input/output processor in both the normal mode and the standby mode, the data stored in the flash memory including data identifying an application which will utilize the stored data.

14. The information processing system according to claim 1, wherein said downloading data downloaded from said network for said application is data identifiable with said application.

15. The method as recited in claim 10, further comprising deleting the communication schedule data if the past time expires without the download being made.

* * * * *